US012262703B2

(12) United States Patent
Flint et al.

(10) Patent No.: US 12,262,703 B2
(45) Date of Patent: Apr. 1, 2025

(54) PEST DETECTION

(71) Applicant: PESENSE PTY LTD, Brisbane (AU)

(72) Inventors: Anthony Robert Flint, Carindale (AU); Peter Kenyon Simpson, Red Hill (AU); Ion Leslie Staunton, Pacific Pines (AU)

(73) Assignee: PESENSE PTY LTD, Brisbane (AU)

( * ) Notice: Subject to any disclaimer, the term of this patent is extended or adjusted under 35 U.S.C. 154(b) by 733 days.

(21) Appl. No.: 17/062,828

(22) Filed: Oct. 5, 2020

(65) Prior Publication Data

US 2021/0076656 A1 Mar. 18, 2021

Related U.S. Application Data

(63) Continuation of application No. 15/313,931, filed as application No. PCT/AU2015/000316 on May 28, 2015, now Pat. No. 10,798,932.

(30) Foreign Application Priority Data

May 28, 2014 (AU) ................................ 2014902034

(51) Int. Cl.
*A01M 1/02* (2006.01)
*A01M 1/20* (2006.01)
(Continued)

(52) U.S. Cl.
CPC .......... *A01M 1/026* (2013.01); *A01M 1/2011* (2013.01); *A01M 25/004* (2013.01);
(Continued)

(58) Field of Classification Search
CPC ........ A01M 1/02; A01M 1/023; A01M 1/026; A01M 1/04; A01M 1/2011; A01M 1/24; A01M 1/245; A01M 25/002
(Continued)

(56) References Cited

U.S. PATENT DOCUMENTS 5,571,967 A 11/1996 Tanaka et al.
5,575,105 A 11/1996 Otomo
(Continued)

FOREIGN PATENT DOCUMENTS

AU 693375 2/1996
AU 2004229096 12/2004
(Continued)

OTHER PUBLICATIONS

U.S. Appl. No. 61/191,461, filed Sep. 9, 2008, Borth et al.

*Primary Examiner* — Peter M Poon
*Assistant Examiner* — Danielle A Clerkley
(74) *Attorney, Agent, or Firm* — Bonini IP Law, LLC; Frank J. Bonini, Jr.

(57) ABSTRACT

A system (10) for remote detection of pests, in this case as applied to a domestic dwelling (11) where a base station (12) communicates with eight detector or monitor units (13). The dotted (lines (14) indicate wired or wireless communication between the units (13) and the base station (12). As used herein the expressions “monitor” and “detector” are used interchangeably or where the detector is used as part of a box or cartridge where the detector is part (and may be reusable and separable) the whole unit including the detector part may be referred to as a monitor.

10 Claims, 68 Drawing Sheets

(51) Int. Cl.

| | |
|---|---|
| ***A01M 25/00*** | (2006.01) |
| ***G01V 8/20*** | (2006.01) |
| *G06F 16/951* | (2019.01) |
| *H04W 4/80* | (2018.01) |
| *H04W 84/12* | (2009.01) |
| *H04W 88/08* | (2009.01) |

(52) U.S. Cl.
CPC .............. *G01V 8/20* (2013.01); *G06F 16/951* (2019.01); *H04W 4/80* (2018.02); *H04W 84/12* (2013.01); *H04W 88/08* (2013.01)

(58) Field of Classification Search
USPC ................................................ 43/131, 132.1
See application file for complete search history.

(56) References Cited

U.S. PATENT DOCUMENTS

| | | | | |
|---|---|---|---|---|
| 5,815,090 | A | 9/1998 | Su | |
| 5,832,658 | A | 11/1998 | Randon | |
| 5,877,422 | A | 3/1999 | Otomo | |
| 5,921,018 | A | 7/1999 | Hirose et al. | |
| 6,016,625 | A | 1/2000 | Bishoff et al. | |
| 6,079,150 | A | 6/2000 | Setikas et al. | |
| 6,079,151 | A | 6/2000 | Bishoff et al. | |
| 6,058,646 | A | 9/2000 | Bishoff et al. | |
| 6,178,834 | B1 | 1/2001 | Cates | |
| 6,404,210 | B1 | 6/2002 | Su | |
| 6,543,182 | B2 | 4/2003 | Snell et al. | |
| 6,581,325 | B2 | 6/2003 | Gordon | |
| 6,615,535 | B2 | 9/2003 | Snell et al. | |
| 6,724,312 | B1 | 4/2004 | Barber et al. | |
| 6,792,395 | B2 | 9/2004 | Roberts | |
| 6,914,529 | B2 | 7/2005 | Barber et al. | |
| 6,928,770 | B2 | 8/2005 | Oi et al. | |
| 6,928,771 | B1 | 8/2005 | Tesh | |
| 7,212,112 | B2 | 5/2007 | Barber et al. | |
| 7,212,129 | B2 | 5/2007 | Barber et al. | |
| 7,233,251 | B2 | 6/2007 | Lewis | |
| 7,262,702 | B2 | 8/2007 | Barber et al. | |
| 7,348,890 | B2 | 3/2008 | Barber et al. | |
| 7,377,072 | B2 | 5/2008 | Meier et al. | |
| 8,026,822 | B2 | 9/2011 | Borth et al. | |
| 8,407,933 | B2 | 4/2013 | Cink | |
| 8,830,071 | B2 * | 9/2014 | Borth .................... | H04W 76/10 340/573.2 |
| 2002/0108295 | A1 | 8/2002 | Aesch et al. | |
| 2002/0116866 | A1 | 8/2002 | Aesch et al. | |
| 2002/0185605 | A1 | 12/2002 | Shuman | |
| 2003/0146840 | A1 | 8/2003 | Donskoy | |
| 2003/0184442 | A1 | 10/2003 | Gardner | |
| 2003/0213161 | A1 | 11/2003 | Gardner et al. | |
| 2004/0140900 | A1 | 7/2004 | Barber et al. | |
| 2005/0168336 | A1 | 8/2005 | Donskoy | |
| 2005/0190063 | A1 | 9/2005 | Lewis | |
| 2006/0016121 | A1 | 1/2006 | Ballard et al. | |
| 2006/0025891 | A1 | 2/2006 | Lothar, Jr. | |
| 2006/0030290 | A1 | 2/2006 | Rudolf et al. | |
| 2006/0207164 | A1 | 9/2006 | Pearson | |
| 2006/0265941 | A1 | 11/2006 | Newton | |
| 2006/0265944 | A1 | 11/2006 | Meier et al. | |
| 2007/0290793 | A1 | 12/2007 | Tran | |
| 2008/0204252 | A1 | 8/2008 | Tolley | |
| 2009/0094884 | A1 | 4/2009 | Cink | |
| 2009/0192763 | A1 | 7/2009 | Gardner, Jr. et al. | |
| 2012/0212338 | A1 | 8/2012 | Borth et al. | |
| 2013/0340320 | A1 | 12/2013 | Staunton | |
| 2014/0123543 | A1 | 5/2014 | Osseiran | |
| 2014/0325892 | A1 | 11/2014 | Borth et al. | |
| 2016/0025652 | A1 | 1/2016 | Go et al. | |

FOREIGN PATENT DOCUMENTS

| | | |
|---|---|---|
| AU | 2009292169 | 3/2010 |
| AU | 2013100496 | 5/2013 |
| AU | 2013100497 | 5/2013 |
| AU | 2013204958 | 1/2014 |
| AU | 2014203633 | 7/2014 |
| AU | 2014230408 | 9/2014 |
| AU | 2013204887 | 10/2014 |
| CN | 101127147 | 2/2008 |
| EP | 1563730 | 8/2005 |
| EP | 2323478 | 5/2011 |
| JP | 2004229536 | 8/2004 |
| KR | 101388928 | 4/2014 |
| WO | WO2004016085 | 8/2003 |

* cited by examiner

Detector Flow Chart

Wireless Network Flow Chart

Pesense Cloud User Interface Flow Chart

Pesense Cloud Administrator Interface Flow Chart

Pesense Cloud Solution Provider Interface Flow Chart

Pesense Cloud Installer / Service Administration Interface Flow Chart

Pesense Cloud Installer / Service Personel Interface Flow Chart

Pesense Cloud Client Interface Flow Chart

PEST DETECTION

TECHNICAL FIELD

THIS INVENTION relates to detection of pests and in particular but not limited to detection of subterranean termites in an effort to prevent damage to property. Although the following description refers to termites the present invention may be used to detect other pests so the expression "termite" should be understood to embrace pests in general where the skilled person would understand that the present invention has applicability. There will of course be peculiarities in the behaviour of different pests which may or may not make the present invention applicable. Generally speaking, wherever the pest has some predictable behaviour or may be biased to some predictable behaviour the present invention will be applicable.

BACKGROUND ART

In an effort to prevent termite damage it is known to use detectors or monitors which house a termite attractant. The plan with this known arrangement is that termites enter the monitor and commence digesting the attractant and the termites may then be discovered inside the monitor and baited. The baited termites return to a nearby nest and due to the bait selected, the whole colony is eventually killed.

The present invention concerns in a preferred form, the process and apparatus by which termites are discovered using an electronic detector or sensor to indirectly identify a positive, avoid false positives and to remotely communicate a positive for further action.

OUTLINE OF THE INVENTION

In one aspect therefore there is provided a method of detecting pest activity using electronics, the method comprising the steps of:

1. providing a difference sensor in proximity to a site of possible pest activity;
2. using the difference sensor to detect a difference at the site of possible pest activity, the difference detected being an indication of pest activity; and
3. communicating the detection of said indication for further action.

Preferably, the method comprises programming a database with data concerning multiple distributed sensors and periodically automatically updating the database with detection data in accordance with the third step. Typically, the first step comprises distributing sensors about a property to be protected; causing a database to be programmed with data concerning the distributed sensors; and separately reporting the status of each of the sensors. In a preferred application of the method it comprises the step of indirectly detecting termite activity by detecting termite building activity. The building activity typically comprises newly formed mud structures which are sensed by the sensor. The building activity may be sensed in two spaced locations in an effort to avoid false positives. The building activity is typically inside a container holding termite attractant.

In another aspect there is provided a pest monitor comprising a detector having one or more electronic sensors, an attractant and a predefined sensor target or region of interest associated with the sensor(s), the target and sensor(s) being so made and arranged that the pests behaviour is predictable in relation to the target, so that they interact therewith or interfere in some way, and that interaction triggers the associated sensor to indicate a positive. In one application the monitor is a container holding attractant, the pests are termites, the target is a termite closed, normally open opening, the opening preferably being normally open to atmosphere and the sensor(s) detect closure of the opening by the termites. There may be a single target or multiple targets and/or multiple sensors in order to give further confirmation of a positive.

In other embodiments, the difference sensor may be any arrangement of sensors or transducers that permit a characteristic of the pest activity to be sensed. The sensor(s) may be purely reactive in terms of passively responding to the difference or the sensor(s) may be active in terms of initiating a signal and eliciting a particular response. Typically, the pest will be indirectly sensed rather than the pest themselves, as in say, the moving pests themselves blocking a signal path, hence the preferable use of a predefined target. The difference sensor may be mounted in or on a remote monitor unit, the remote unit including communications electronics and pest attractant. The remote unit may typically be a monitor container holding the attractant. Thus in the case of termites or other similar pests which build or secure their environment, detection may be by detecting a change in the environment brought about by the activity of the pest. For example, indirect sensing may be by temperature, pressure, humidity, different vibrational patterns, or physical structures built by the pests or combinations of these. Any difference that may be detected instantaneously by a simple one off pulse or like signal or any progressive change that might be detected over time might also be suitable. A gas detector would be another option, in the case of termites methane might be detected. However, these would not involve the use of a target in the sense of a particular event in a particular location or locations. In a simple form the difference sensor may be housed in a housing made from a pest attractant or in the case of termites, digestible material providing a dual purpose as attractant and positionable housing for the detection of the pests. For example, in the case of termites a simple wooden block may be used to carry the electronic sensors and other electronics. The block may have a hole or opening which is positioned proximate the sensor(s) which hole is blocked off by the pests so that the geometry is preconfigured for a predetermined mode of detection determined by expected activity in blocking the hole.

Preferably, the difference sensor comprises at least two independently sensed elements of difference data. The data elements can comprise the same kind of data or may comprise two different types. To this end it is preferable to use two sensors in order to minimise or avoid false positives. Typically, the sensors are physically displaced from one another and detect indirect pest activity in different data types or in physically different locations or by directing the same signal at the same or adjacent locations while collecting positive indications at two different locations. For example, an air flow sensor may be used to detect closure of a region due to a drop in airflow and this may be complemented by an increase in humidity or detection of a structure using an optical sensor or change in vibrational patterns and so on. Where two or more sensors are employed it is preferable that the second and following sensor(s) is only interrogated if the first sensor throws a positive.

Once pests are detected by the sensor, the presence of the pests may be communicated in any of a number of possible ways. An example would be a simple visual indicator that would change status and can be seen by a passerby. This is a local indication. One example would be a light on or adjacent the physical location of the sensor. Another way would be some form of wired or wireless transmission. This is a remote indication. Once pests are detected they can be baited or otherwise treated.

In the case of a wireless transmission, there may be a network of difference sensors that communicate in a network environment so that multiple detection sites may be monitored. Preferably, a low power, low data type network environment is employed to minimise power consumption. In this case it is preferred that the difference sensor be configured for low power operation. Preferably, the difference sensor, network and the method are employed in a powered up condition at predetermined intervals at a predetermined sleep time and wake time to optimise power consumption.

As an alternative to simple autonomous operation of the sensor with a simple sensor mounted indicator, a base station communicating with and controlling the operation of the sensor or multiple sensors is a further optional variation. In this regard the base station may comprise a micro controller and this micro controller may be programmed to communicate with a micro controller also on each remote unit associated with each difference sensor. Thus in a further broad aspect there may be provided a central server where base station acquired data may be managed for multiple base stations and multiple sites. In this embodiment the operative function of the remote base stations need not be as sophisticated and may simply relay data to the central facility. The central facility may be run by a pest control company supplying a subscription service to many sites. Thus a server may automatically manage a database and provide reports as to detector and base station service requirements as well as initiating action on a sensed positive. This may be referred to a the "status" as in a zero indicating no pests or "one" indicating a positive.

In a preferred embodiment the difference sensor comprises one or more signal receivers adapted to sense the relevant difference sensors wired up to electronic devices including a transmitter and a receiver which are arranged so that a signal change at the receiver provides the positive indication of pest presence. Typically, multiple receivers are employed in a particular geometry so that more than one signal is required in an effort to avoid false positives. Preferably, a reflected signal is used as at least one of the signals. More preferably, two reflected signals are used.

In the case of a physical transmissible signal employing light, sound or similar, multiple reflectors may be employed to carry the transmitted or received signals according to the particular geometry. In one embodiment, the transmitter(s) and receiver(s) are side-by-side with the transmitters transmitting a beam, collimated or otherwise focused or directed so that the received signals (indication of pest presence) may be discriminated for the purpose of identifying the respective signals. As an alternative to physical arrangements used to discriminate between signals, signal processing may be an alternative, for example two different frequencies of modulated signals may be employed and filtered so that a positive is only detected if both signals are present.

In the case of multiple beams, it is preferred that the beams be directed in a defined geometry of generally top down in an effort to house the electronics in an upper region of a detection assembly comprising a monitor holding attractant and a sensor assembly located above or in an upper portion of the monitor. Thus, in the example of a reflected light beam, a light pulse would be fired down and reflected up and received if the difference requirement was satisfied. The range of detection may be determined by threshold values of distance, pulse duration, pulse amplitude and so on.

A monitor typically includes attractant and a detector with a sensor assembly typically involving control electronics, the difference sensor, power supply and a sensor assembly housing. The sensor assembly may be made integral with a detector/monitor or the sensor assembly may be a self contained sensor module attachable to a monitor. Where the different sensor employs a beam exiting a module, the module preferably has a housing including a battery holding section, an electronics mounting section and beam exit section disposed in a base of the sensor assembly housing. The sensor assembly housing is preferably sealed to survive subterranean deployment and the worst of environmental conditions. In the case of infrared sensors being employed, water flooding will not cause false positives due to the sensor characteristics, IR is absorbed by the sediment water. The sensor assembly and housing is designed to be robust and based on its location, typically at the top of a monitor holding attractant, the sensor assembly housing can be reused again after a pest infestation. The sensor assembly is preferably located at the top of the monitor for reliability and to optimise radio pattern, as well as being easily removed for baiting of the monitor once pests are detected. A sensor assembly fitted monitor can be used in wall cavities and other locations.

In a preferred aspect there is further provided a system for remote detection of pests, where a base station communicates with detector or monitor units and wired or wireless communication is provided between the units and the base station. Typically the units are positioned to provide an effective boundary. Typically each unit has attractant of some kind to lure pests as well as a sensor that detects the presence of pests by detecting a difference at the unit when pests are present, when this happens the base station is alerted. Preferably, each unit is equipped with a difference sensor assembly comprising a module having a housing having a bottom and a lid, containing a PC board carrying electronics and batteries, the bottom having disposed adjacent thereto transmitters and sensors for the purpose of transmission of signals emanating from the bottom of the housing and reception of signals reflected through the bottom of the housing. Preferably, the housing may be completely sealed and self contained so that the electronics may be protected from the elements. Typically, in the case of termites the sensor assembly has been mounted on a surface, the surface having an opening in the surface and the sensor assembly having transmitters which emit a signal which is reflected by the presence of a mud filler in the opening indicative of the presence of termites. The mud filler provides a recognisable predetermined target for the sensor. A signal is generated and sent to a receiver and an alarm generated. The system may be further extended with suitable software on a computer to a central system server of a pest control company via the Internet with notification to pest control contractors also via suitable communications.

Thus in another preferred aspect there is provided a termite monitoring system using the internet, the system comprising networked programmable distributed pest detectors, a programmable base station in communication with the detectors, the system being connected to the internet, a database holding detector data for display to and/or editing by authorised users via the internet or via local wireless communication, the data uniquely identifying each monitor including location data and at least a "positive" status, the system automatically updating status at predetermined intervals. Preferably, each detector comprises a difference sensor comprising first and second sensors each being adapted to detect a positive, the base station having a wireless communication to an external local programming source and separate internet connection.

In another aspect there is provided a sensor assembly for use with a detector, the sensor assembly having a battery power supply, a microcontroller, a difference sensor and communication electronics. Preferably, the sensor assembly uses a detector arrangement operating as a difference sensor, as part of a network, preferably a mesh or "Zigbee" type network, the network employing multiple detector arrangements and sensor assemblies in a system as described and mounted in proximity to pest attractants or regions of possible pest activity. The network employs a base station, and the detectors and base station communicate and are configured to transmit as a minimum, data concerning detector status, detector identity and a "positive" when the anticipated difference is sensed.

Once a detector or detectors and a base station are set up as described the operation of the system typically employs the interaction between the detector(s) and base station which are timed in accordance with a semi-autonomous timed sequence where detectors are woken either at timed intervals or could be woken by the base station. The detectors then run through a check sequence to join the network, verifying status and check for a positive detection of pests and then go to sleep/hibernate. Typically, where two sensors are being employed to reduce the possibility of false positives, a positive on the first sensor is a precondition to reading the second sensor so the software cycles the single sensor read until the sleep command is received from the base station.

In another option the operation of the network in relation to the detectors and the base station, the base station includes WiFi and includes local programming and set up by a smartphone App communicating with the base station via the base station WiFi.

Where multiple sites and monitors are being managed there is preferably a database and the database may hold site details, detector details and monitor details. The detector information the database holds, may include the customer ID, date, time, the site ID, the monitor ID, the status and voltage and of these there is a daily update of "status" and the "voltage" for each detector, status being whether or not pests are present. Other details related to the detector at the time of installation or at a particular point in time may be held in the database and these contents as in, ID, site ID, the particular detector or monitor ID, a location description, latitude location, longitude location, the current status and the current voltage and the last record.

Where multiple sites and monitors are being managed data may be displayed on a web browser according to selected user access levels.

BRIEF DESCRIPTION OF THE DRAWINGS

In order that the present improvements may be more readily understood and put into practical effect reference will now be made to the accompanying drawings which illustrate preferred embodiments of the invention and wherein:

FIGS. 45-47 are also accessible via the internet; and

METHOD OF PERFORMANCE

Figure 1:
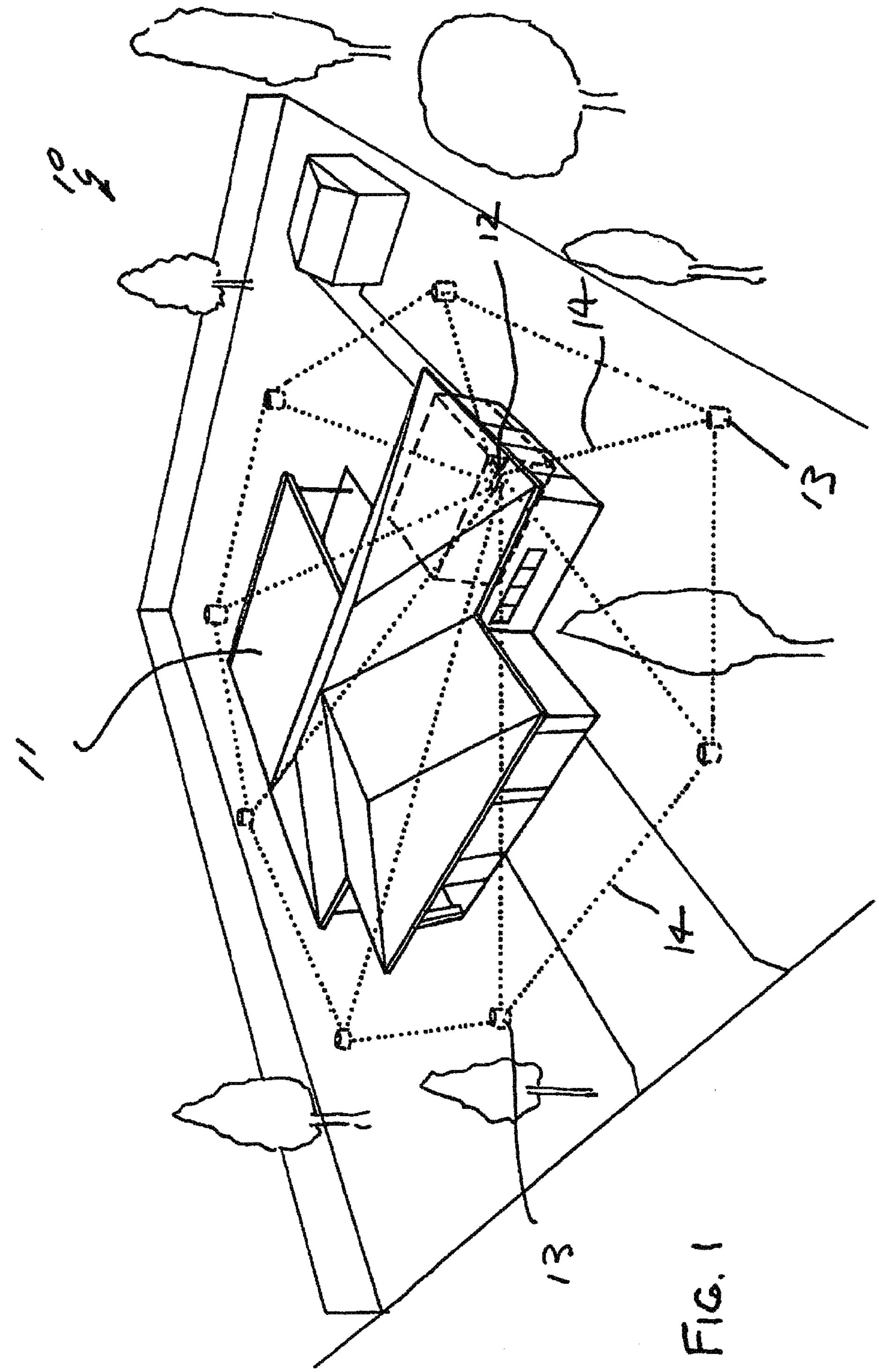
FIGS. 1-3 illustrate various overviews of application of the present invention to a home surrounded by monitors, a line of monitors in a particular application and to a home with various communication outputs.

Referring to the drawings and initially to FIG. 1 there is illustrated in schematic form a system 10 for remote detection of pests, in this case as applied to a domestic dwelling 11 where a base station 12 communicates with eight detector/monitor units 13. The dotted lines 14 indicate wired or wireless communication between the units 13 and the base station 12. As used herein the expressions "monitor" and "detector" are used interchangeably or where the detector is used as part of a box or cartridge, where the detector is part (and may be reusable and separable) the whole unit including the detector part may be referred to as a monitor. Thus the detector may be in and integral with the monitor or may be separable from it.

As can be seen the units 13 are spaced about the dwelling 11 to provide an effective boundary. The reason for this is that each unit 13 has attractant of some kind to lure pests as well as a sensor that detects the presence of pests by detecting a difference at the unit 13 when pests are present, when this happens the base station 12 is alerted.

Figure 2:
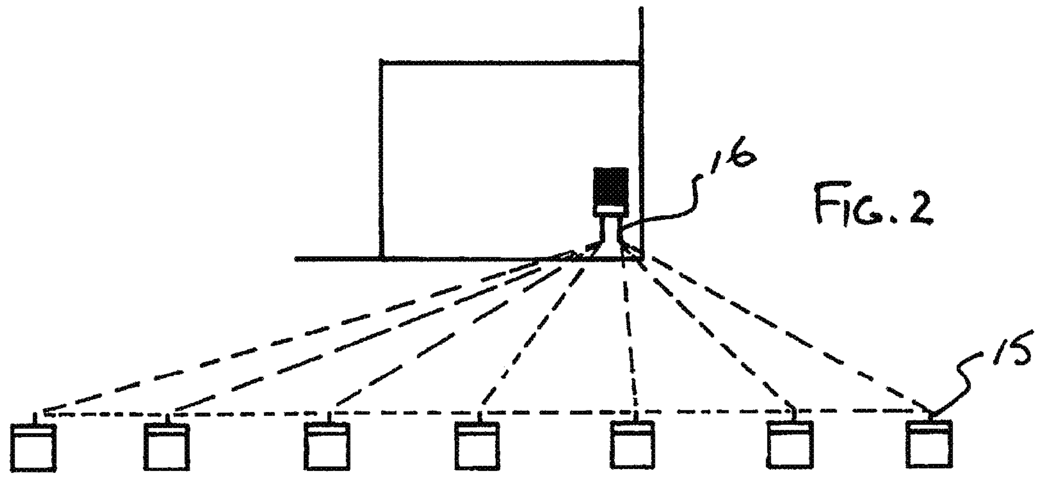
Figure 3:
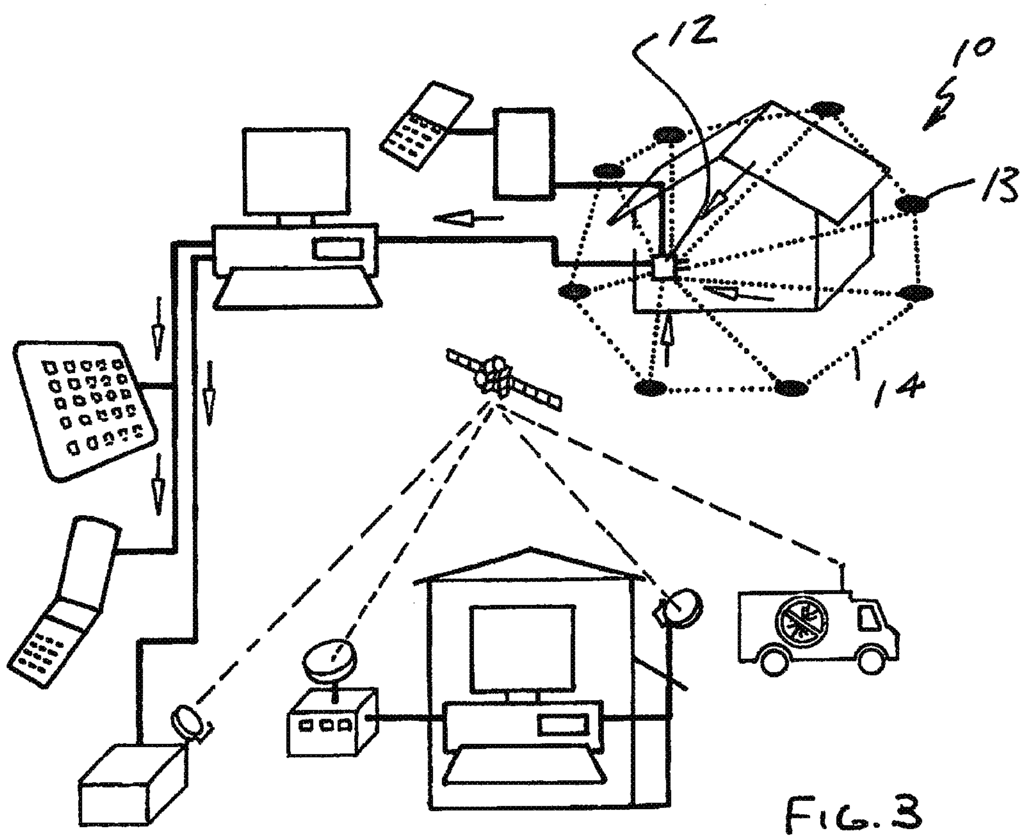

FIGS. 2 and 3 illustrate alternative arrangements showing typical communication arrangements that may be used in the present invention. FIG. 2 is a completely wireless arrangement showing antennas 15 on each unit and 16 on the base unit.

Figure 4:
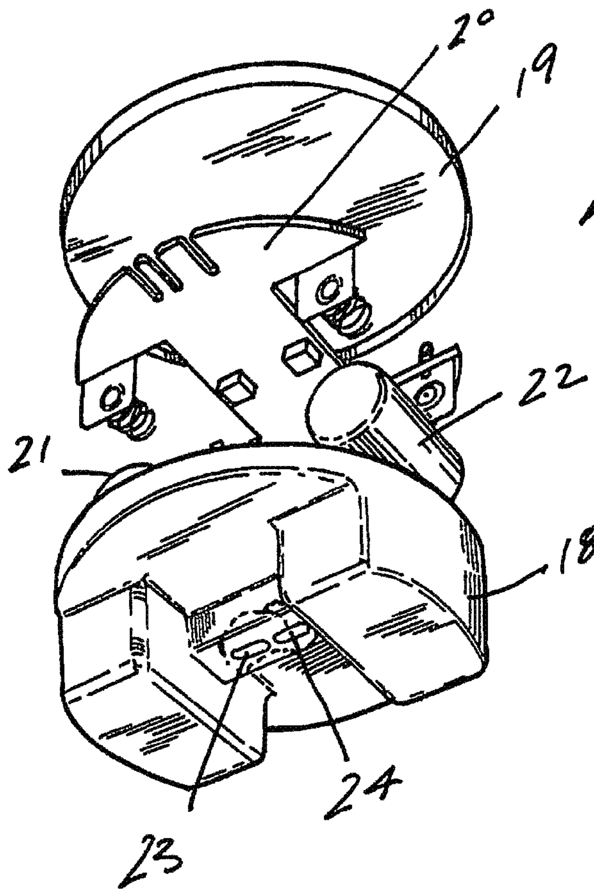
FIGS. 4 and 5 are two exploded type views of a modular difference sensor assembly that is designed to emit an IR beam and receive a reflected signal.
Figure 5:
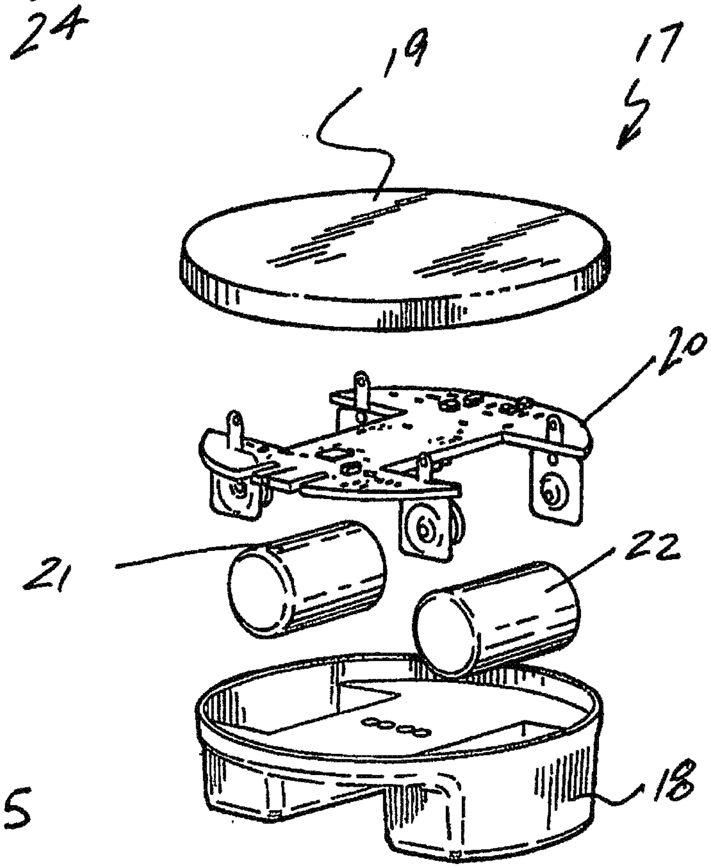
Figure 6:
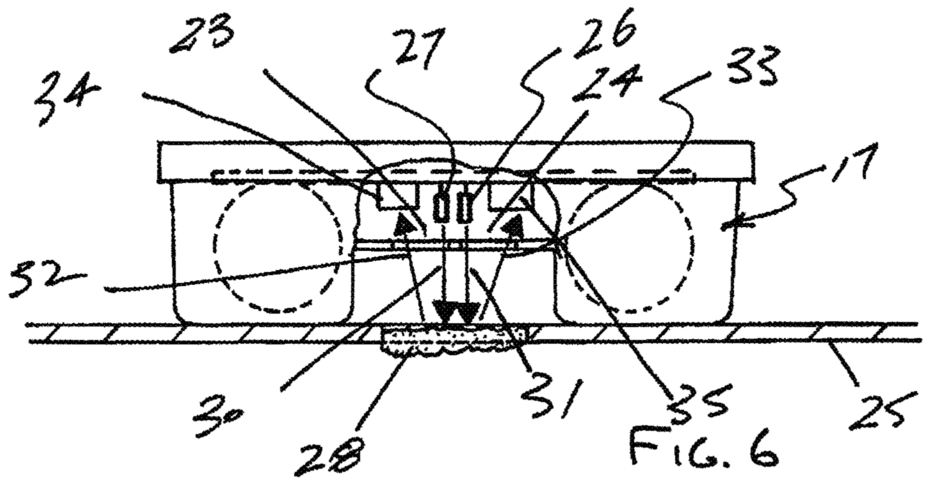
FIGS. 6 and 7 are drawings illustrating a typical geometry of detection where the module of FIGS. 4 and 5 have been placed where termites provide or build a "mud" section as a target permitting their detection.
Figure 7:
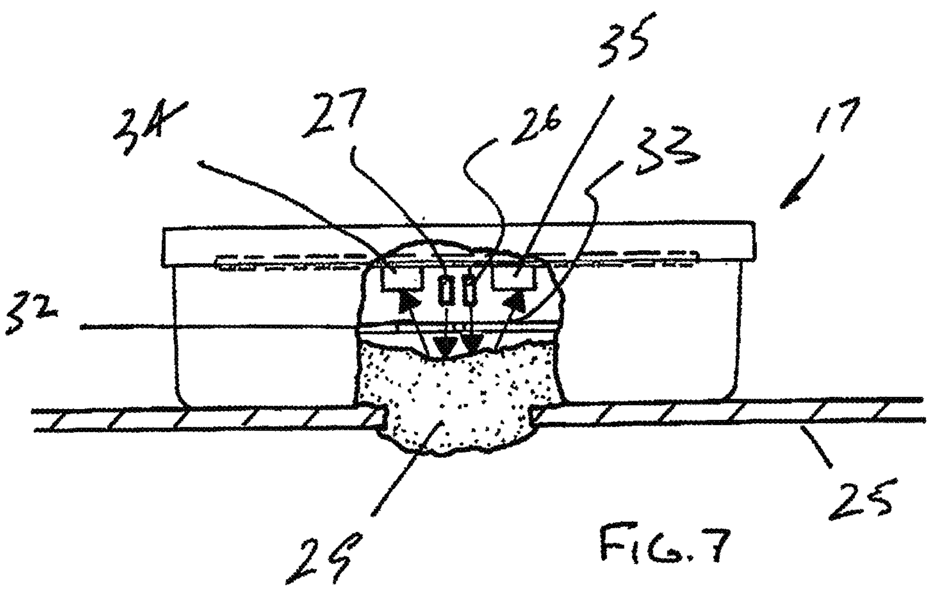

Each unit 13 is equipped with a difference sensor assembly, an example being shown in FIGS. 4 and 5 as a module at 17, shown in exploded form. The assembly 17 has a bottom 18, a lid 19, a PC board 20 and batteries 21 and 22. The bottom has spaced windows 23 and 24 aligned with transmitters and sensors for the purpose of transmission and reception of signals. Thus the housing may be completely sealed and self contained so that the electronics may be protected from the elements. FIGS. 6 and 7 show the principle of detection. The windows 23 and 24 may not be required if the signal is such that it is transmitted in the non-visible spectrum. There may be beam splitters employed so that a single transmitter and single receiver may be used but separate transmitters and receivers would be usual. In addition the dotted line adjacent openings 23 and 24 shows the option for a recess which may be domed with the openings 23 and 24 set back in order to adjust the collimation of the beams to give an appropriate signal. This domed recess may also serve to provide trapped air in the case of flooding and this may inhibit entry of water onto any detector screen on openings 23 or 24. Thus the screens would remain clean.

In this case in FIGS. 6 and 7 the assembly 17 has been mounted on a surface 25 and transmitters 26 and 27 emit a signal which is reflected by the presence of a mud filler 28, 29 indicative of the presence of termites. The mud filler is the predetermined target in this case. The transmitted signals are shown at 30, 31 and the reflected signals at 32, 33 being picked up by receivers 34 and 35. Due to the size of the mud filler in this case the transmitted beams target different sections of the mud so that closure can be detected rather than partial closure. In effect there are two targets. The same result could be obtained by having two spaced openings and having sensors for each. The termites would fill both openings and there would again be two signals to give a positive. In the present example the signals from the two sensors are modulated differently so that they can be distinguished.

Figure 8A:
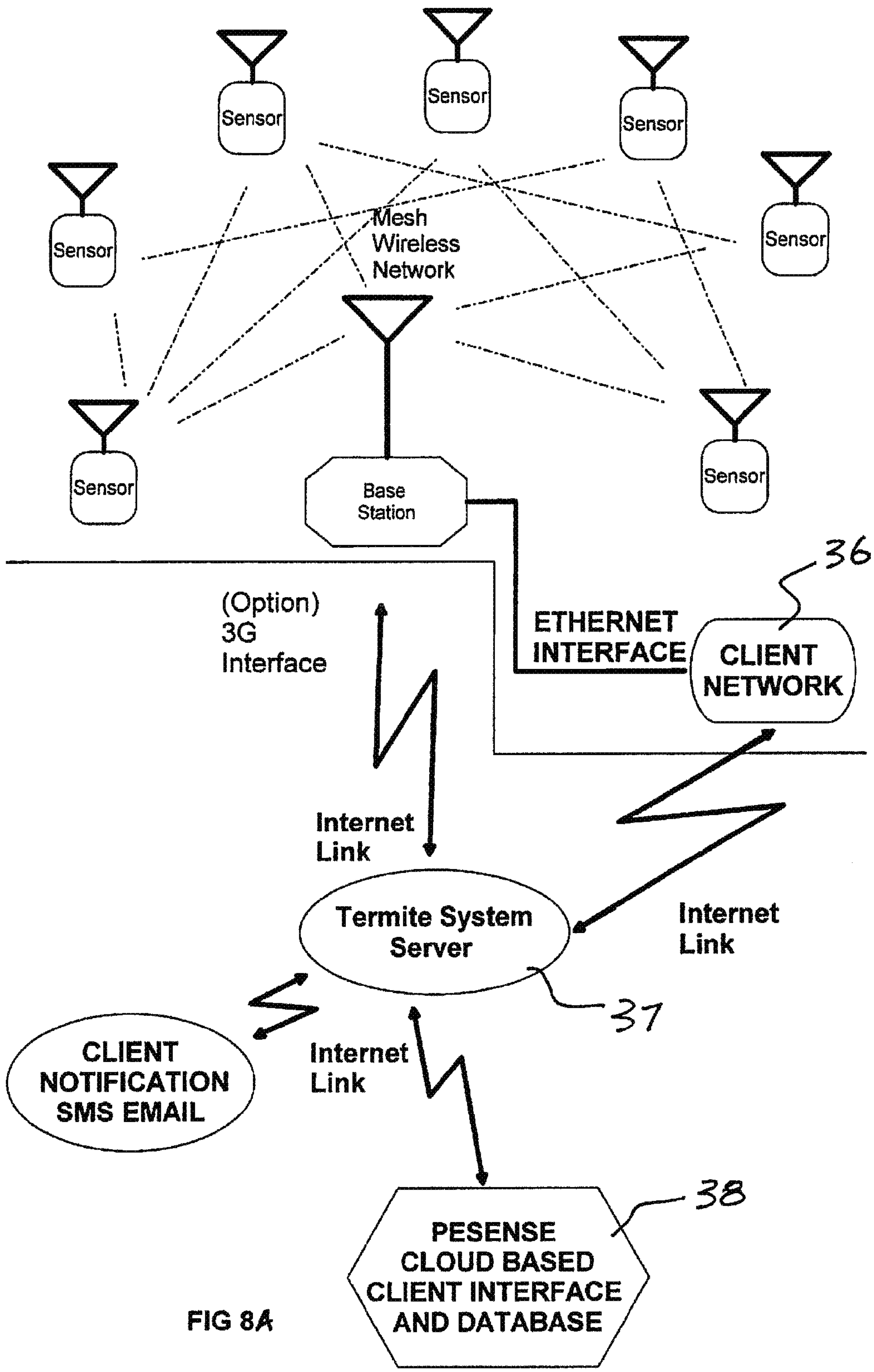
FIGS. 8A-8C are schematic diagram illustrating how the present invention might be utilised in different levels of communication for remote monitoring.
Figure 8B:
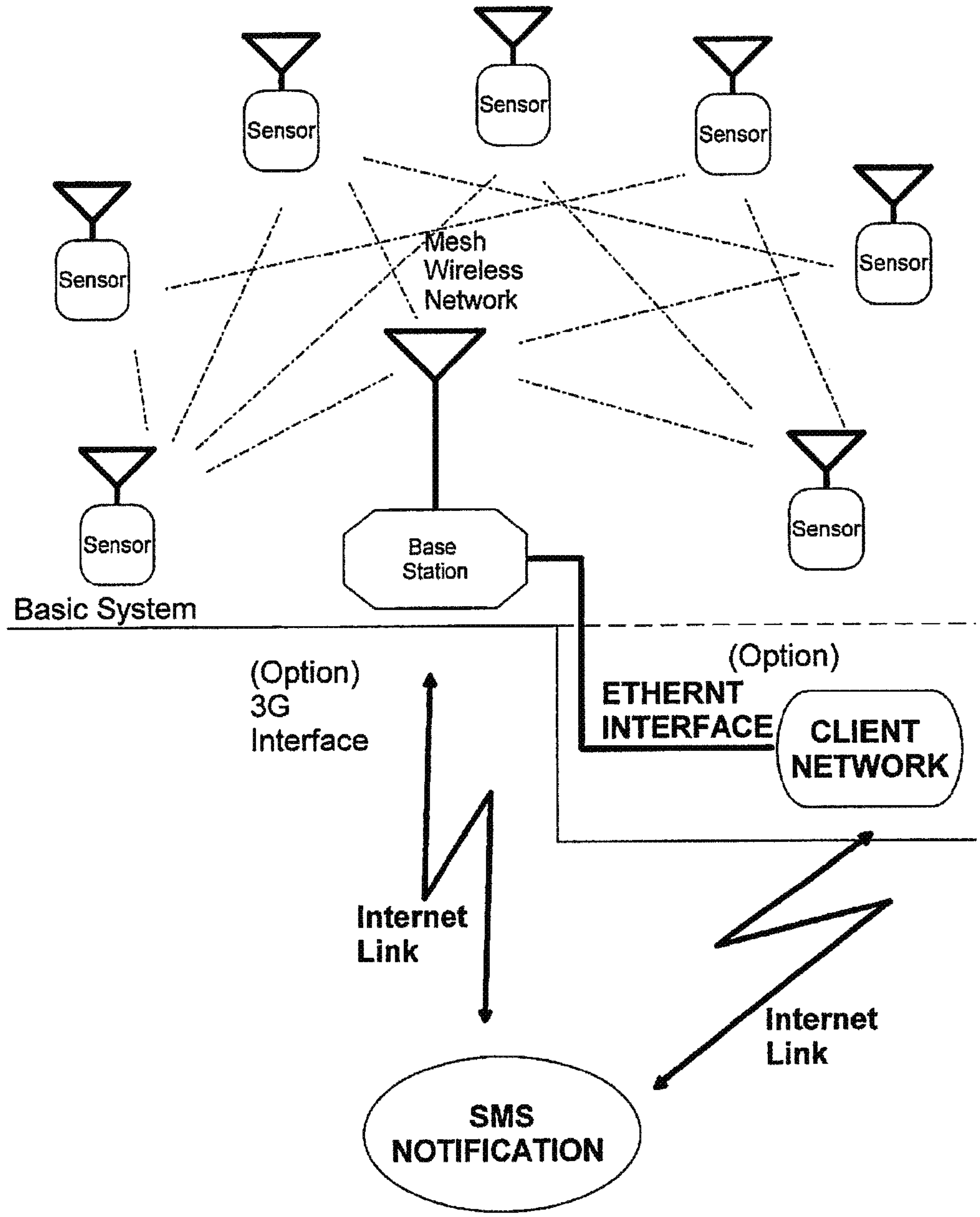
Figure 8C:
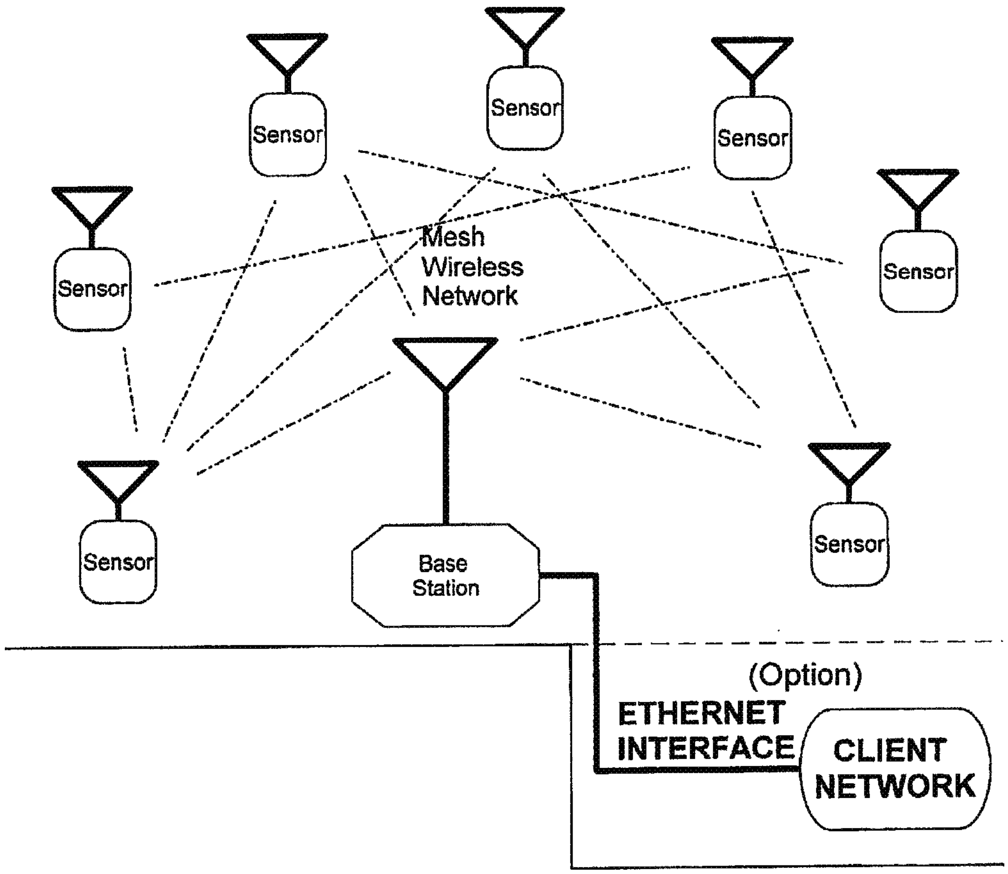

Referring to FIG. 8A-8C, there is illustrated systems where the base station may interface via USB or ethernet with a router or computer 36 as part of a client network. This may be suitable for a homeowner or other stand alone system as in FIGS. 8B and 8C. However, the system may be further extended similar to FIG. 3 with suitable software on the computer to a central system server 37 of a pest control company or via the Internet with notification to pest control contractors at 38 also via suitable communications.

An example of the electronics and process logic of a typical monitor unit and base station will now be described in greater detail.

Figure 9A:
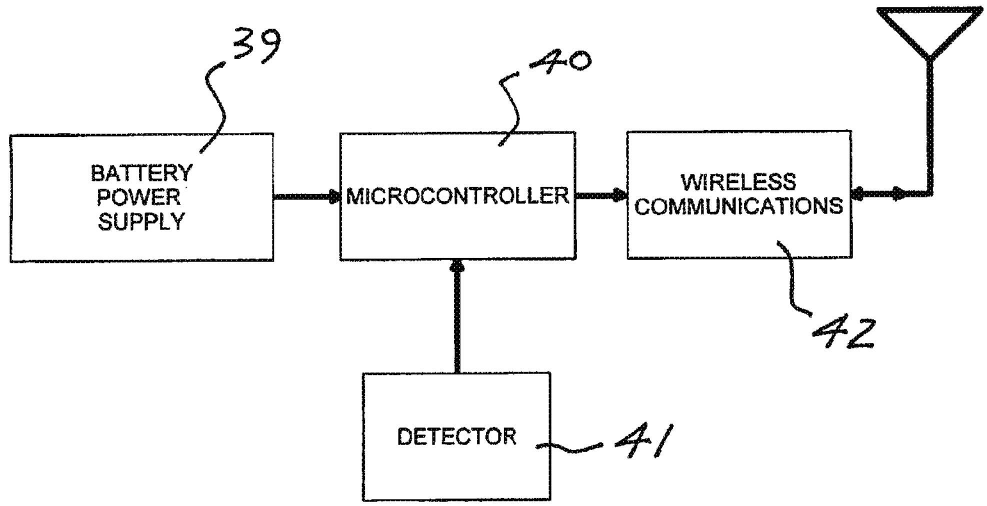
FIG. 9A is a schematic block diagram of a typical detector setup employing a microprocessor operating in a "Zigbee" network.

FIG. 9A is a block diagram of a sensor assembly for use with a detector, the sensor assembly with its basic elements being a battery power supply 39, a microcontroller 40, a difference sensor or detector 41 and communication 42.

Figure 9B:
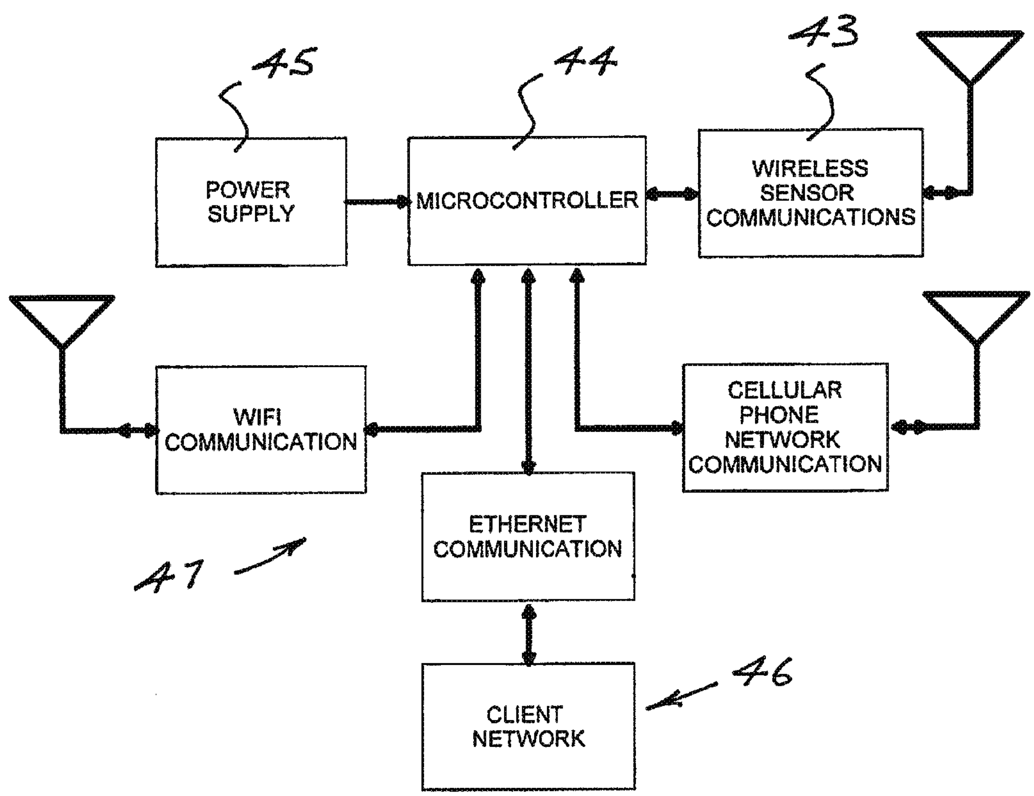
FIG. 9B is a schematic block diagram of a typical base station setup to communicate with the detector of FIG. 9B.
Figure 10A:
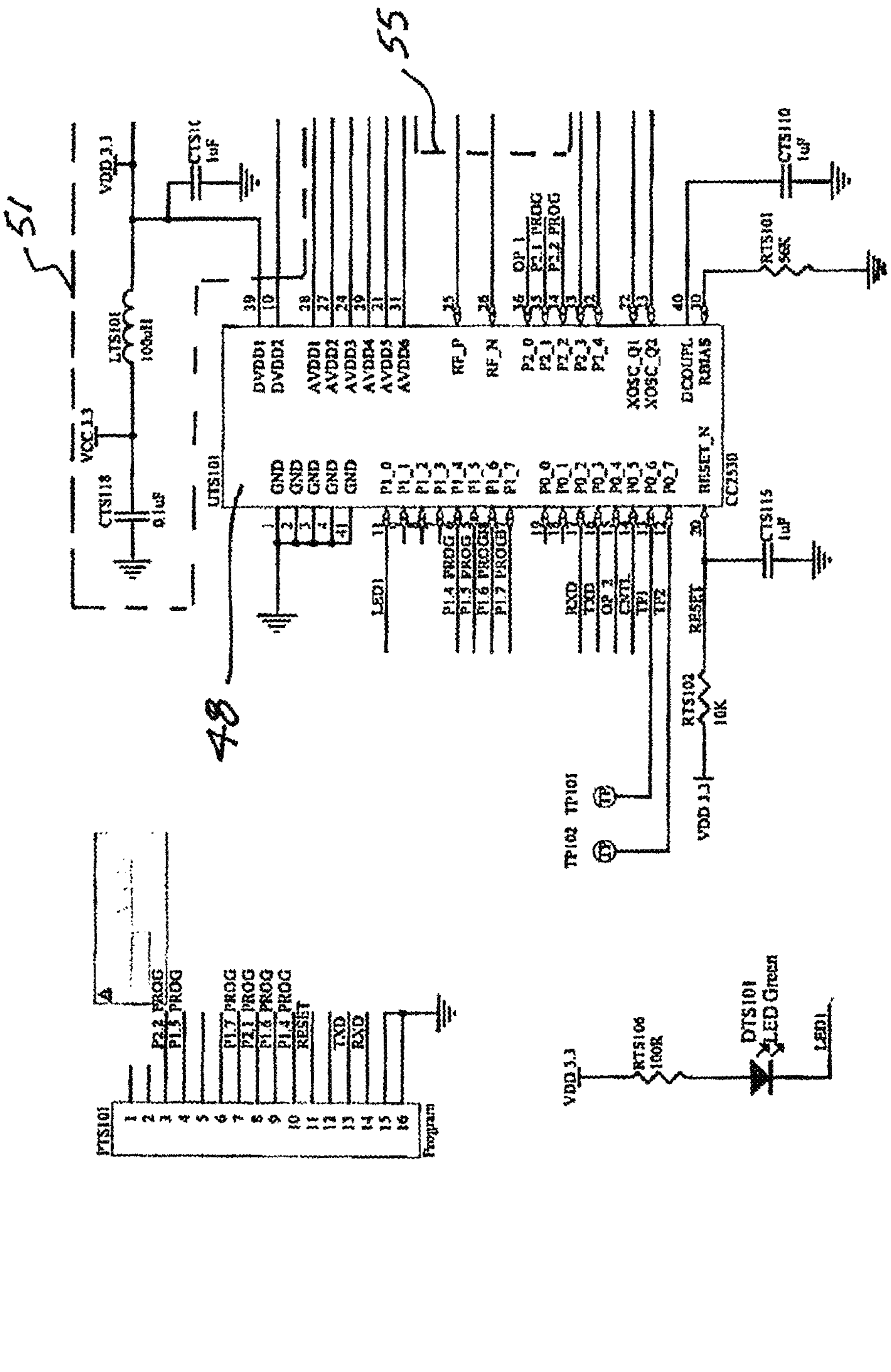
FIGS. 10A, 10B and 11A-11D are circuit schematics suitable for implementing the detector setup at FIG. 9A and suitable for use in the embodiment described herein.
Figure 10B:
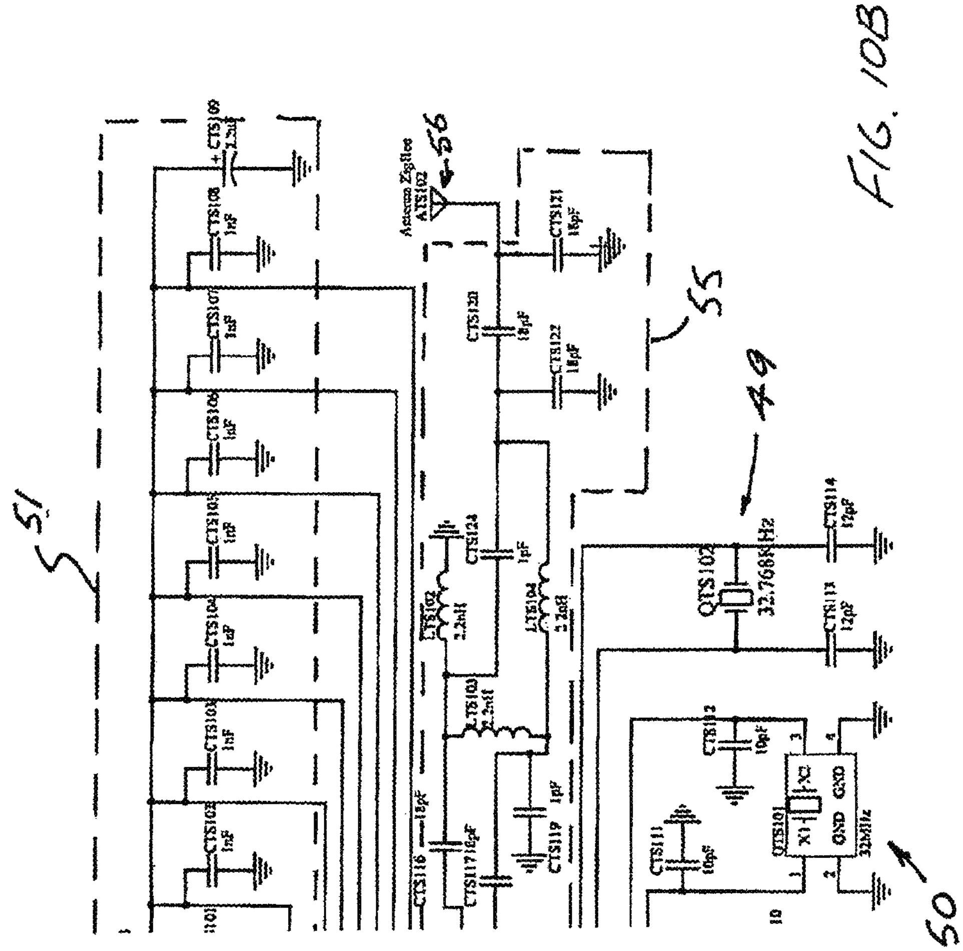
Figure 11A:
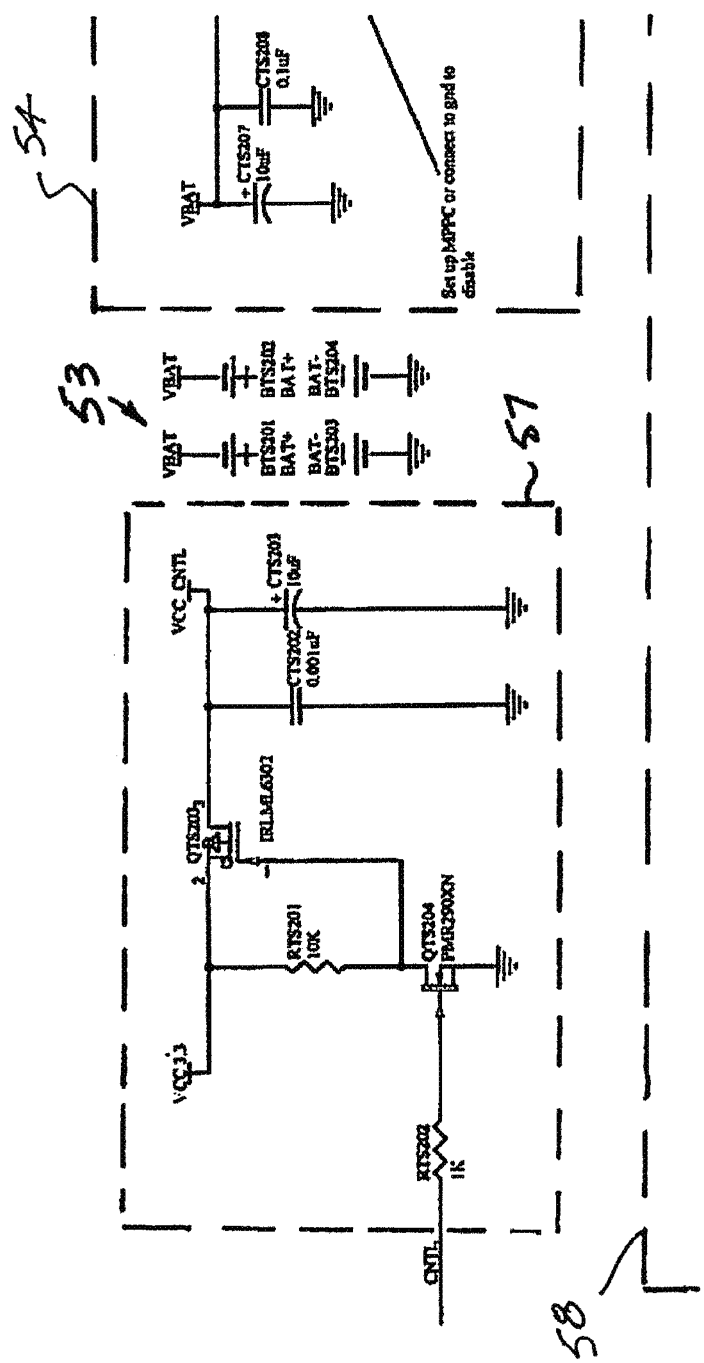
Figure 11B:
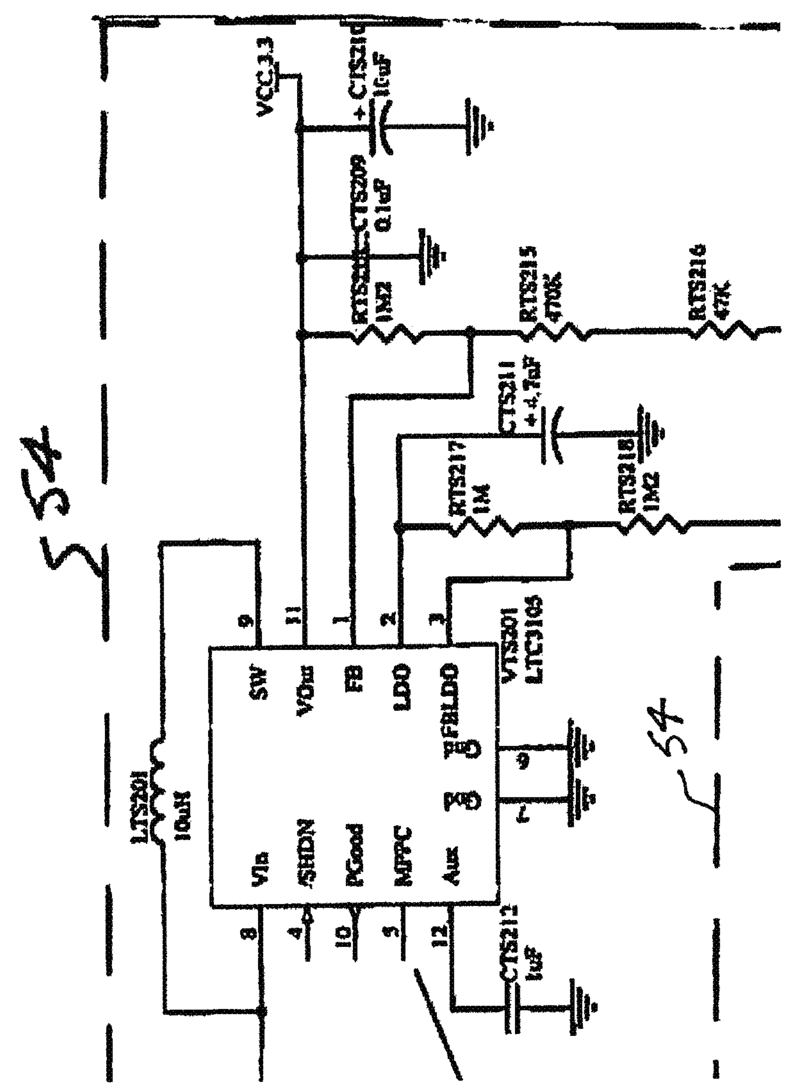
Figure 11C:
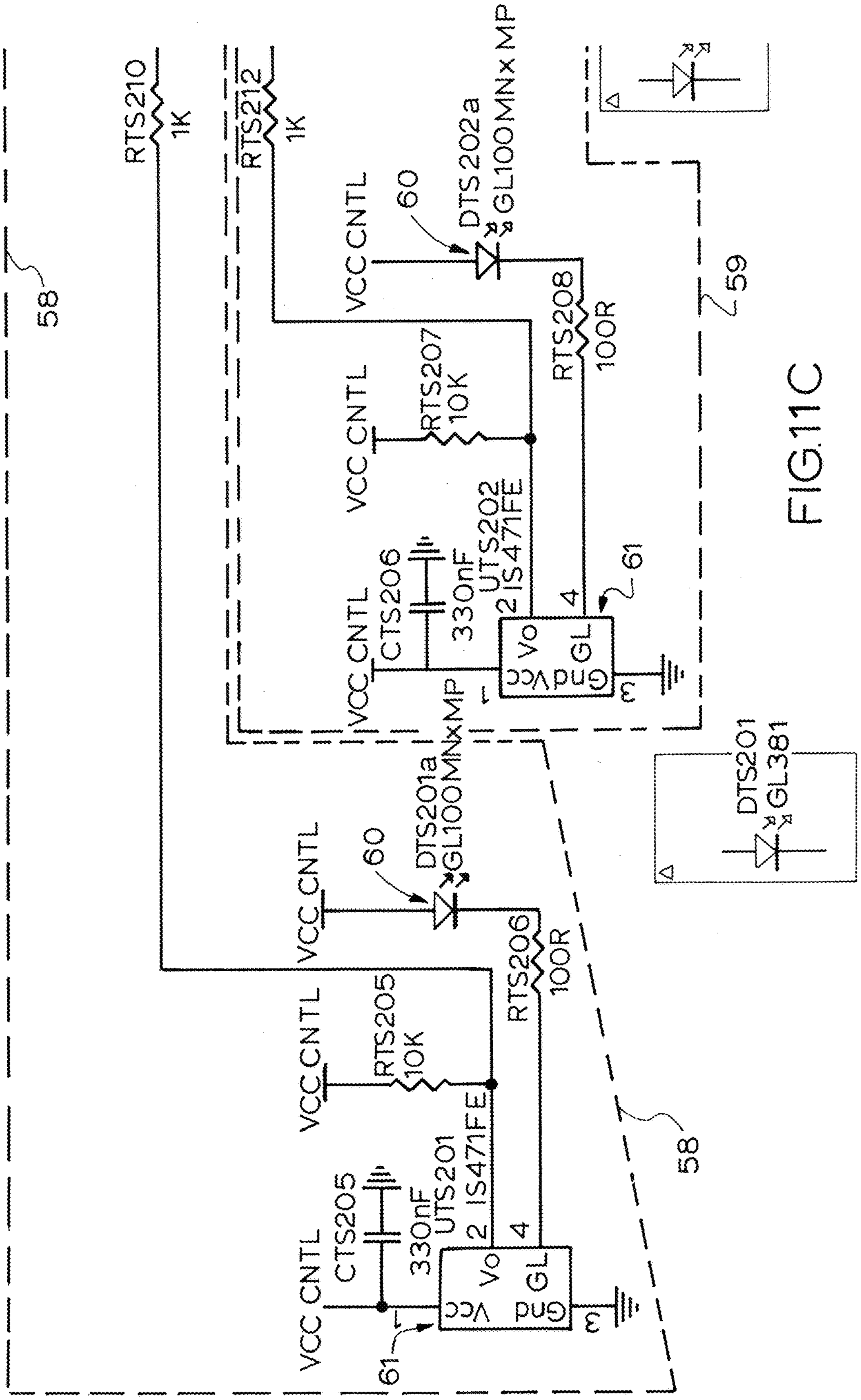
Figure 11D:
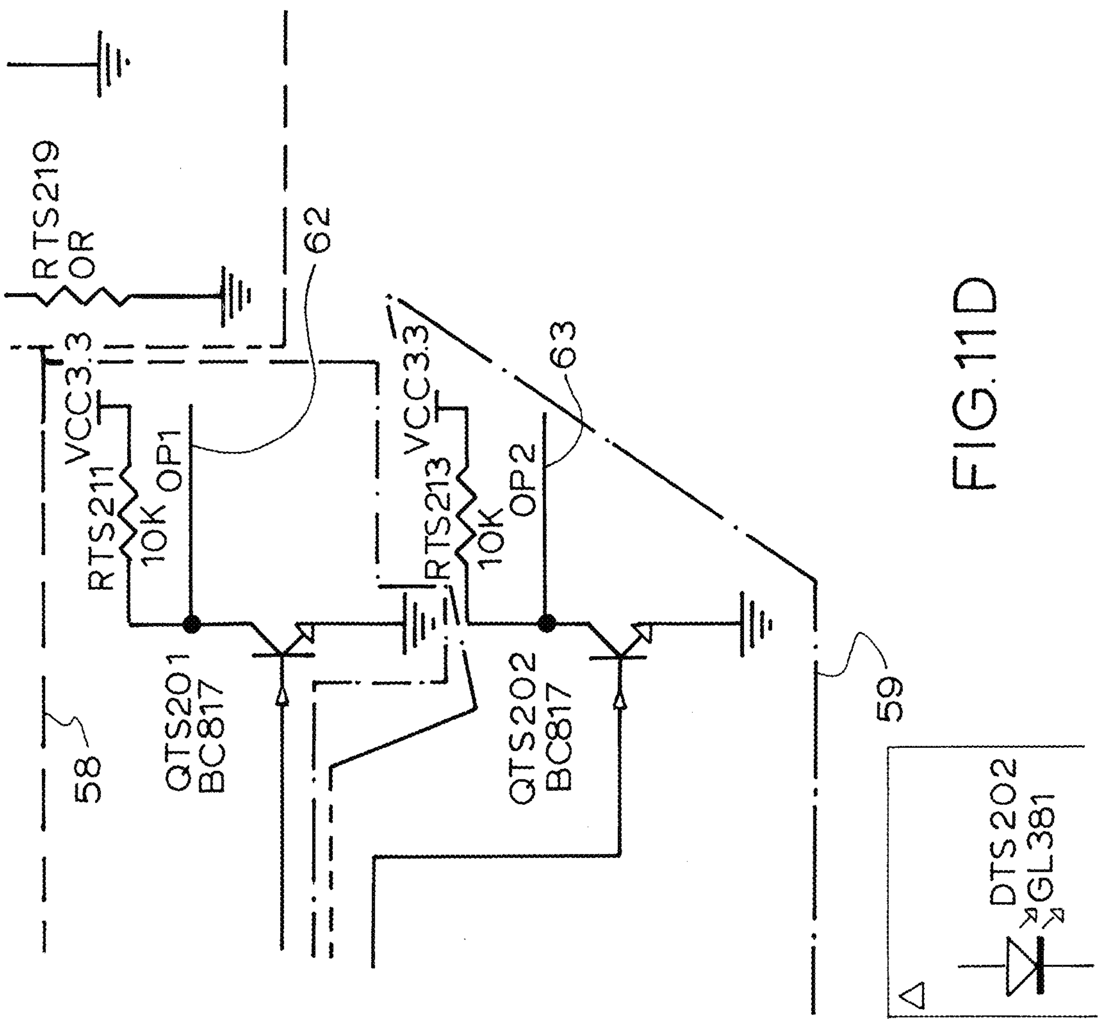

The unit of FIG. 9A connects with the base station of FIG. 9B via its communication unit 43, the base station is operated by a microcontroller 44 with a power supply 45. The base station has an USB/ethernet option for connection to a computer or network at 46 and optionally a cellular phone network or other WiFi communication options at 47.

FIGS. 10A through 11D constitute a typical circuit schematic of a detector arrangement operating as a difference sensor, as part of a mesh or "Zigbee™" network. The network employs multiple detector arrangements of the type illustrated in FIGS. 10A through 110 housed in accordance with FIGS. 4 and 5 and mounted in proximity to pest attractants or regions of interest targeted as possible pest activity. The network employs a base station, and the detectors and base station communicate and are configured to transmit as a minimum, data concerning detector status, detector identity, and a "positive" when the anticipated difference is sensed.

The detector in this case utilises a Texas Instruments CC2530 at 48 specifically suited to "Zigbee" network applications. Applicant's configuration is set up according to the manufacturer's specification, applicant utilises a crystal oscillator at 49 at 32.768 Hz for the sleep timer, to time the detector sleep periods and an external oscillator 50 at 32 MHz for code execution. The section in broken block at 51 is broadly the analog and digital power supply using the batteries at 53 conditioned by the power management and voltage regulator shown generally in broken outline at 54 based on a Linear Technology LTC3105 DC/DC convertor. The block section 55 is an impedance matching circuit for the transmission and reception of signals via the "Zigbee" antenna at 56. Block 57 is effectively a switch to activate the detector circuits 58 and 59. Each detector circuit utilises a SHARP™ GL100MNxMP surface mount type, high power output infrared emitting diode 60 and a SHARP IS47IF opic light detector 61. Thus upon a "CNTL" signal from 48 the diodes 60 transmit and if a reflected signal is received at both light detectors 61 then there will be two "positives" signalled at "OPI" and "OP2" at 62 and 63 on the same name pins in FIGS. 10A and 11D. At the end of this process a "positive" for pest detection is transmitted via the antenna 56.

FIGS. 12A-14C are circuit schematics of a typical base station. The base station is typically a hand held unit and employs a Displaytech Ltd LCD module 64128M series 57, a display driver 58 and a power supply 59 providing a primary supply at 3.8V for a Conway W801G GSM/CPRs module 60 and 3.3V for the display 57, 58 and USB 61. In the present case the base station uses a 12V AC adaptor as the main supply. The "Zigbee" networking capability for communication with multiple detectors, as for the detectors are as shown in FIG. 13A through 13C is based on the same Texas Instruments module CC2530 at 62 with similar clocking, power and antenna set up to optimise the low power operation and noise filtering of the digital and analogue power 63, impedance matched "Zigbee" output at 64 and clock circuits at 65. A port expander is illustrated at 66 which enables cellular use and LED status indicators in addition to the other available output, such as the USB 61 connection to a computer, the base station may connect to the cellular phone network using the module 60. The module 60 may for example communicate by SMS to a specified phone number a detected positive. A sim card holder is shown at 67. Other circuits illustrated in the drawings support the low power consumption design and the connectivity of the monitor or base station to its detector network and the selected communications technologies. There may also be an ethernet connection to a router as an option to the USB.

Figure 15:
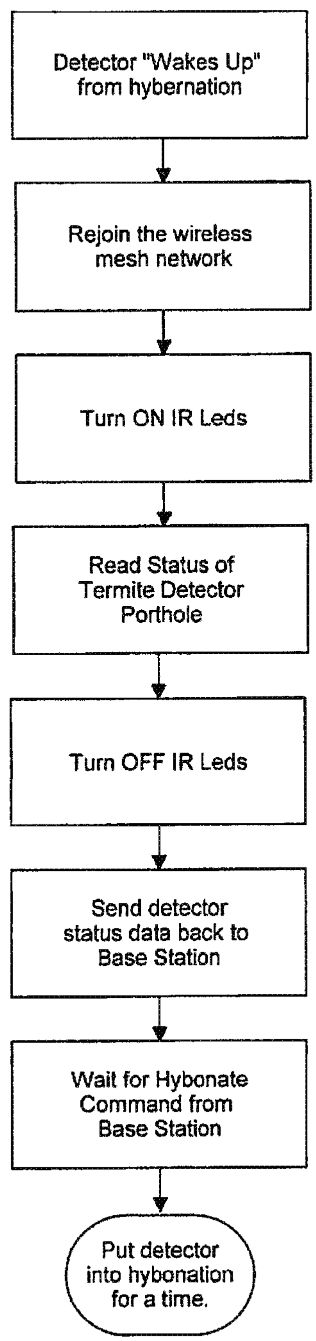
FIG. 15 is a flowchart illustrating general process for detector electronics.
Figure 16:
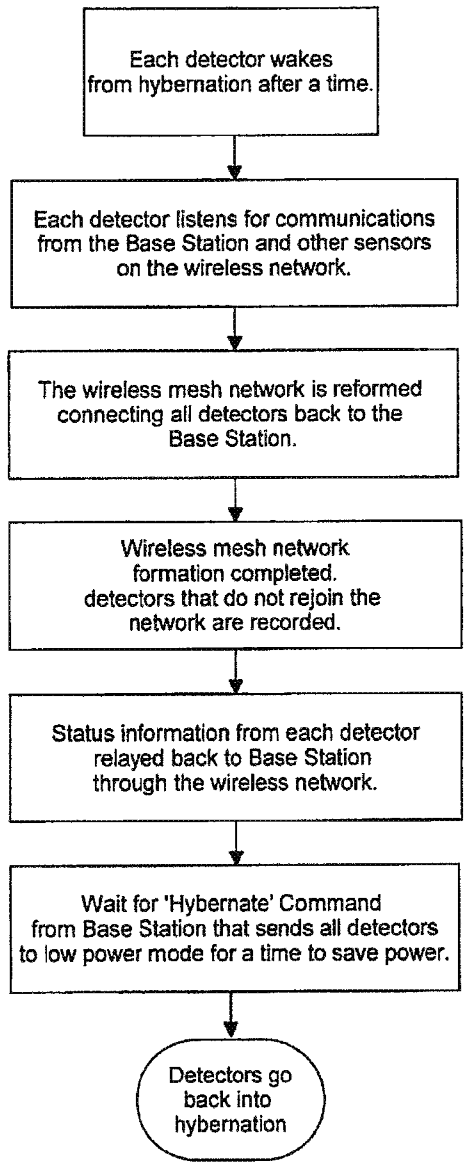
FIG. 16 is a flowchart illustrating general process for a wireless network involving multiple detectors and a base unit.
Figure 17:
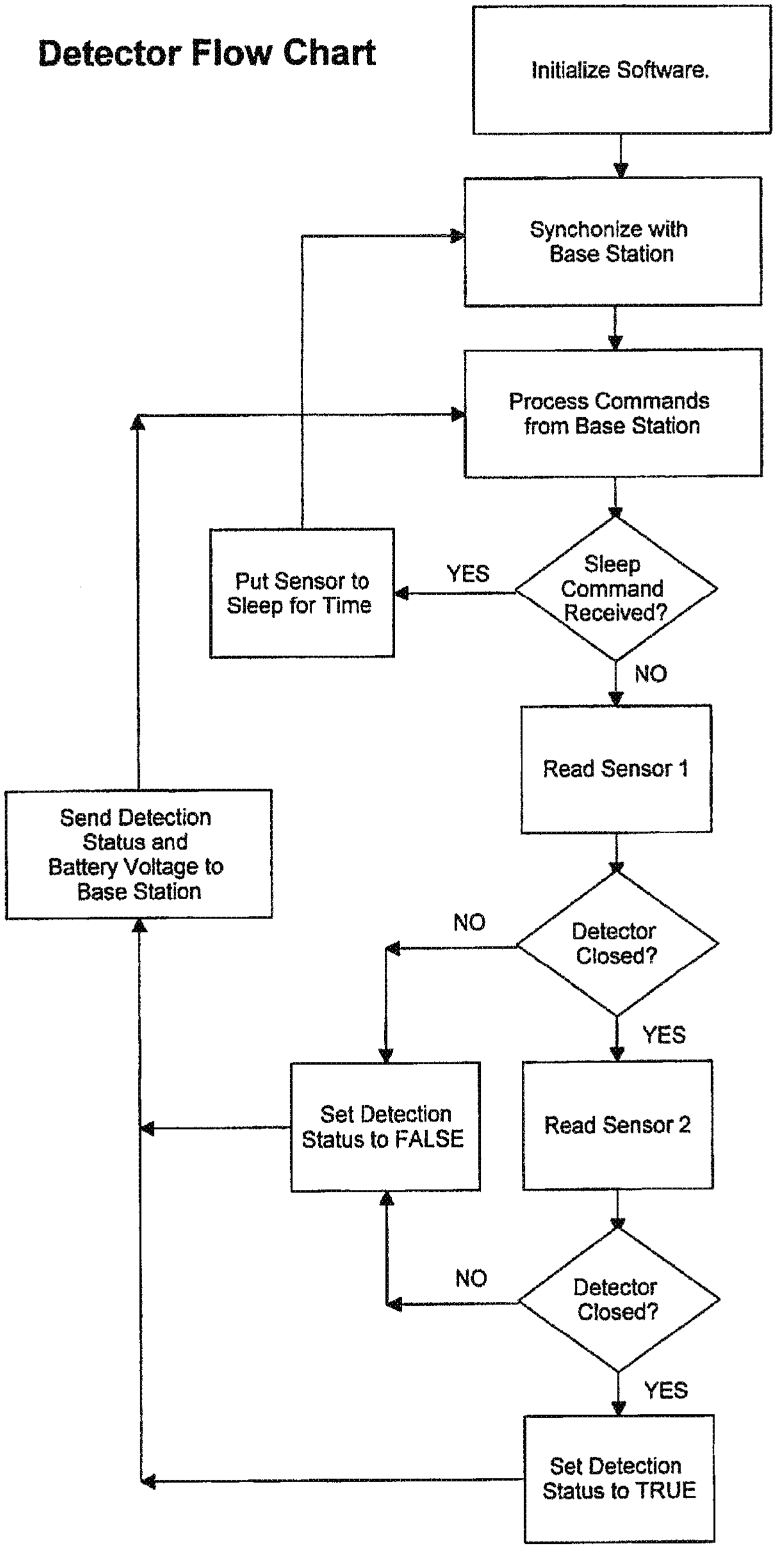
FIG. 17 is a flowchart illustrating software logic for a typical detector.
Figure 18:
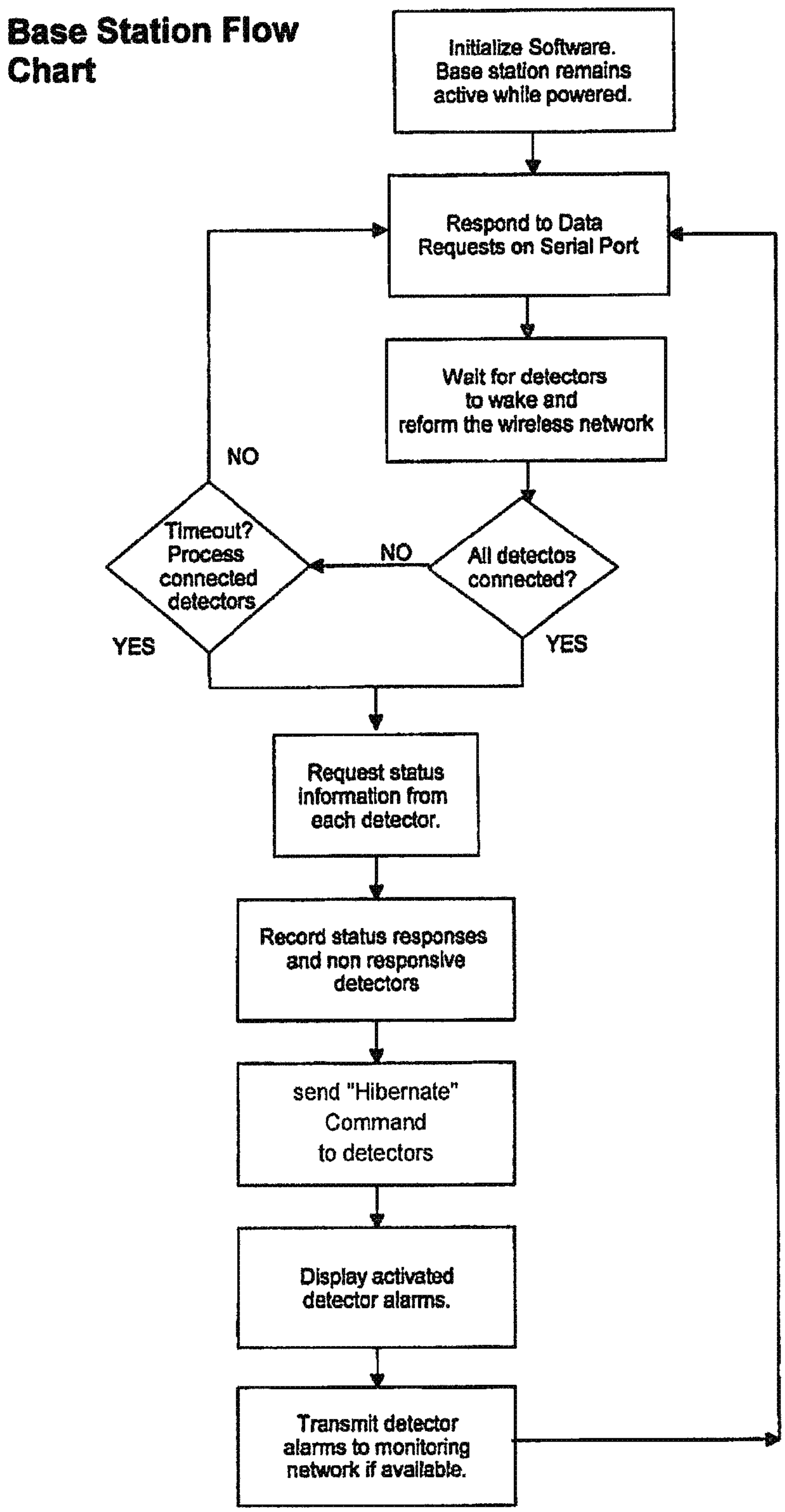
FIG. 18 is a flowchart illustrating software logic for operation of a base station.

Once a detector and a base station are set up as described the operation of the system in general is in accord with the process diagrams of FIGS. 15 and 16 while the general software logic is illustrated in FIGS. 17 and 18. The interaction between the detectors and base station are timed in accordance with a semi-autonomous timed sequence where detectors are woken either at timed intervals or could be woken by the base station. The detectors then run through a check sequence to join the network, verifying status and check for a positive detection of pests and then go to sleep/hibernate. This is the base procedure and unless a positive response is triggered from a detector then this process goes on indefinitely while ever there is power. Changes would occur if a detector was not working or low battery indications or other maintenance requirements arise. In its simplest form detector maintenance would arise in the case of a detector failing to join the network. FIG. 15 shows the detector process including the infra red LEDS and detection sequence and data being sent back to the base station in accord with the third last step in FIG. 16.

FIG. 17 is the software logic for a simple detector upon waking from the hibernation, this could be at say 24 hour intervals or even one week or more depending on the pest. In the present example where two sensors are being employed to reduce the possibility of false positives, a positive on the first sensor is a precondition to reading the second sensor so the software cycles the single sensor read until the sleep command is received from the base station. It will be appreciated that in its broadest form the second sensor could be omitted but applicant uses to sensors to reduce the likelihood of false positives.

While the detectors are ordinarily in hibernation the base station is active while powered. It may be that it is most often in a standby mode and is from time to time manually powered up or otherwise brought into action but when it does, its default process, when there is no positive pest detection, is to cycle through the process of registering detectors on the network, sending data requests, recording that data, displaying positive pest detection and where the base station is fitted for it, SMS or send other communication of a positive pest detection. Other data may also be sent. Once a positive is notified by the system appropriate action may then be taken to treat the pests. In the case of termites each monitor may have the capacity for intervention to bait the monitor without overly disturbing the termites and in the usual way, thus eliminating the nest from which the termites originate.

In the preferred embodiment the IR detectors set in the modular sealed unit as described has many advantages and applications in a wide variety of applications. Examples are given in FIGS. 19 to 33 showing typical arrangements corresponding to the units 13 in the previous embodiments.

Figure 19:
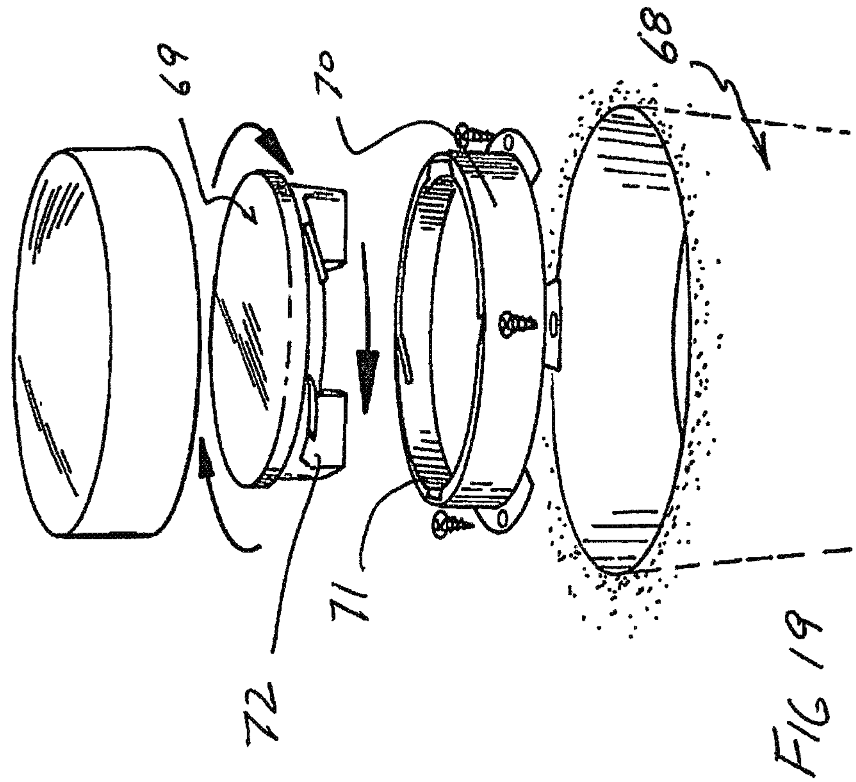
FIGS. 19 through 25 illustrate examples of traps or monitors showing various possible arrangements employing a module in above and inground situations.
Figure 20:
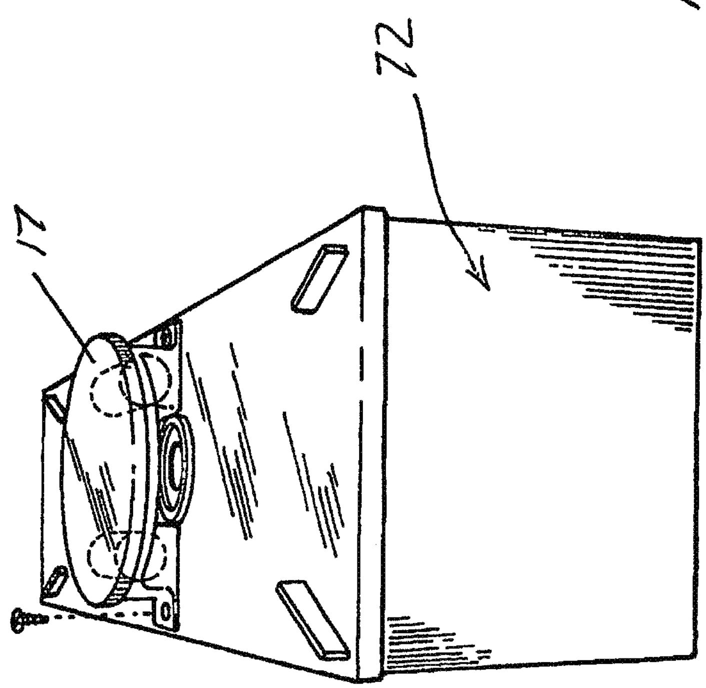
Figure 21:
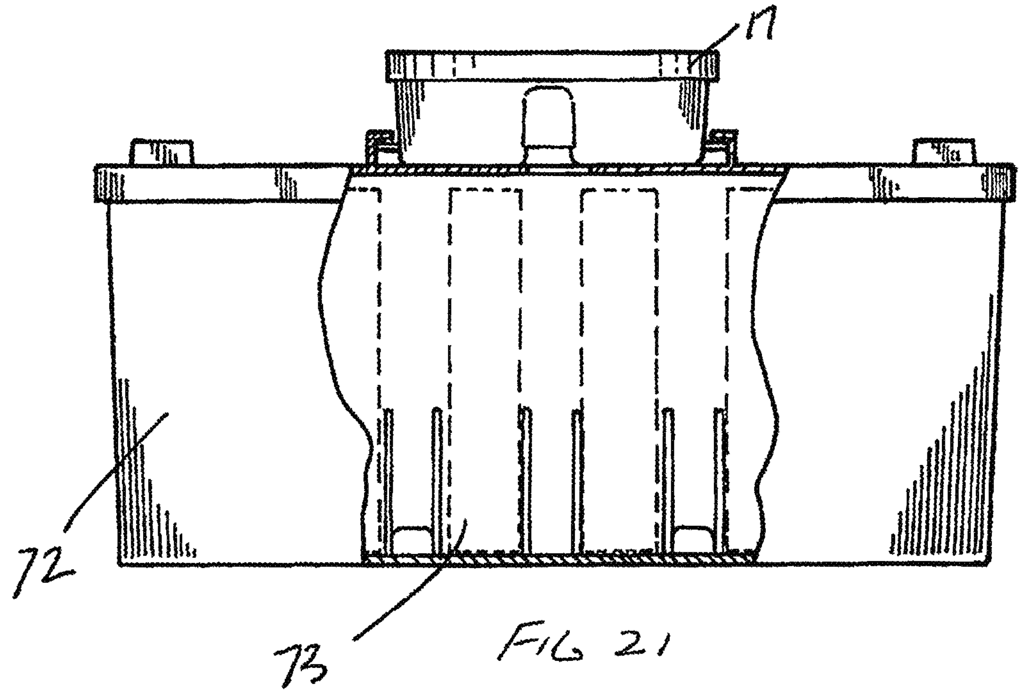

FIG. 19 illustrates an exploded view, a retrofit of an existing inground monitor 68 with a sensor assembly comprising a module 69 (equivalent to module 17), there being an adapter collar 70 which is mounted in the existing unit, the collar 70 has an internal thread or bayonet fitting at 71 and the module 69 has an equivalent fitting at 72 so that the module may be secured in place and then a cap is applied to cover the assembly. Thus the module may be easily removed to gain access to the interior for reloading the inground monitor with attractant or charging it with bait.

Figure 22:
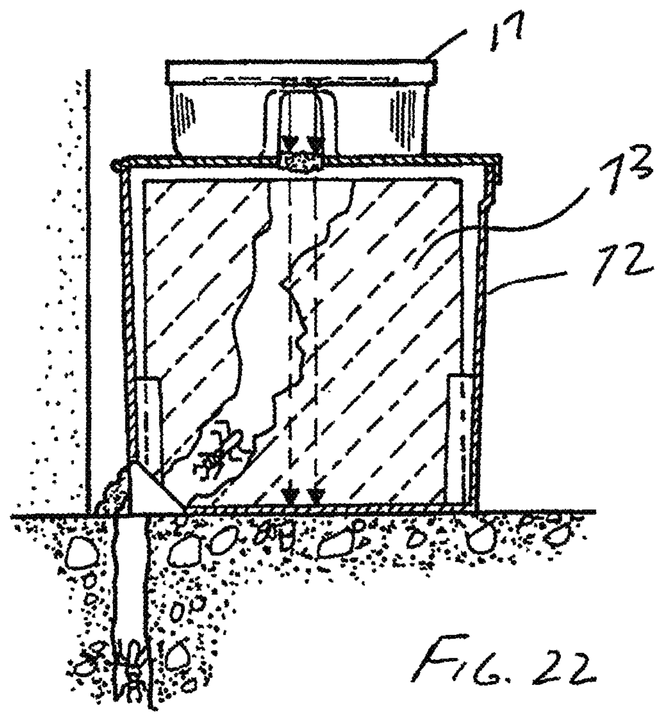
Figure 23:
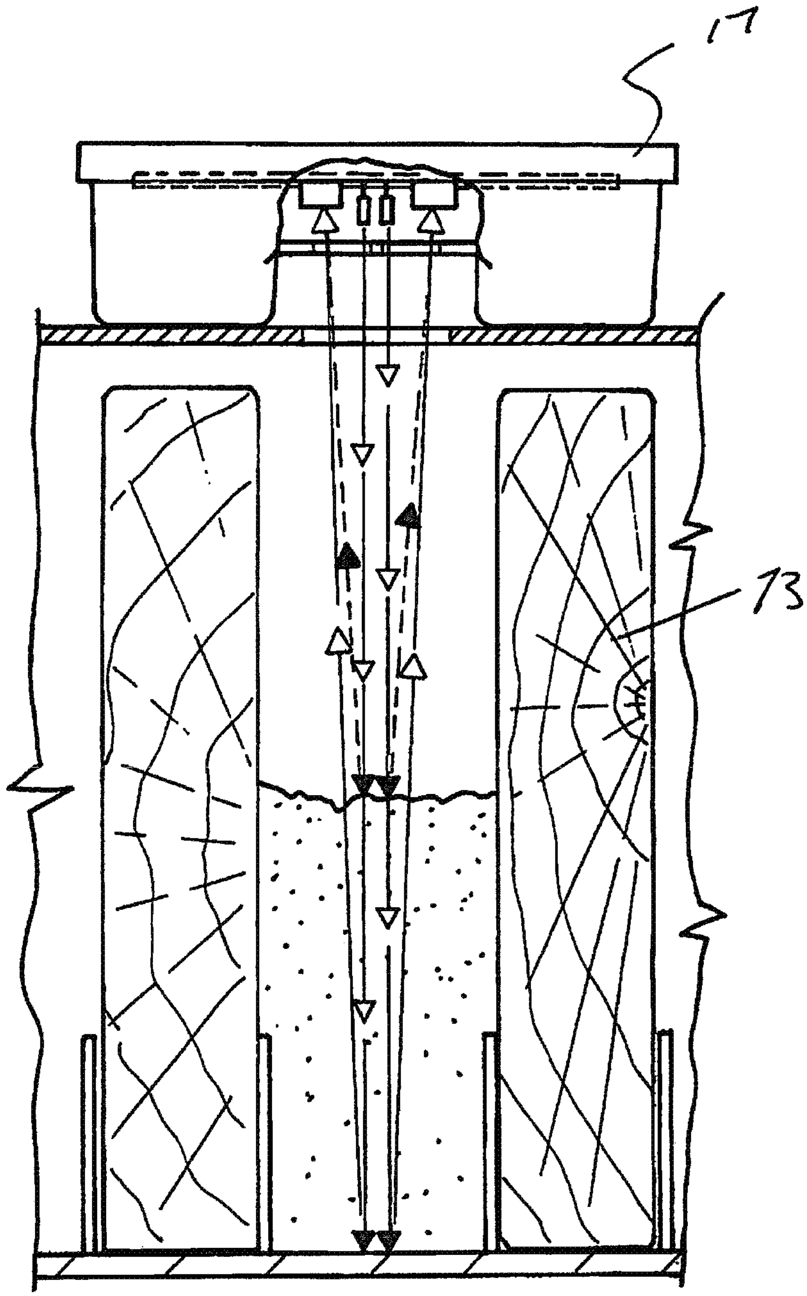

FIGS. 20 to 23 are drawings showing an above ground monitor box 72 with sensor assemblies 17 fitted in various ways, with attractant in the form of timber slats 73, FIG. 22 showing termites having sealed the opening 74 and the reflected signal thereby being detected and a positive signal indication being provided.

Figure 24:
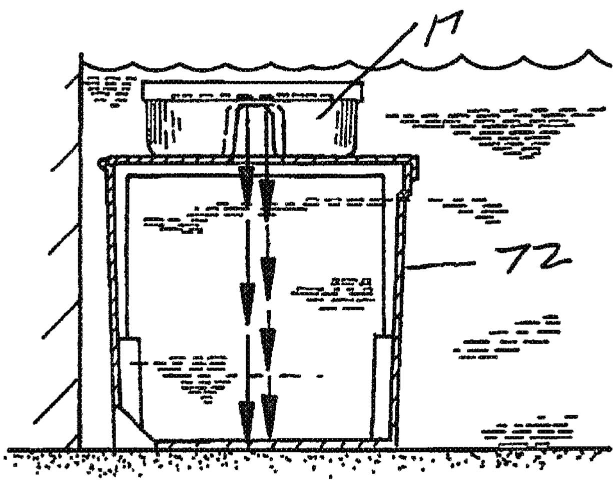

FIG. 24 serves to illustrate the effect of rising water in so far as the sensor assembly 17 is sealed so that it will continue to operate and second the use of IR means that there will be no false positive as the IR will simple be absorbed. it follows that the invention will work in cases of inground units where storms may give rise to temporary filling of the monitor.

Figure 25:
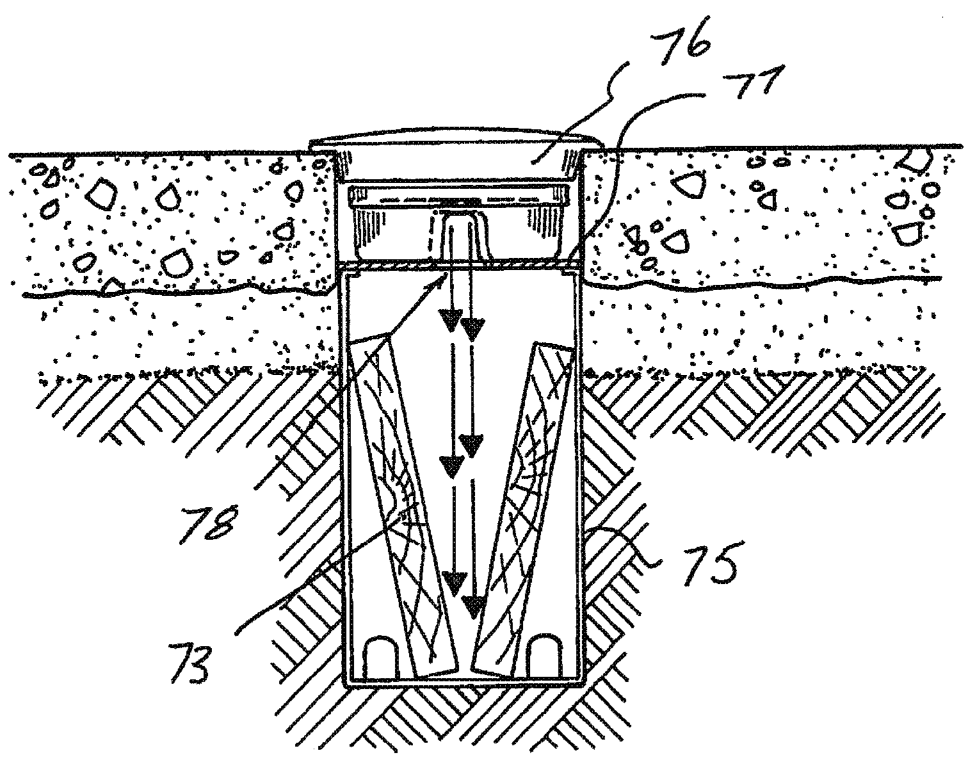
Figure 30:
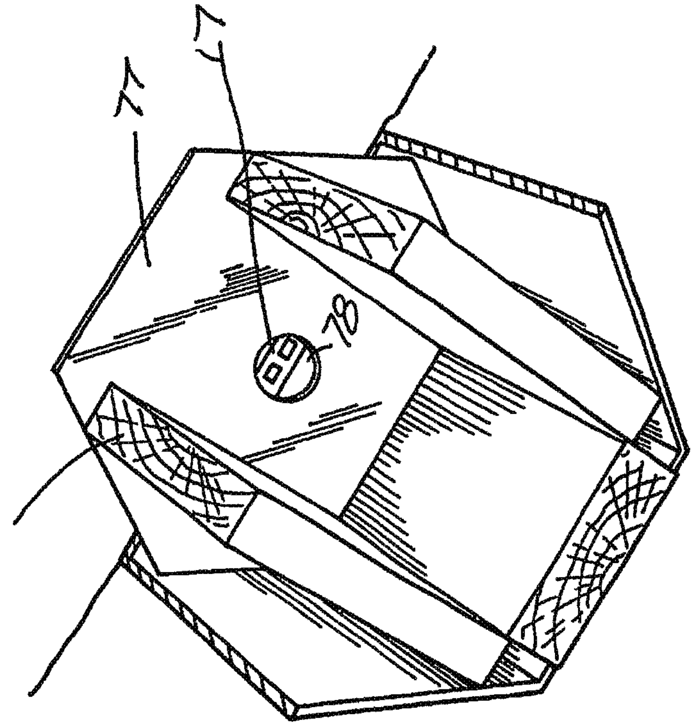
FIGS. 29 and 30 show a further in ground embodiment.
Figure 29:
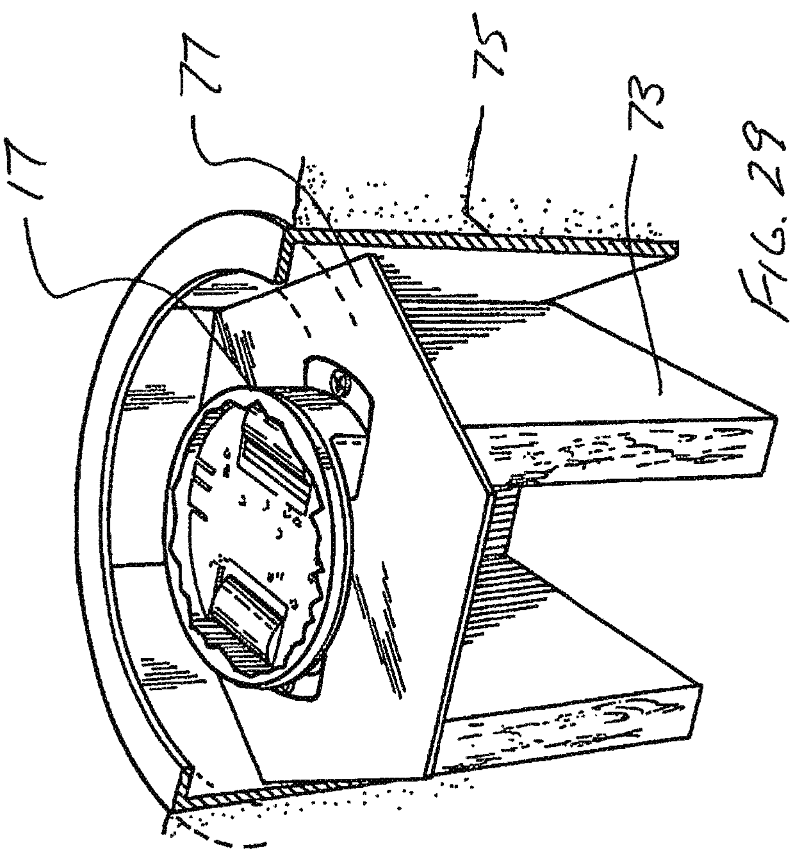
Figure 31:
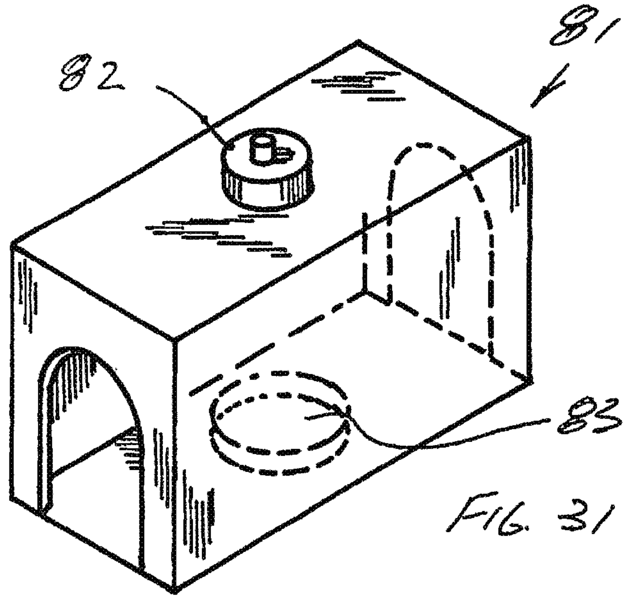
FIGS. 31 to 33 illustrate application of the present invention to rodents.

FIG. 25 illustrates a simple inground monitor 75 which ordinarily would be inspected manually by lifting cap 76, in the present case a disc 77 is provided cut to fit the opening in the tub, the disc 77 having a central hole 78 and then a sensor assembly 17 is located on top of the disc. Termites will block off the hole 78 and be detected. FIGS. 29 and 30 illustrates a similar arrangement, like numerals illustrate like features.

Figure 26:
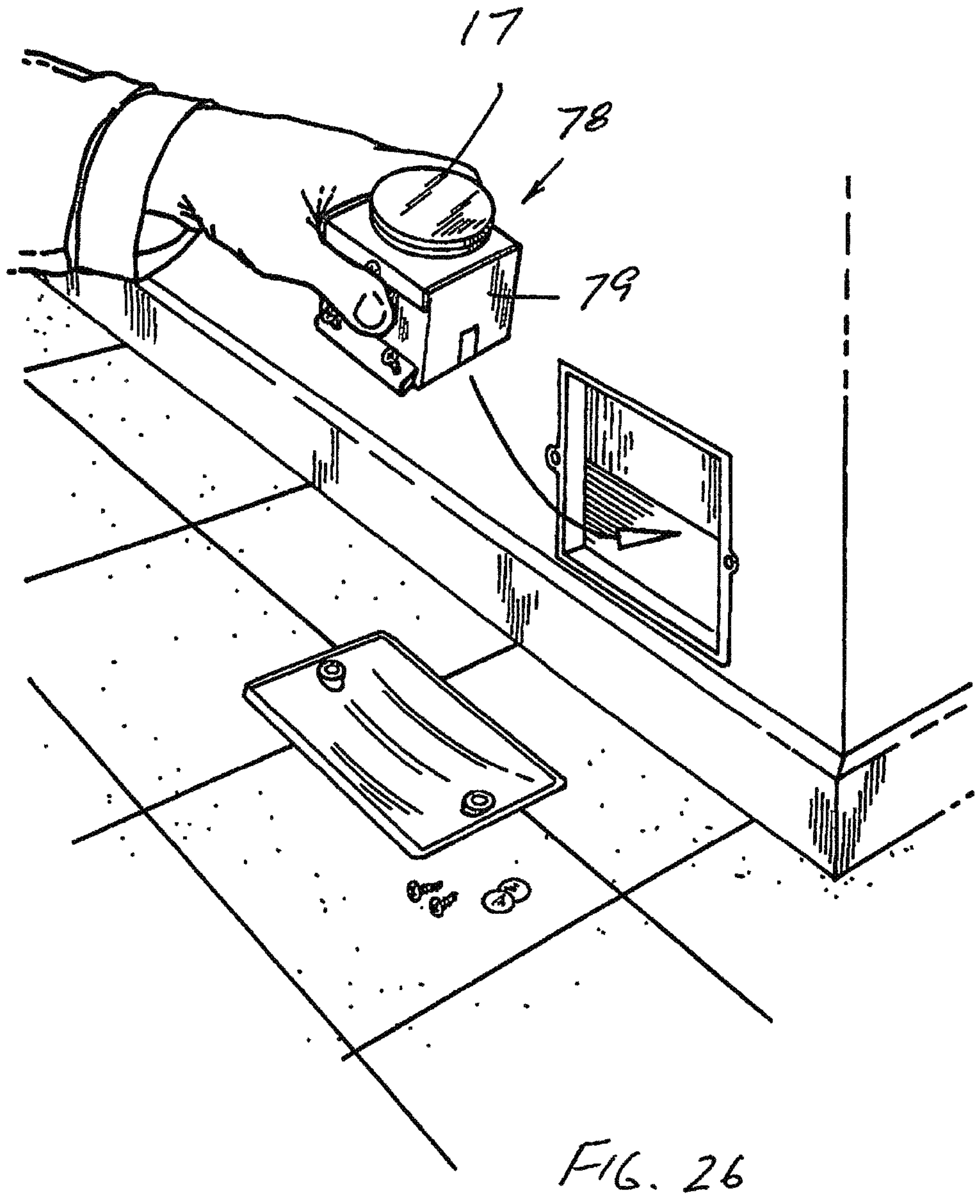
FIGS. 26-28 show an embodiment for use in a wall cavity of a building.
Figure 28:
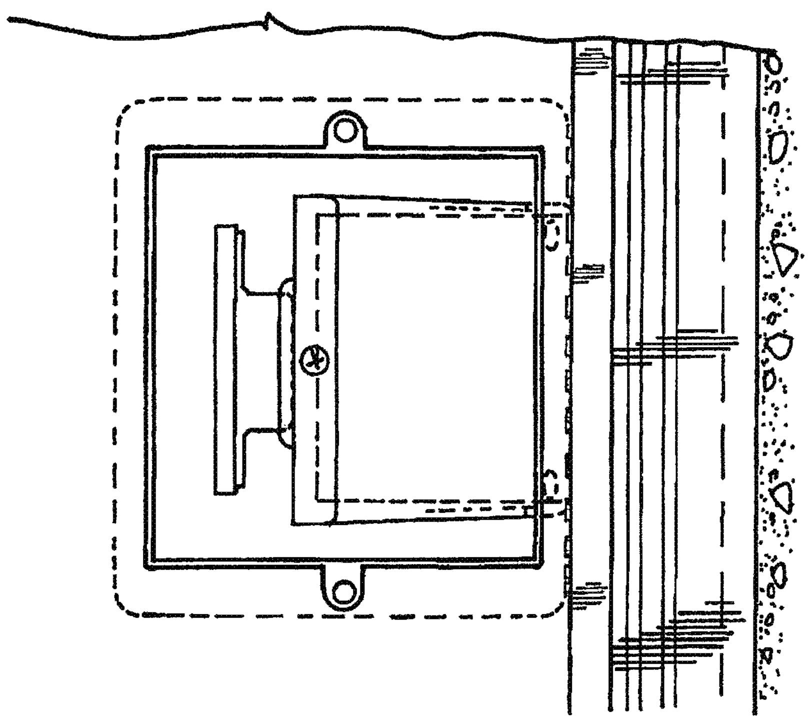
Figure 27:
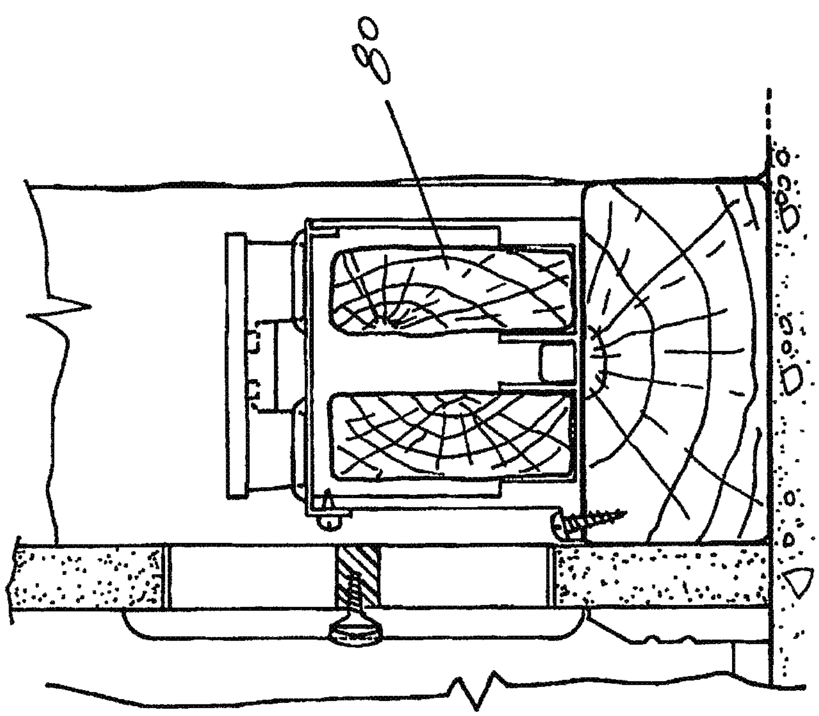

FIGS. 26 to 28 illustrated a monitor and sensor assembly unit 78 which includes a sensor assembly 17 and a monitor base box 79 holding timber attractant slats 80. The assembly may be secured in wall cavity as shown and a cover plate applied to the wall and then effectively forgotten by the home owner.

Figure 32:
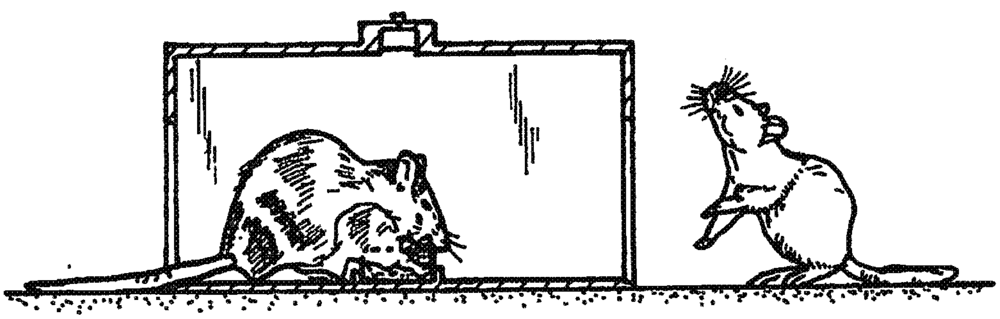
Figure 33:
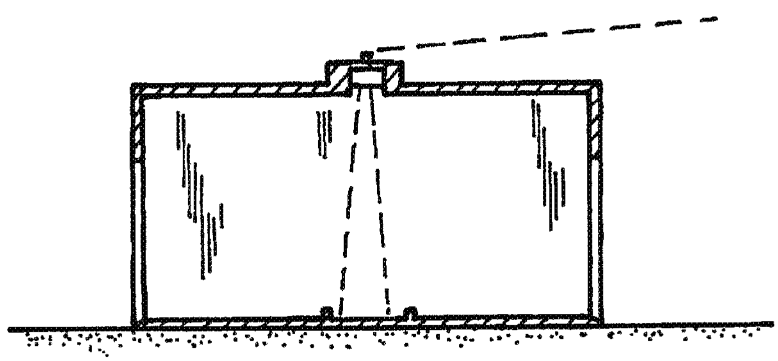
Figure 34A:
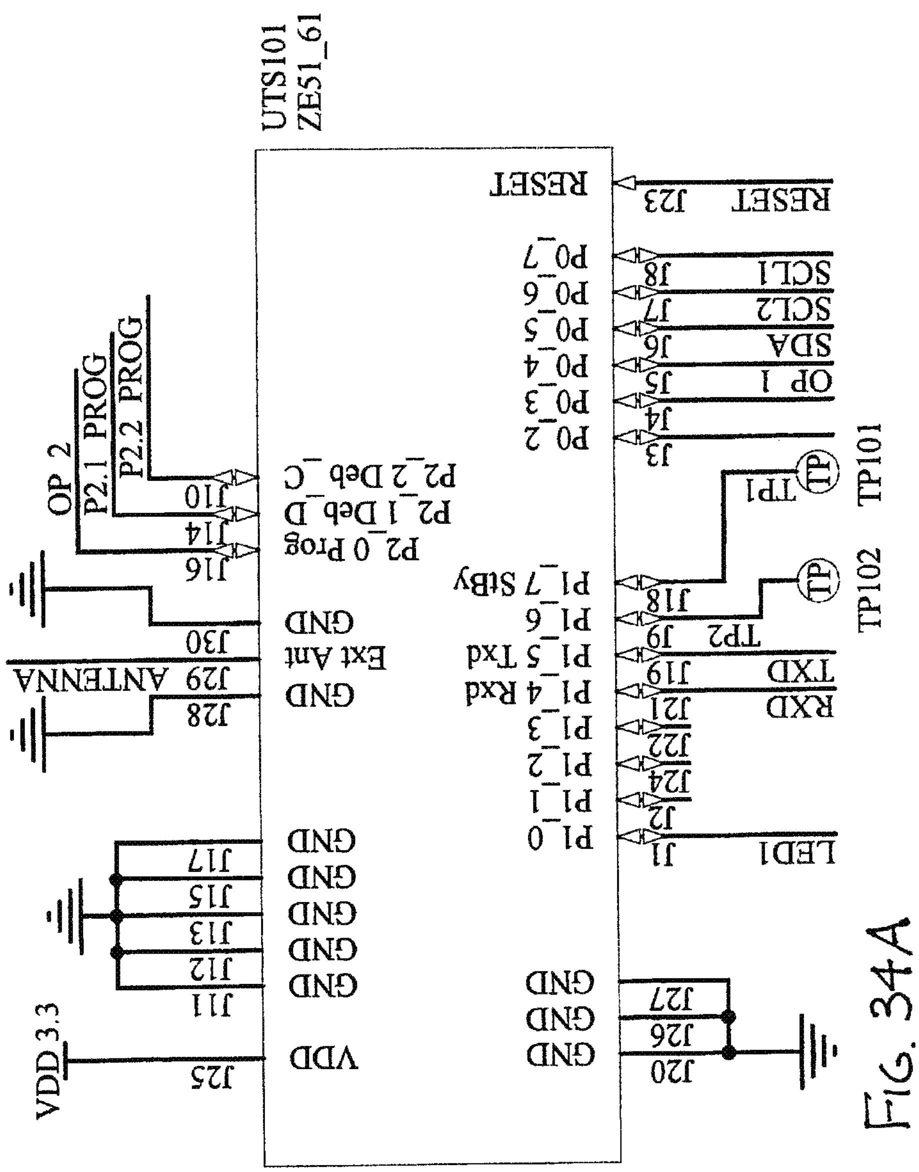
FIG. 34A-38F describe a further embodiment of the present invention involving modification of the electronics in previous embodiment to reduce the number of components for economy and efficiency. In addition this embodiment fundamentally differs in terms of user level control and access by change to the base station and how data is processed at the higher level. In all other aspects the embodiment is materially the same.
Figure 34B:
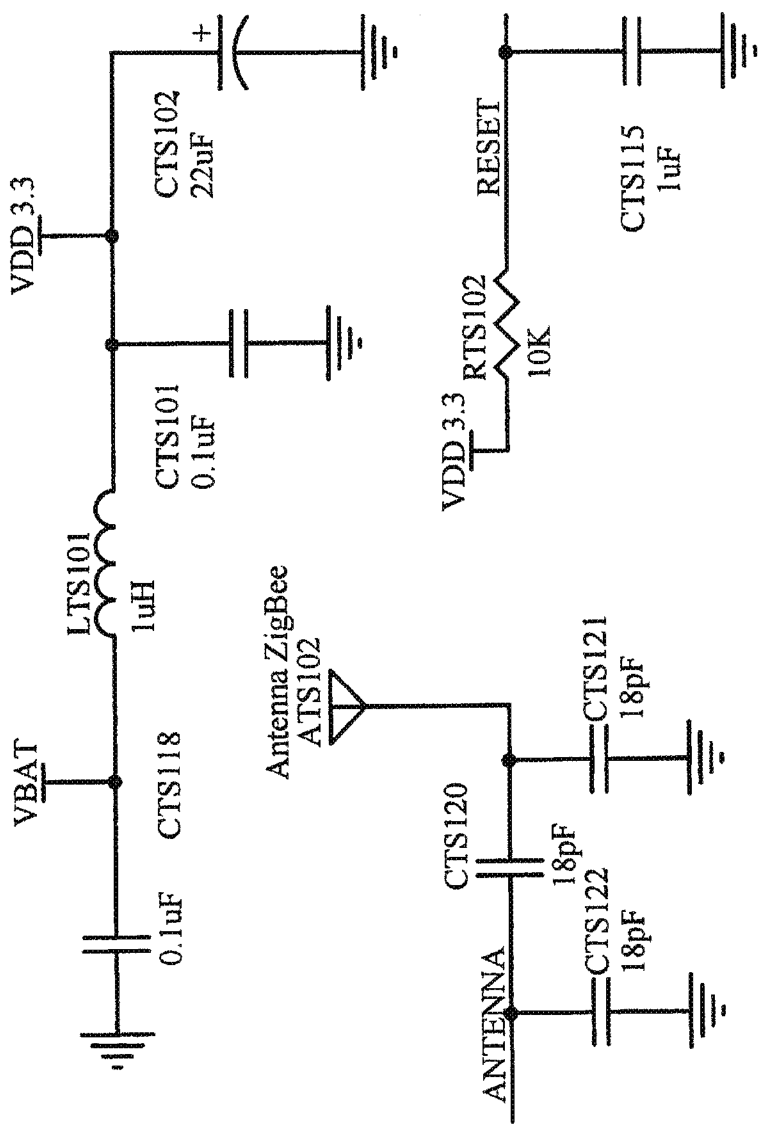
Figure 34C:
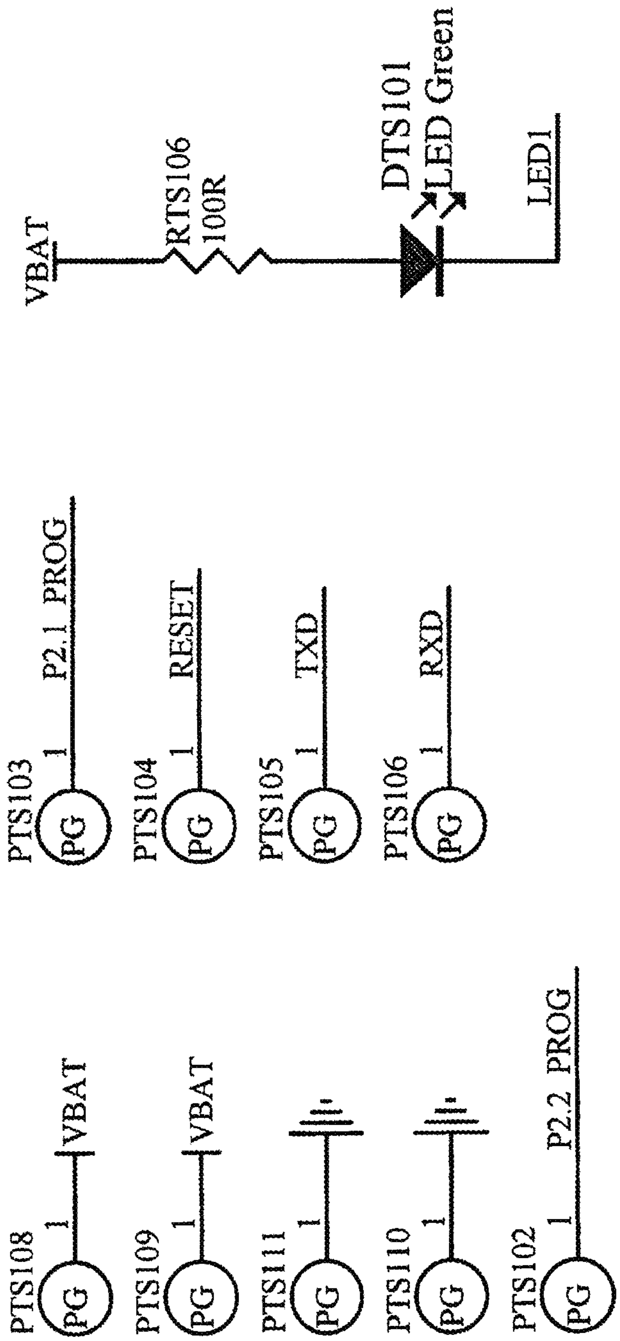

There may be many variations on this arrangement depending on the types of pests being detected. For example, in the case of termites a methane detector may be a variation, and as long as a signal may be generated to provide the required input signal then the remainder of the described invention will operate while reducing the risk of false positives. Thus there may be sensor using light in combination with a gas sensor. A typical methane sensor might be a Dynament Ltd TDS 0068 or TDS 0069 or a Hanwei MQ-2. Further while the invention has been described with particular reference to termites other pests may be detected, for example in FIGS. 31 to 33 rats are detected using a housing 81 having a sensor assembly 82 which is similar to sensor assembly 17 save that it detects the absence of a bait tablet 83 after it has been digested by the rats as shown in FIG. 32. Thus when the bait tablet or food has been eaten a positive signal will be transmitted and processed in the same way as described, This may indicate the presence of the rats and the need to replenish the bait.

Referring now to FIGS. 34A through 58 a further embodiment of the present invention is described. In FIGS. 34A through 35B as an alternative to the detector arrangement of FIGS. 10A through 11D where in this embodiment a Zigbee module is used as produced by Telit Wireless Solutions and part of the Telit Communications PLC headquartered in London but with offices worldwide. The Zigbee module is a Telit ZE51 or ZE61 module which incorporates within the module many of the external functions previously described and used in relation to the CC2530 which is incorporated within the ZE51.

Figure 35A:
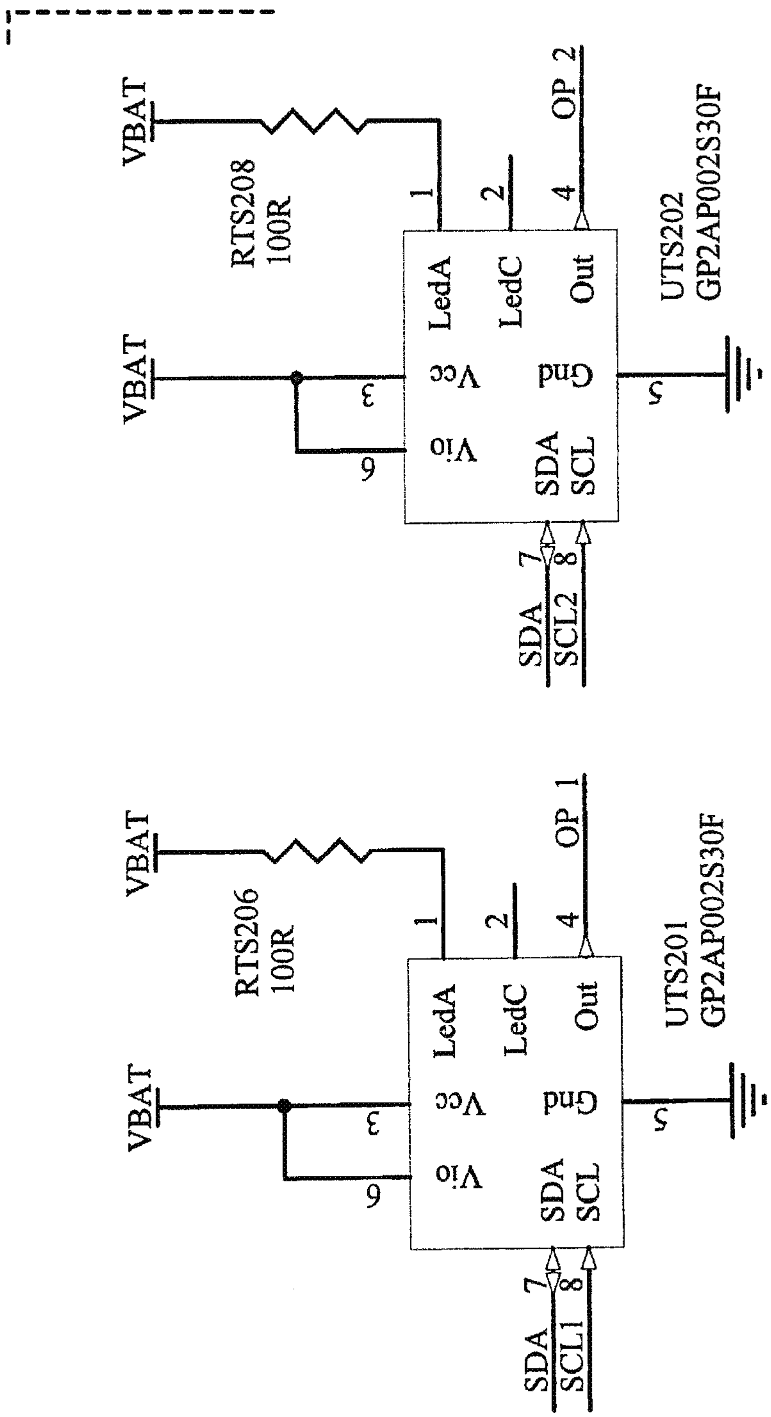
Figure 35B:
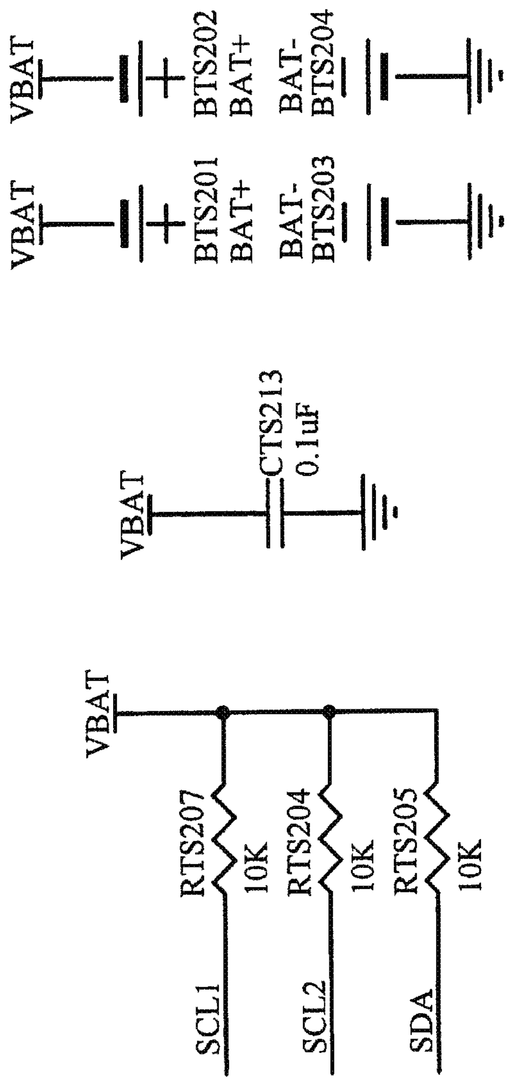

In conjunction with this embodiment rather than using the diodes used in the earlier embodiment this embodiment utilises surface mounted packaged units illustrated in FIG. 35A and utilises Sharp® GP2AP002S30F which provides a digital detection system integrating into one package the light emitting element and the light receiving element. This device drastically reduces load current consumed by applying a light modulation system as a compact size and in the present embodiment is mounted as a surface mount to the bottom of the PC board. It replaces the LEDs and receivers previously illustrated as these both provide a send and receive function. The operation of the module of FIG. 34A connected in the circuit in conjunction with FIG. 34B, which illustrates the attached Zigbee antenna, and with the detectors programmed in accordance with the manufacturer's recommendations, in accordance with the configuration of FIG. 34A utilising the circuit structure and power supply as illustrated in FIG. 35B, enables an alternative to the preceding embodiments but used in the same module as in FIGS. 4 and 5. The outcome is the same, sensing a target as described and communicating a positive.

Figure 36A:
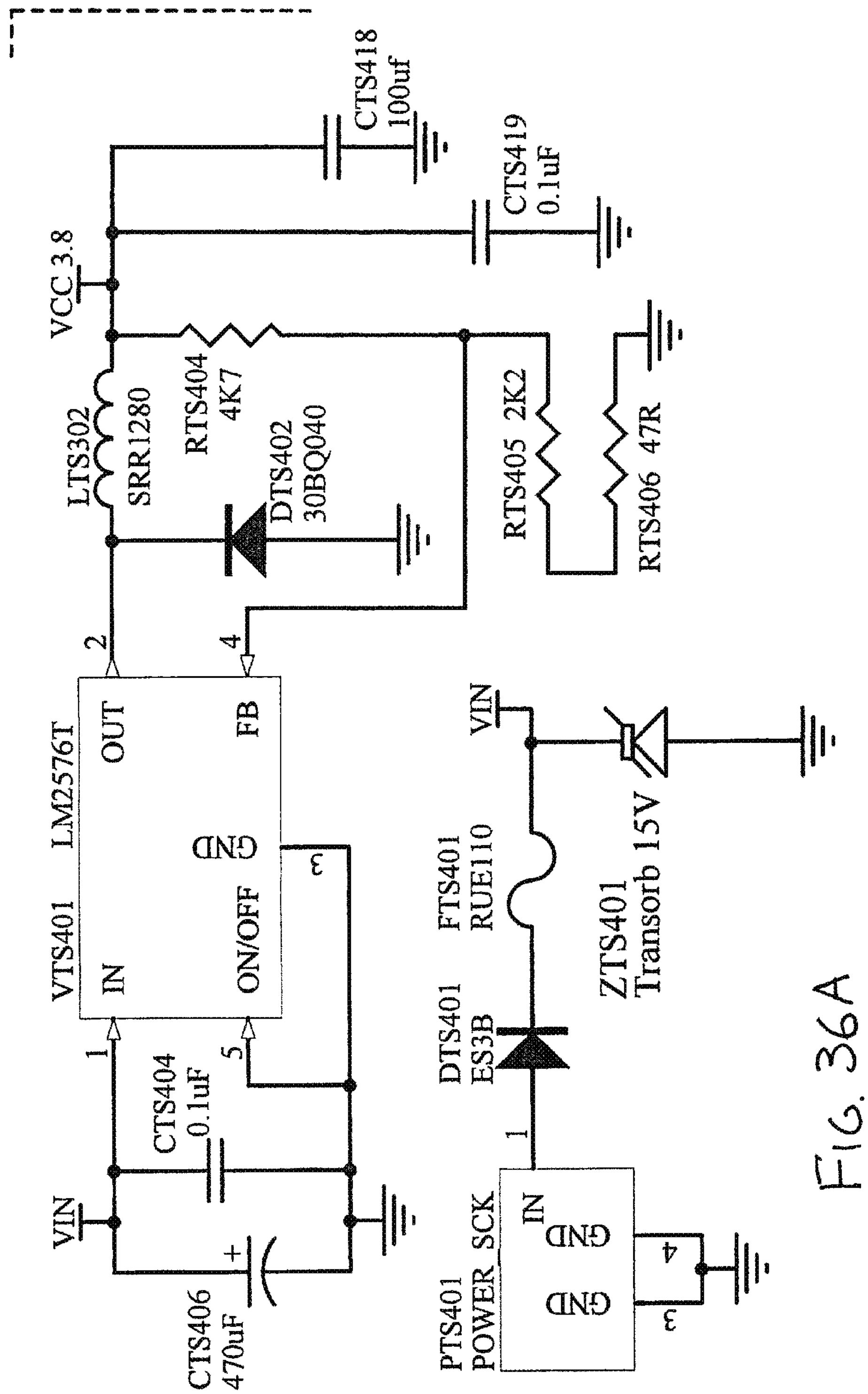
Figure 36B:
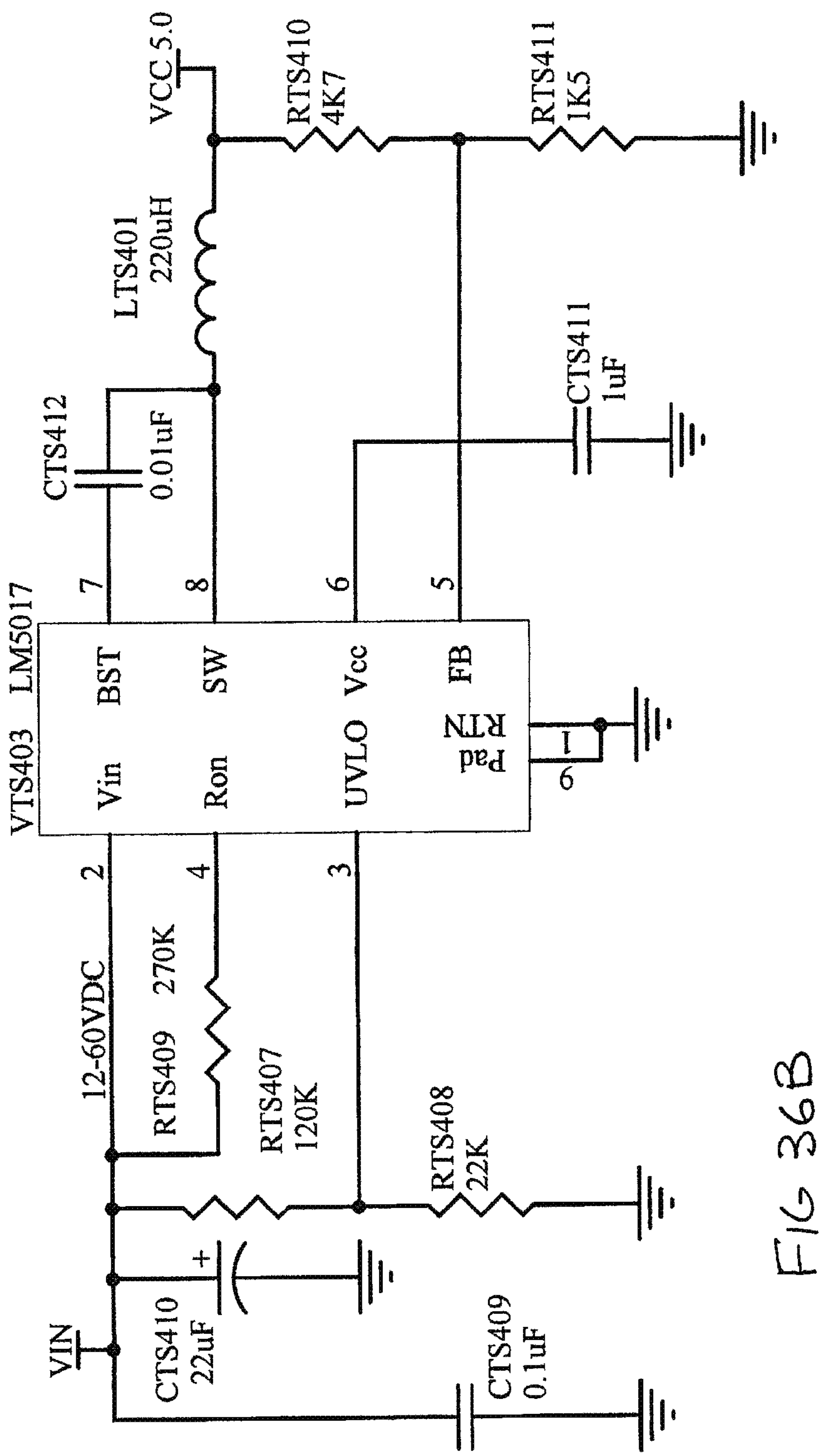
Figure 36C:
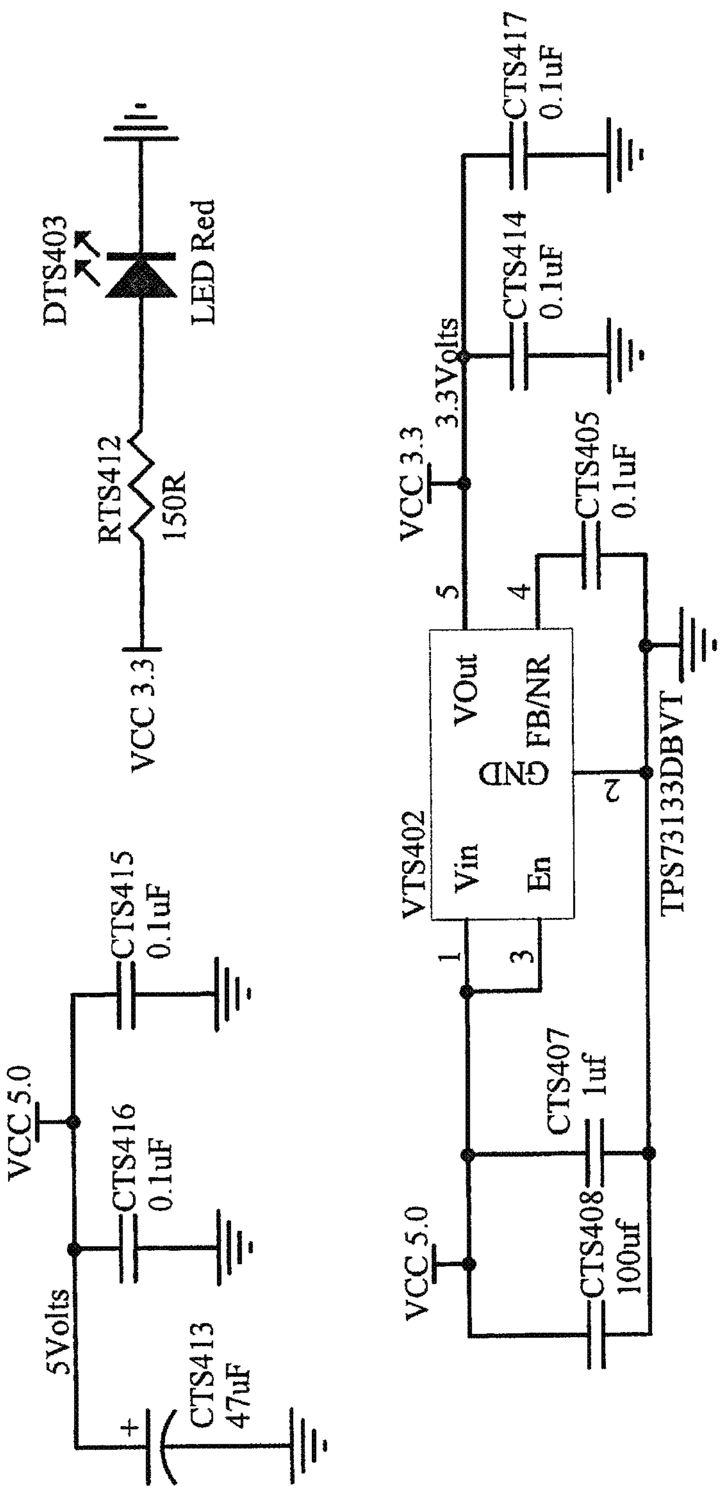

FIGS. 36A through 36C illustrates applicable power regulators to provide power to the circuits illustrated and in FIG. 36A as Texas Instruments LM2576T is used to provide a 3.8 volt supply. In FIG. 36B a Texas Instruments LM5017 is used to provide a 5 volt supply and in FIG. 36C a Texas Instruments TPS73133DBVT low drop out regulator with reverse current is used to provide the 3.3 volt output.

Figure 12A:
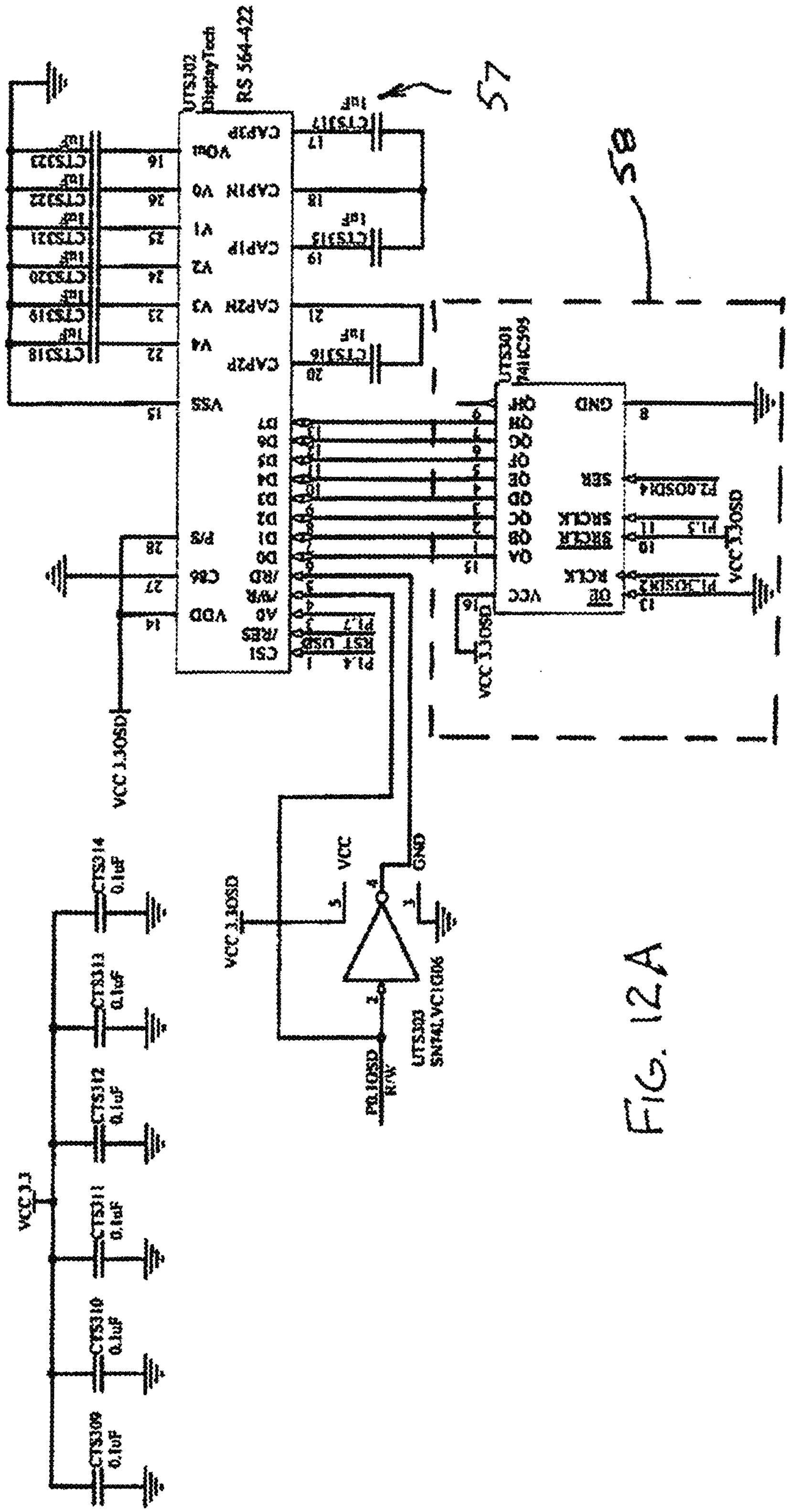
FIGS. 12A-14C are circuit schematics suitable for implementing the base station setup of FIG. 9B.
Figure 12B:
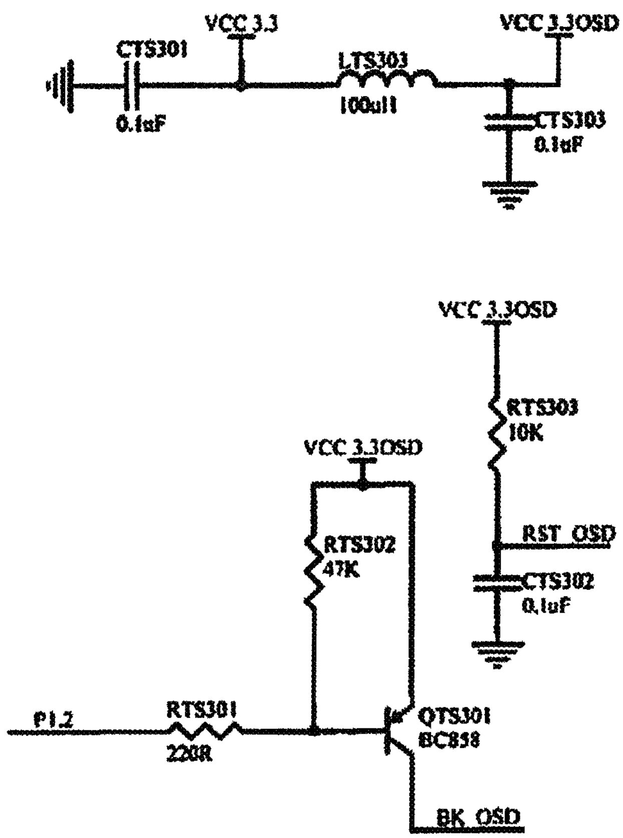
Figure 12C:
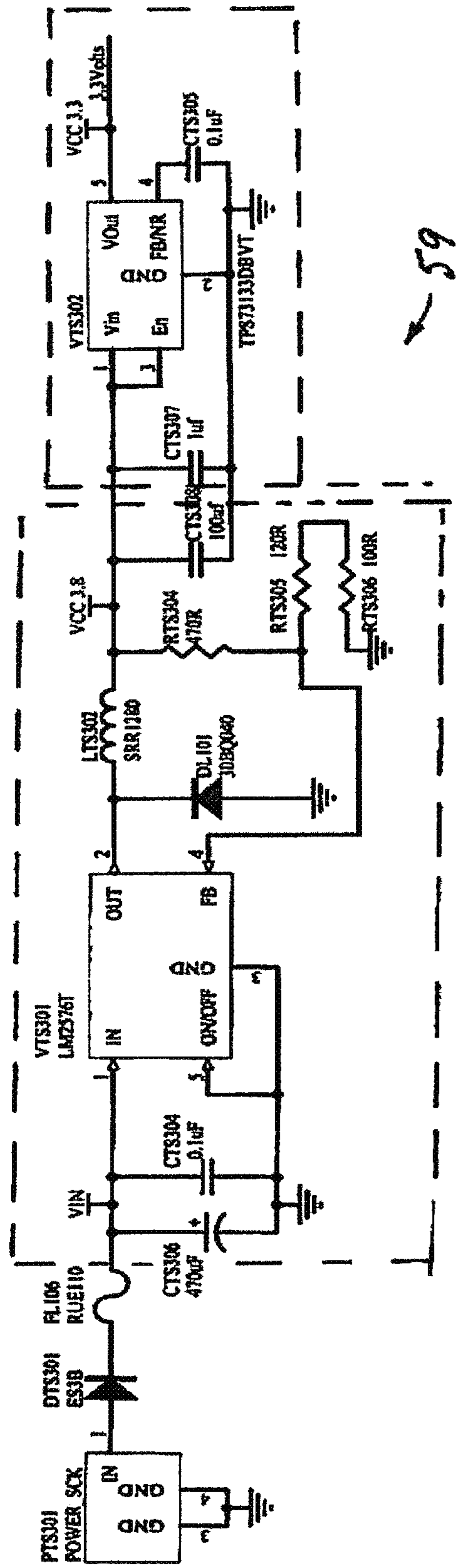
Figure 13A:
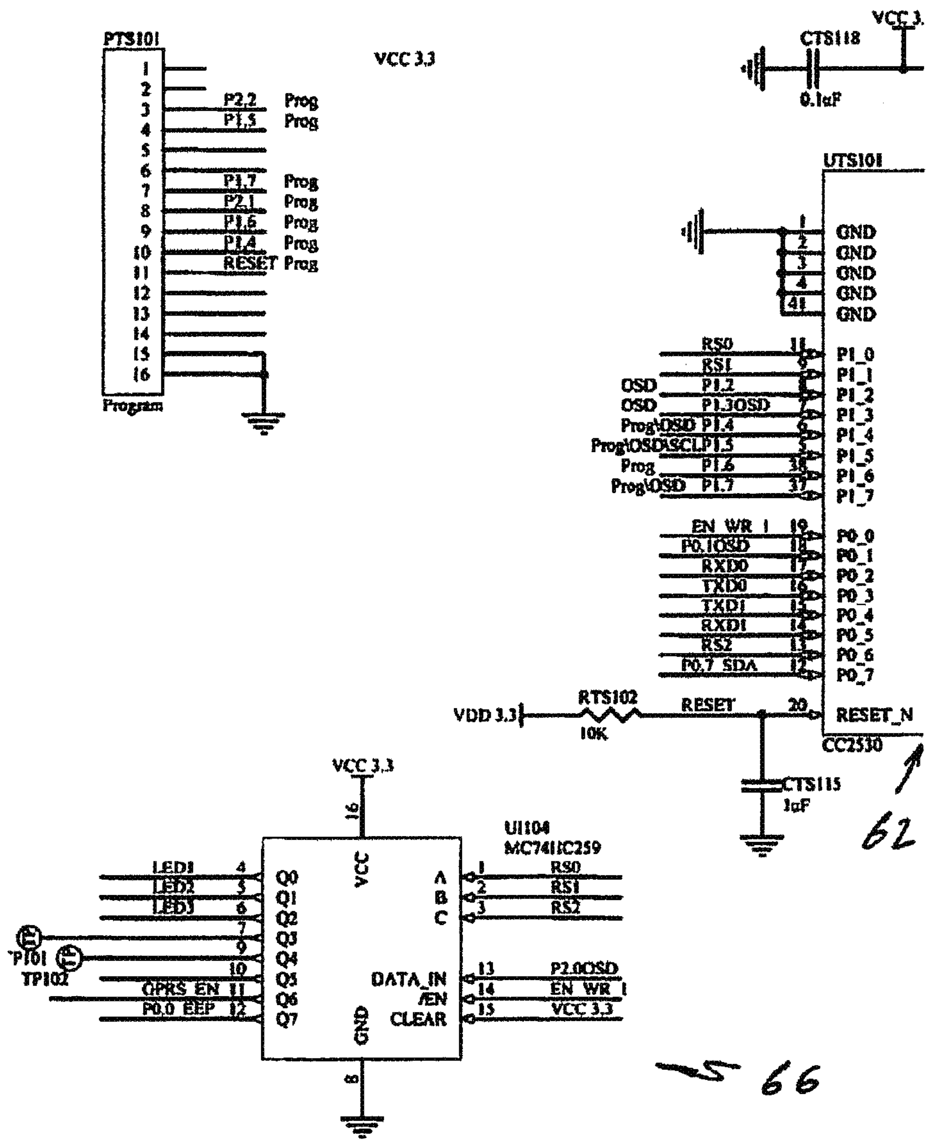
Figure 13B:
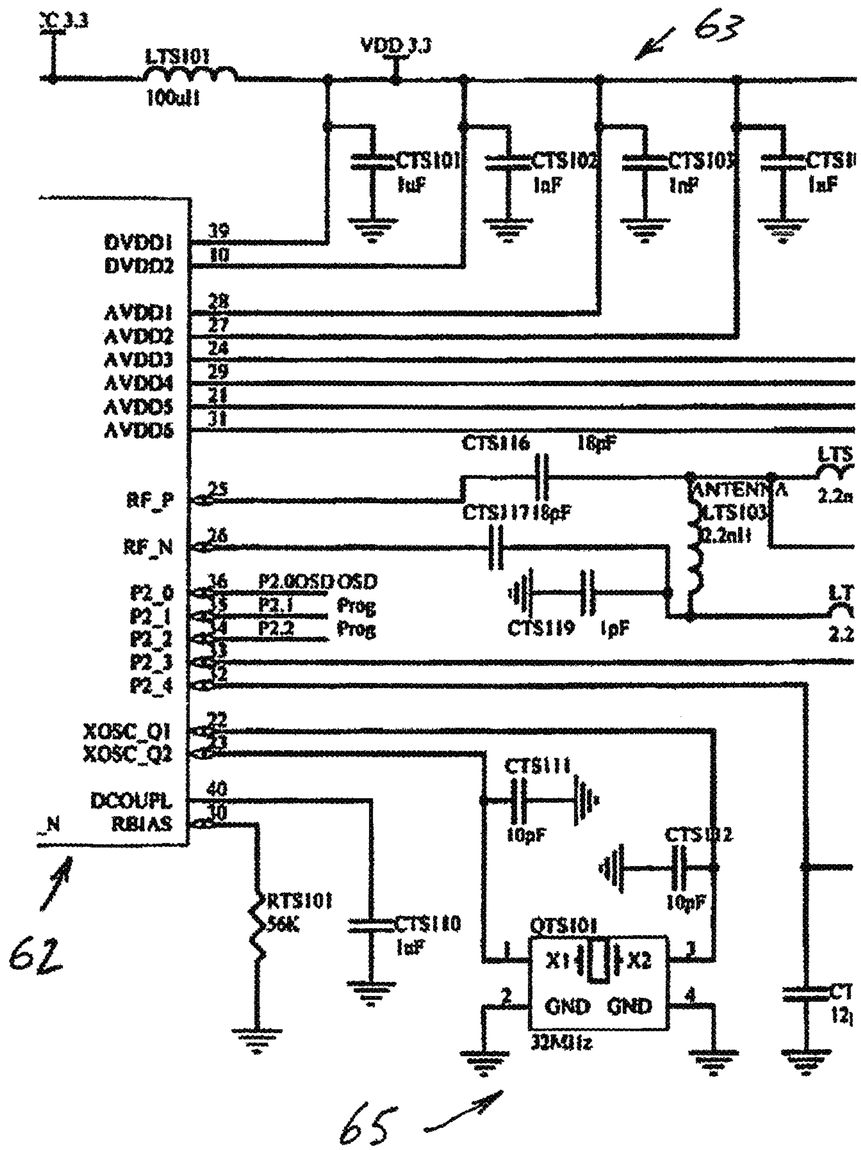
Figure 13C:
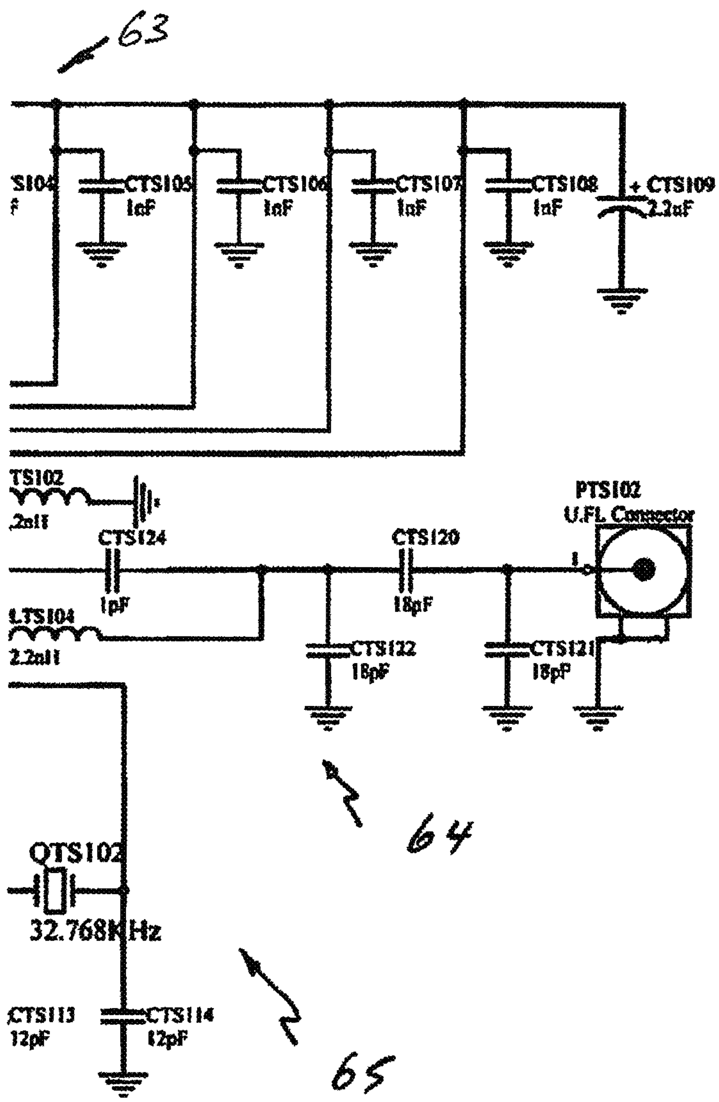
Figure 36D:
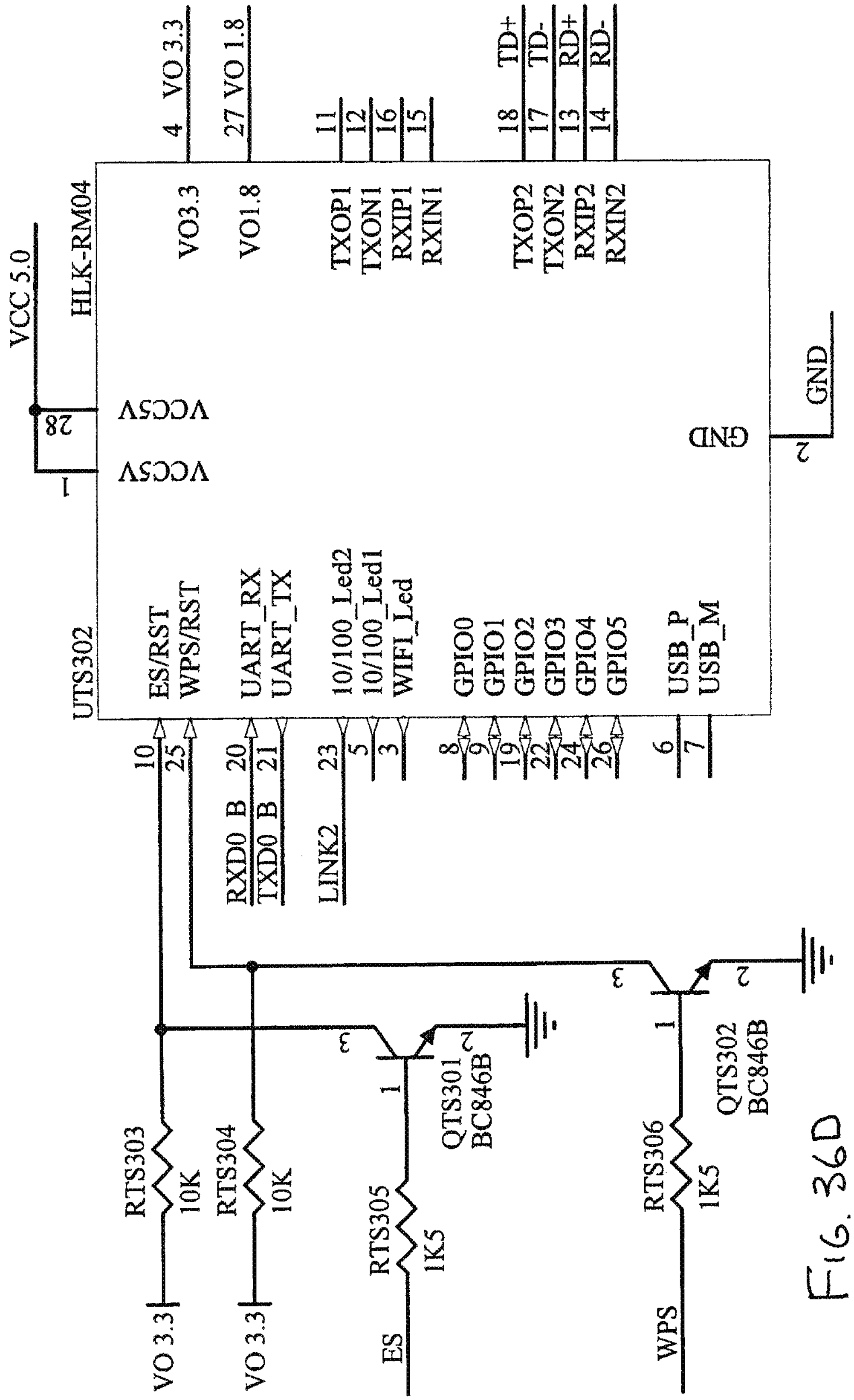
Figure 36E:
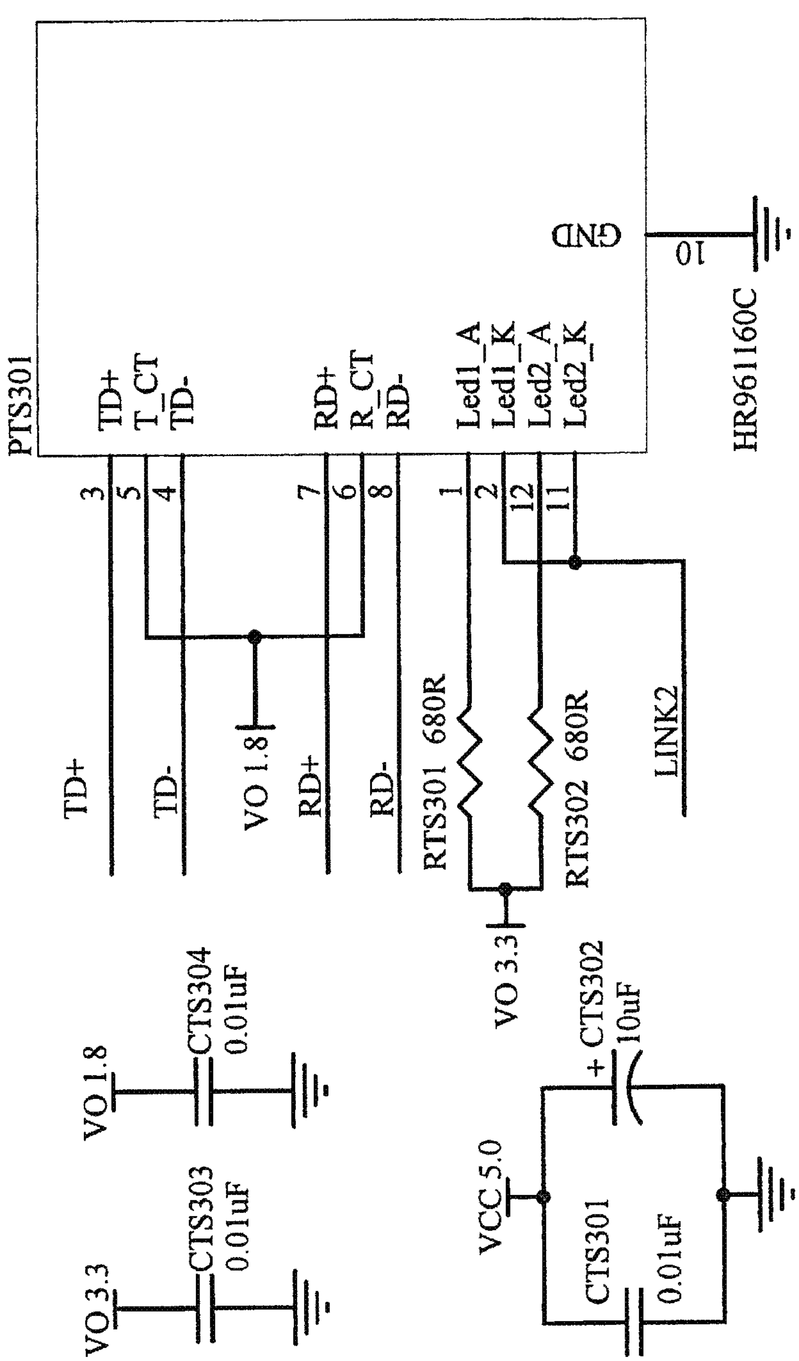

These voltages are supplied to a wi-fi module illustrated in FIG. 36D and unlike the previous embodiment the display arrangement of FIG. 12A in the base station has been omitted and in this case the base station operates in the same way in terms of communicating locally with each of the detectors but provides a wi-fi function for local programming and an ethernet connection illustrated in FIG. 37E utilising a HR961160CRJ45 ethernet connector so that the base station operates when connected to a local router for access to the internet. The HLK-RM04 is a module developed by Shenzhen Hi-Link Electronic Company Limited.

Figure 37A:
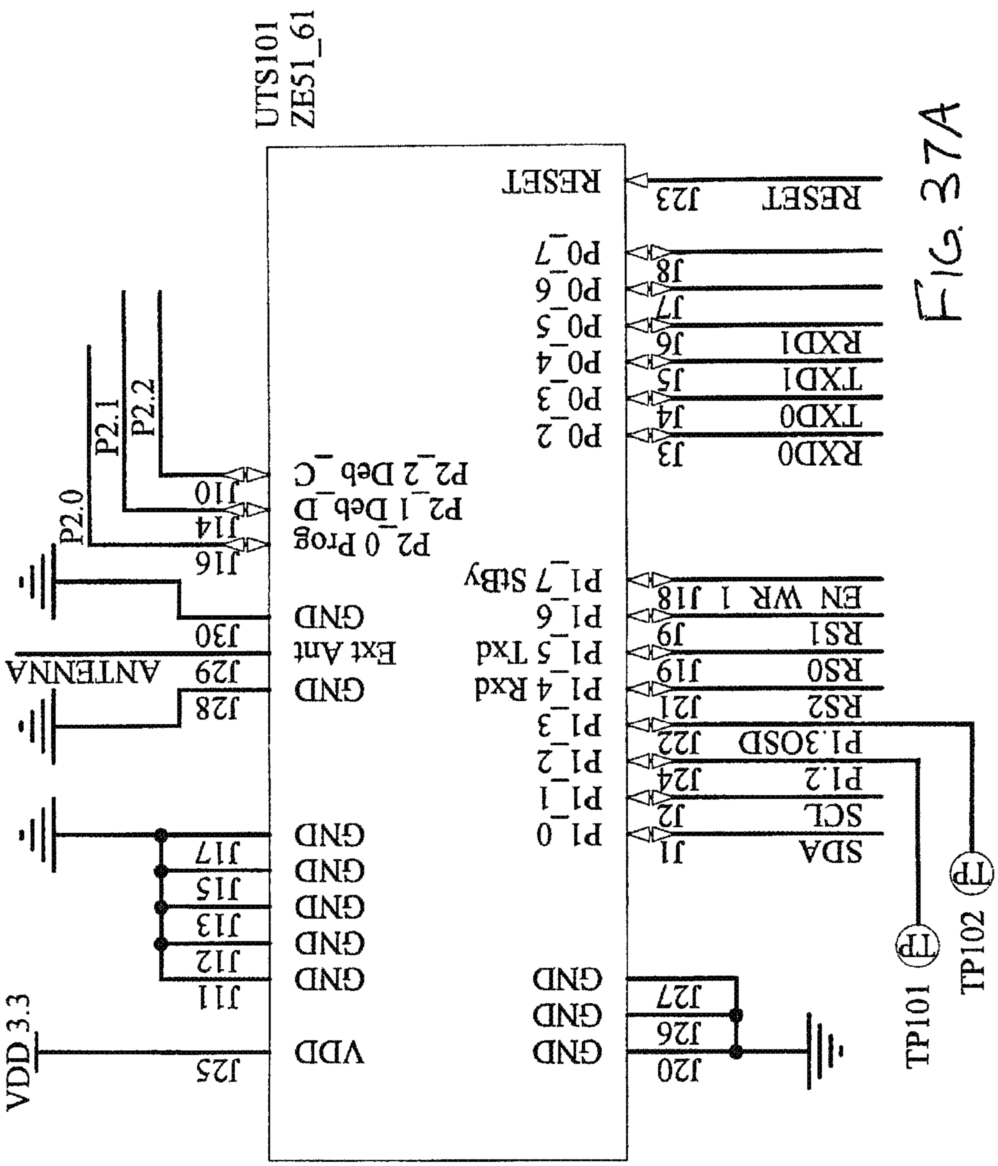
Figure 37B:
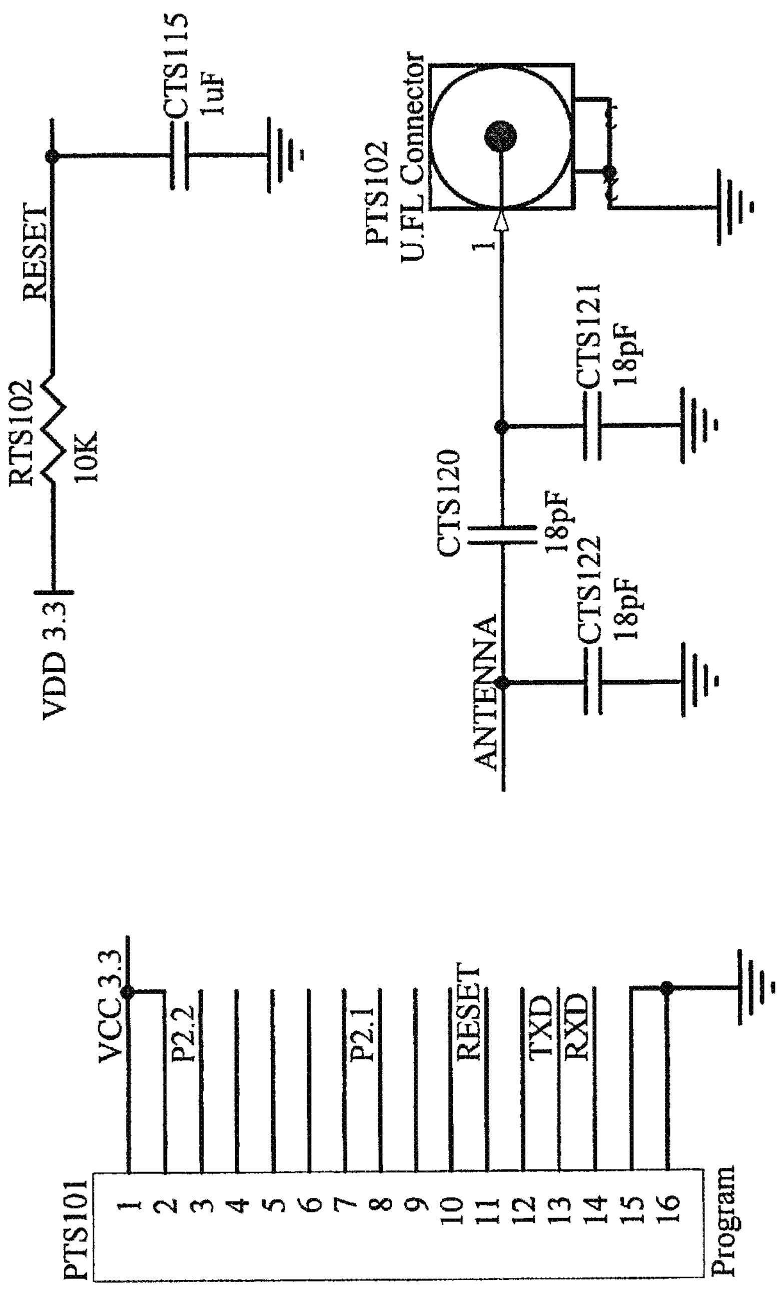
Figure 37C:
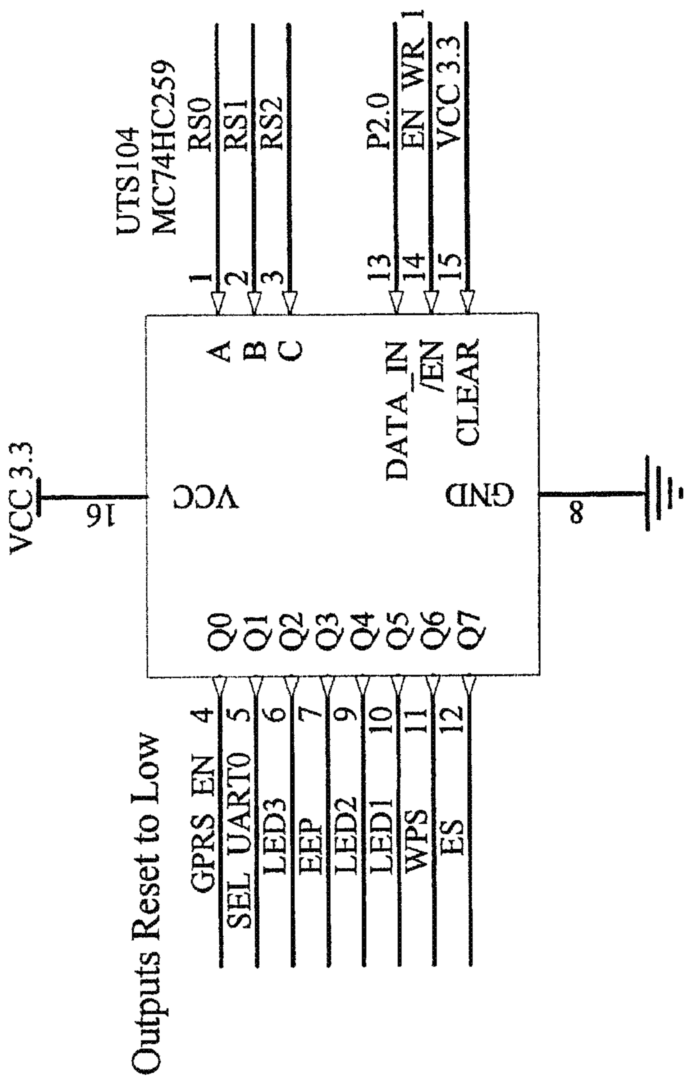

Referring to FIGS. 37A through 37D, these correspond to the Zigbee component of the base station again utilising the ZE51/61 module along with the programming software, internet connectors, reset as illustrated in FIG. 37B and the port expander of FIG. 37C. The power supply is the top part of FIG. 37B including the power conditioner for the WiFi and the remainder of FIG. 37B comprising the selection processes connected to the USB port.

Functionally, the operation of the Zigbee network in relation to the detectors and the base station is operatively the same as described in the illustrated embodiments but there is no longer a local display. Local programming and set up is by a smartphone App communicating via the base station WiFi.

Figure 37D:
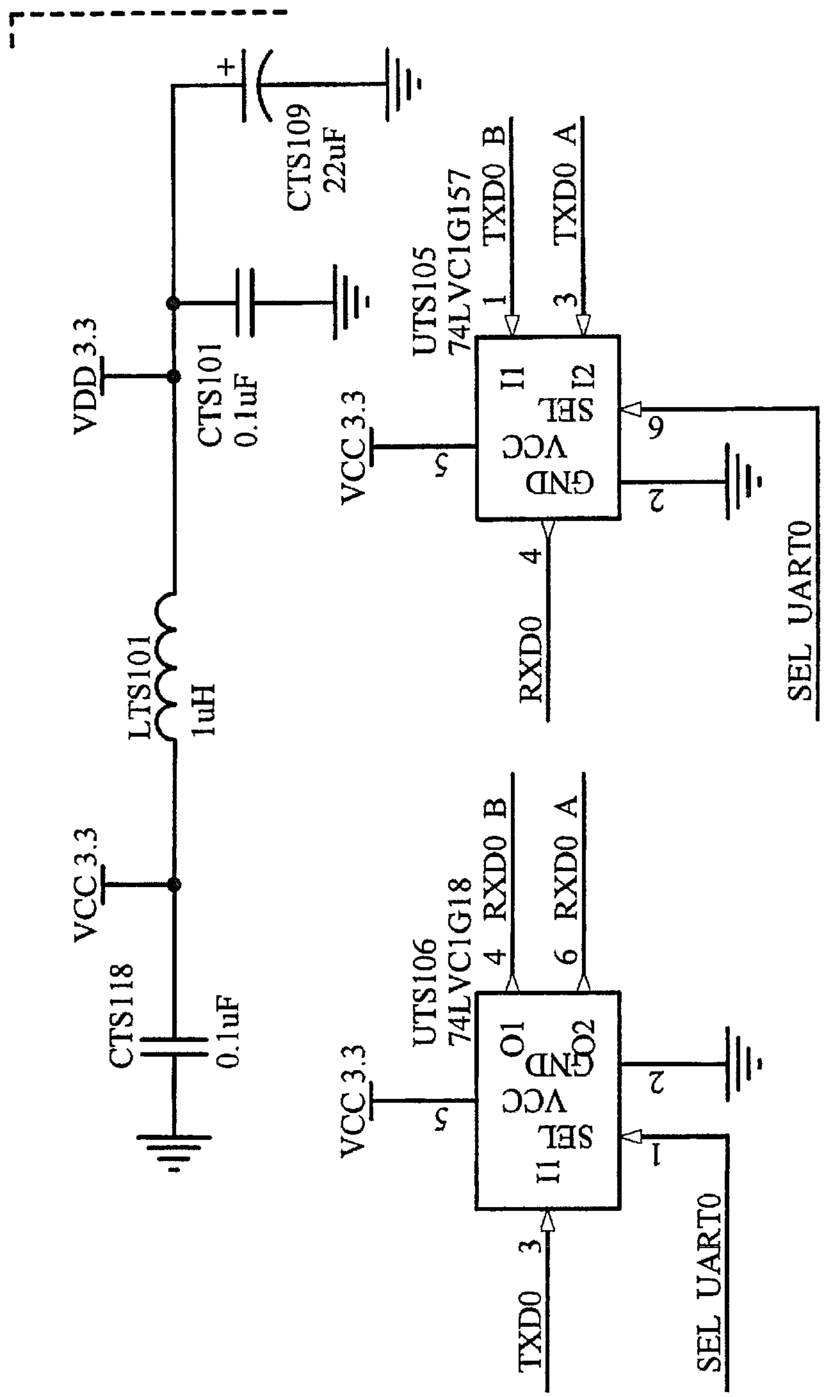
Figure 38A:
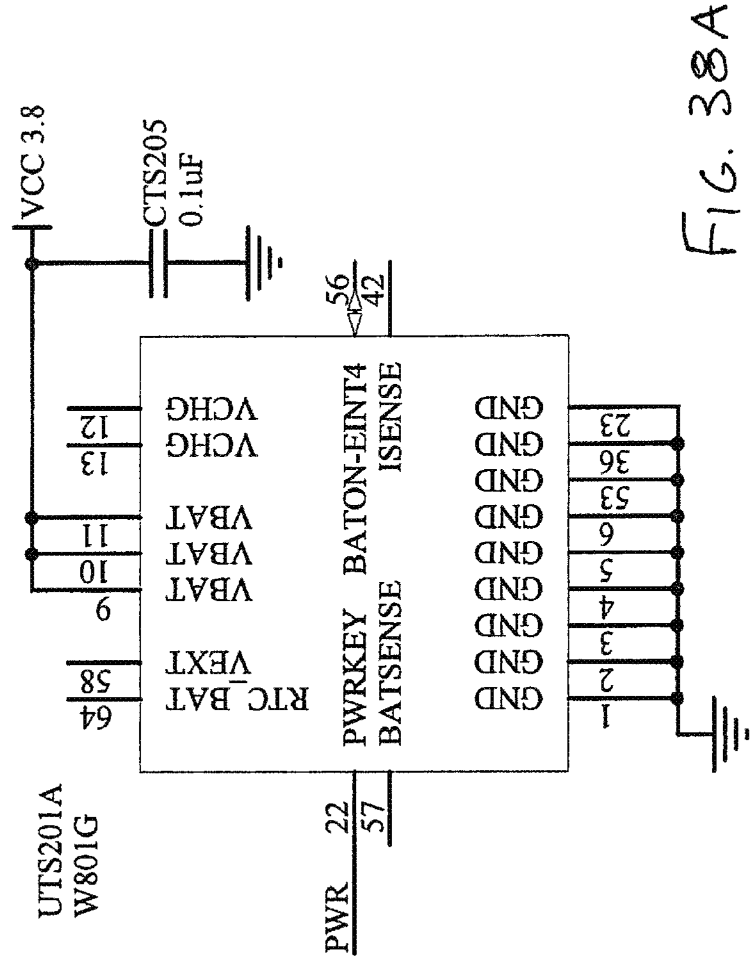
Figure 38B:
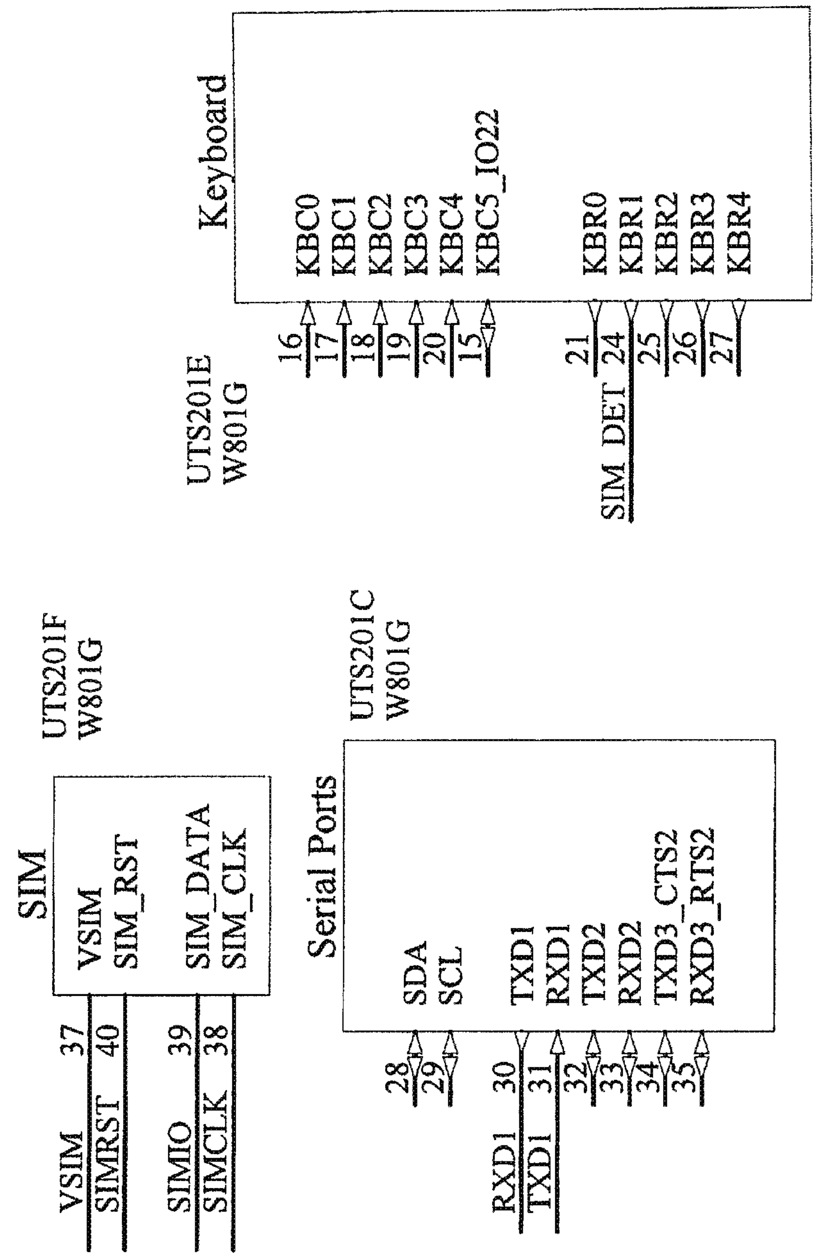
Figure 38C:
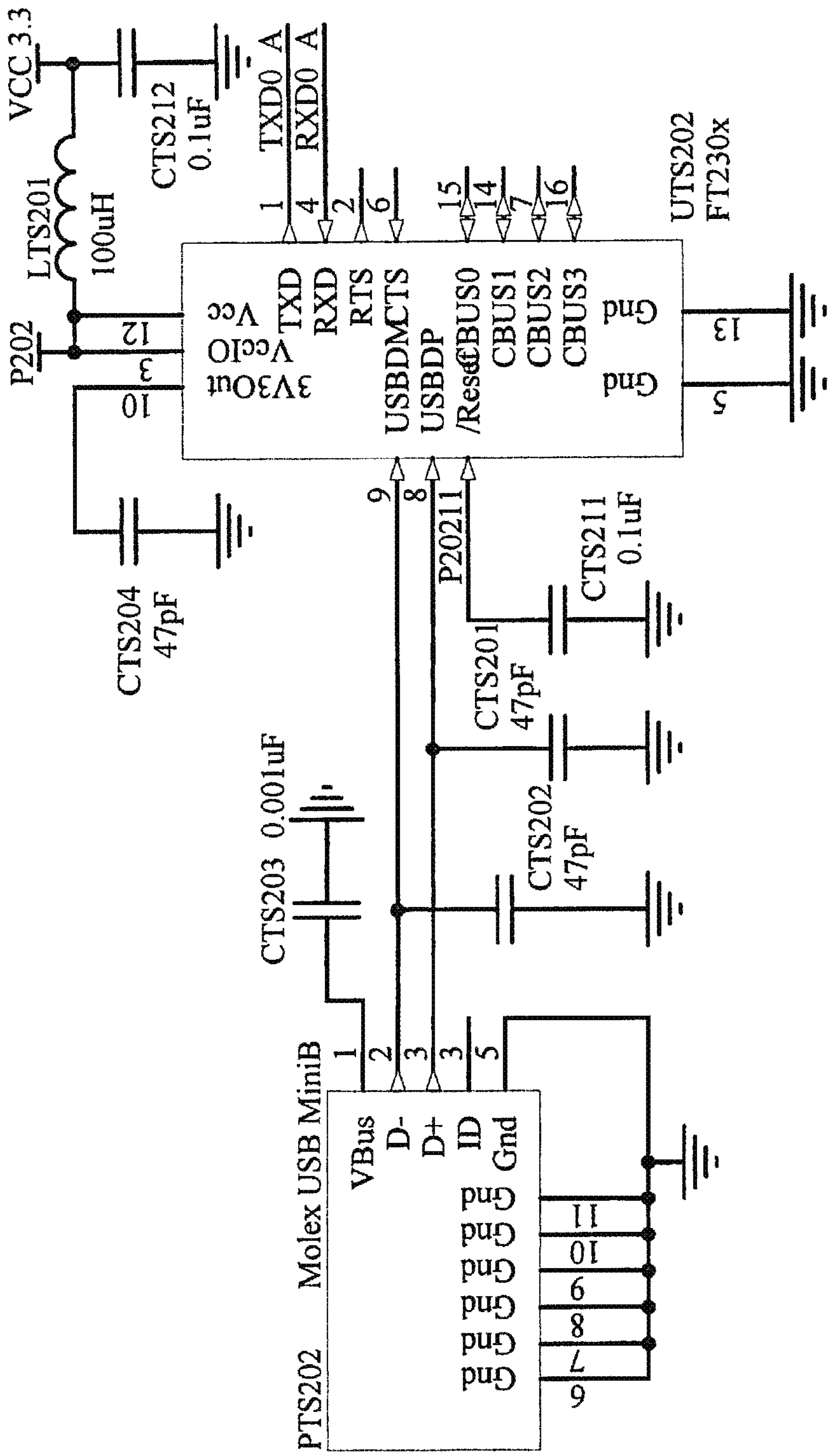
Figure 38D:
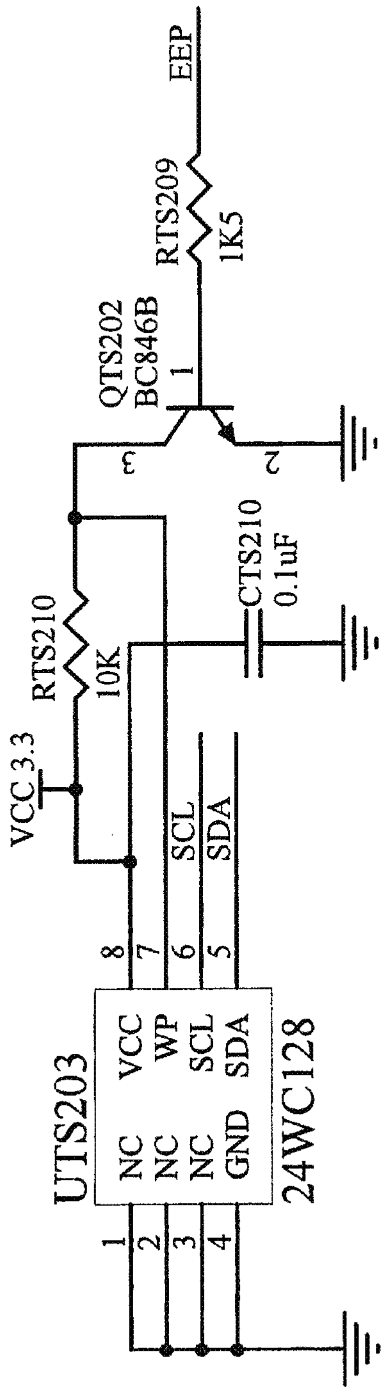
Figure 38E:
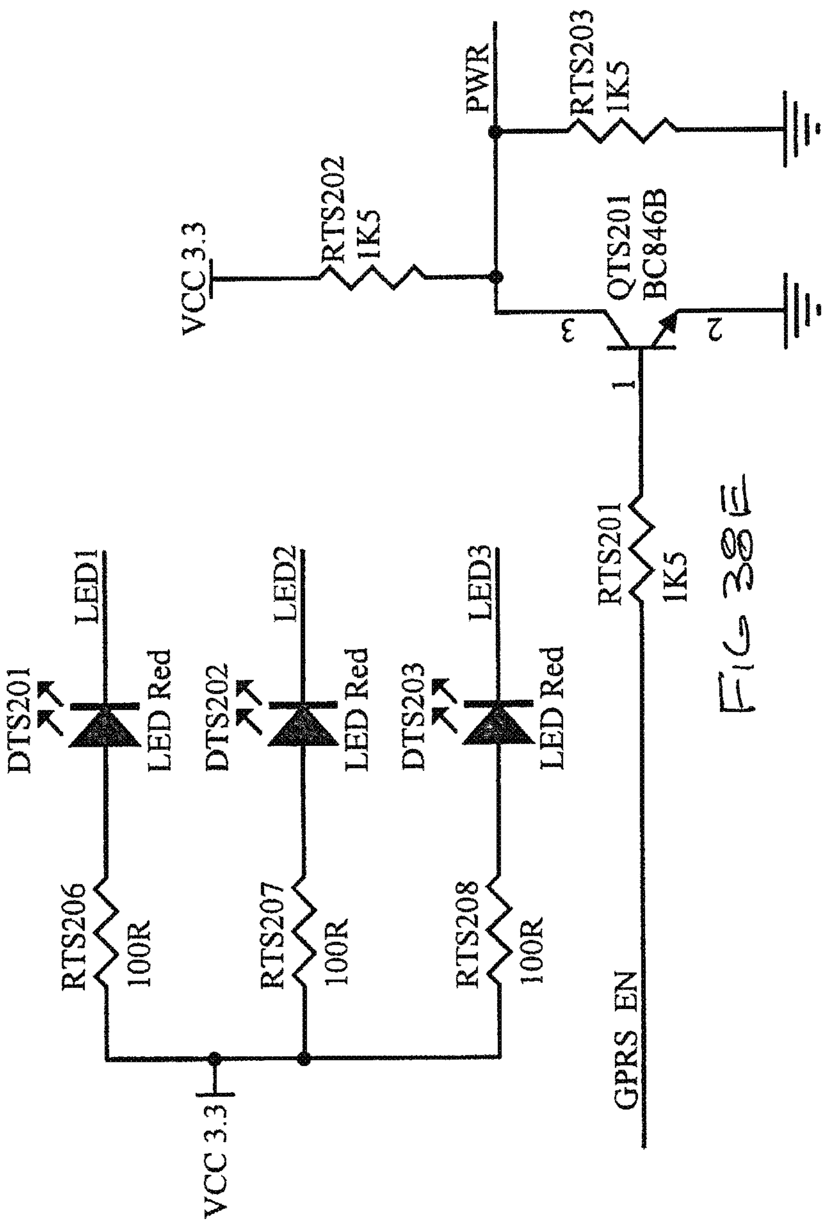
Figure 38F:
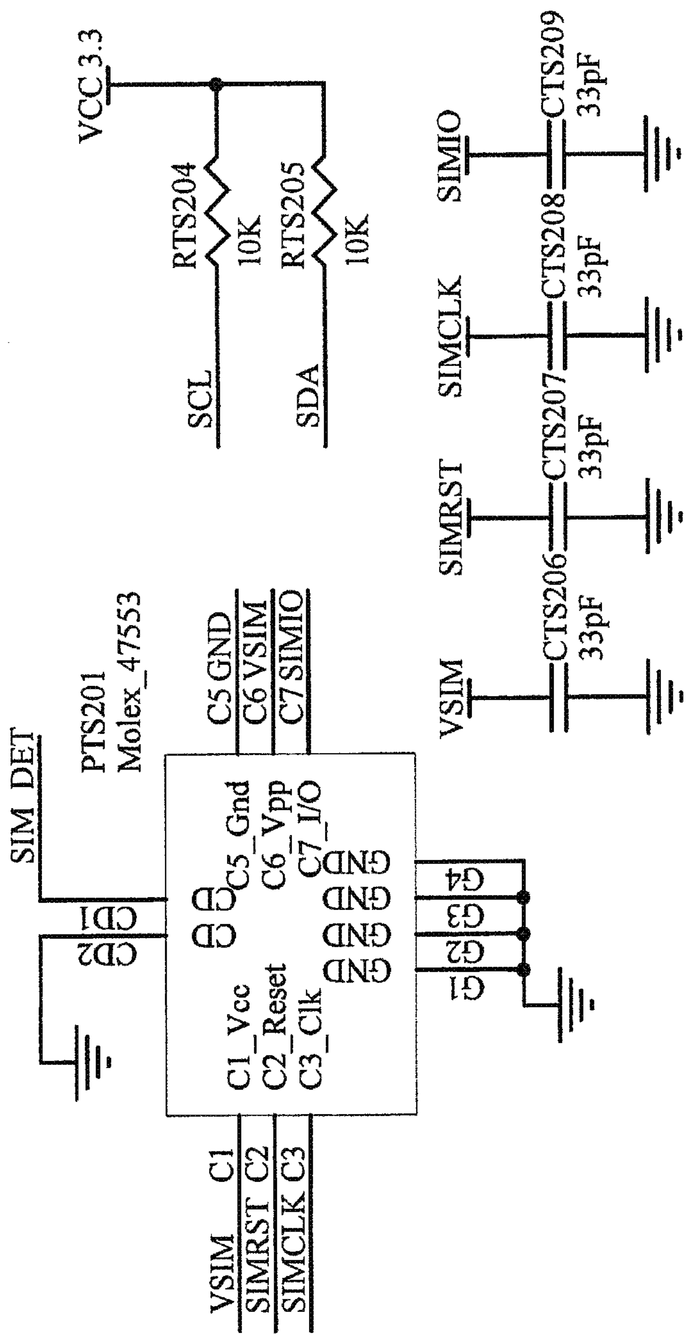

Utilising in FIG. 37D multiplexes 74LVC1G18 and 74LVC1G157 both from NXP Semi Conductors serve as port extenders and communicating to the USB port, the USB connection being shown in FIG. 38C.

Figure 14A:
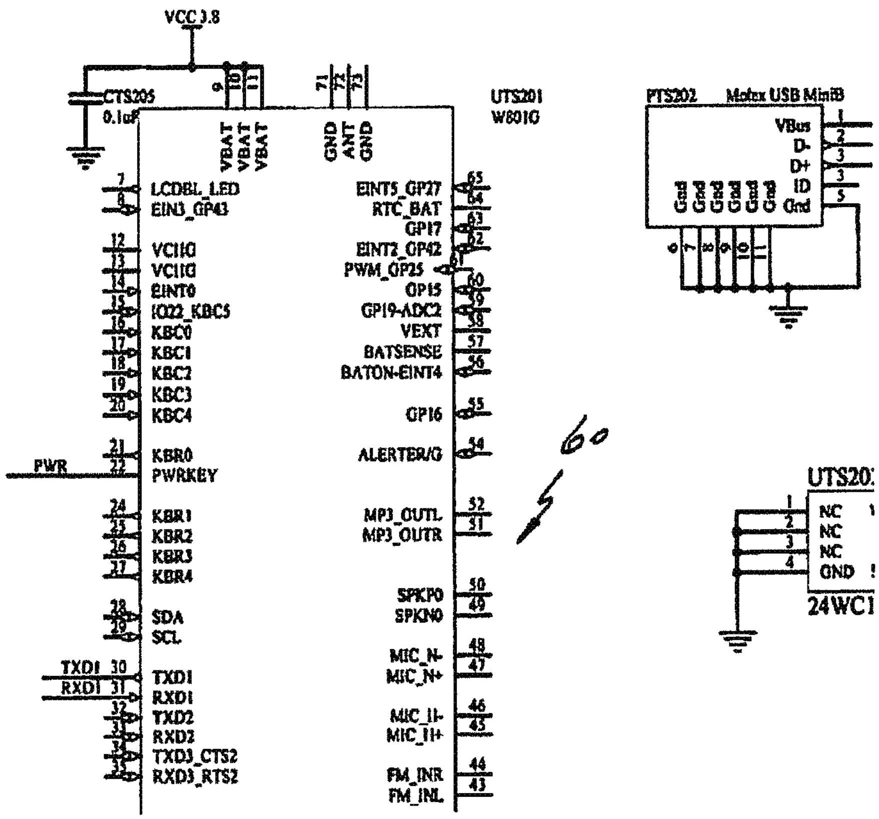
Figure 14B:
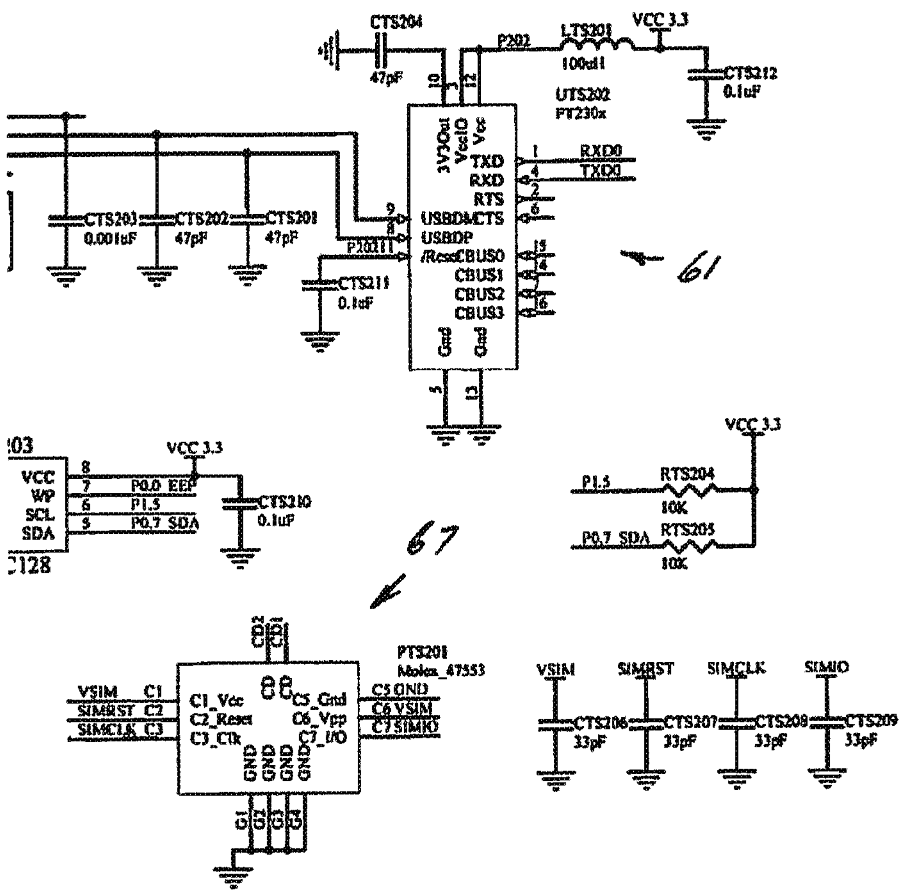
Figure 14C:
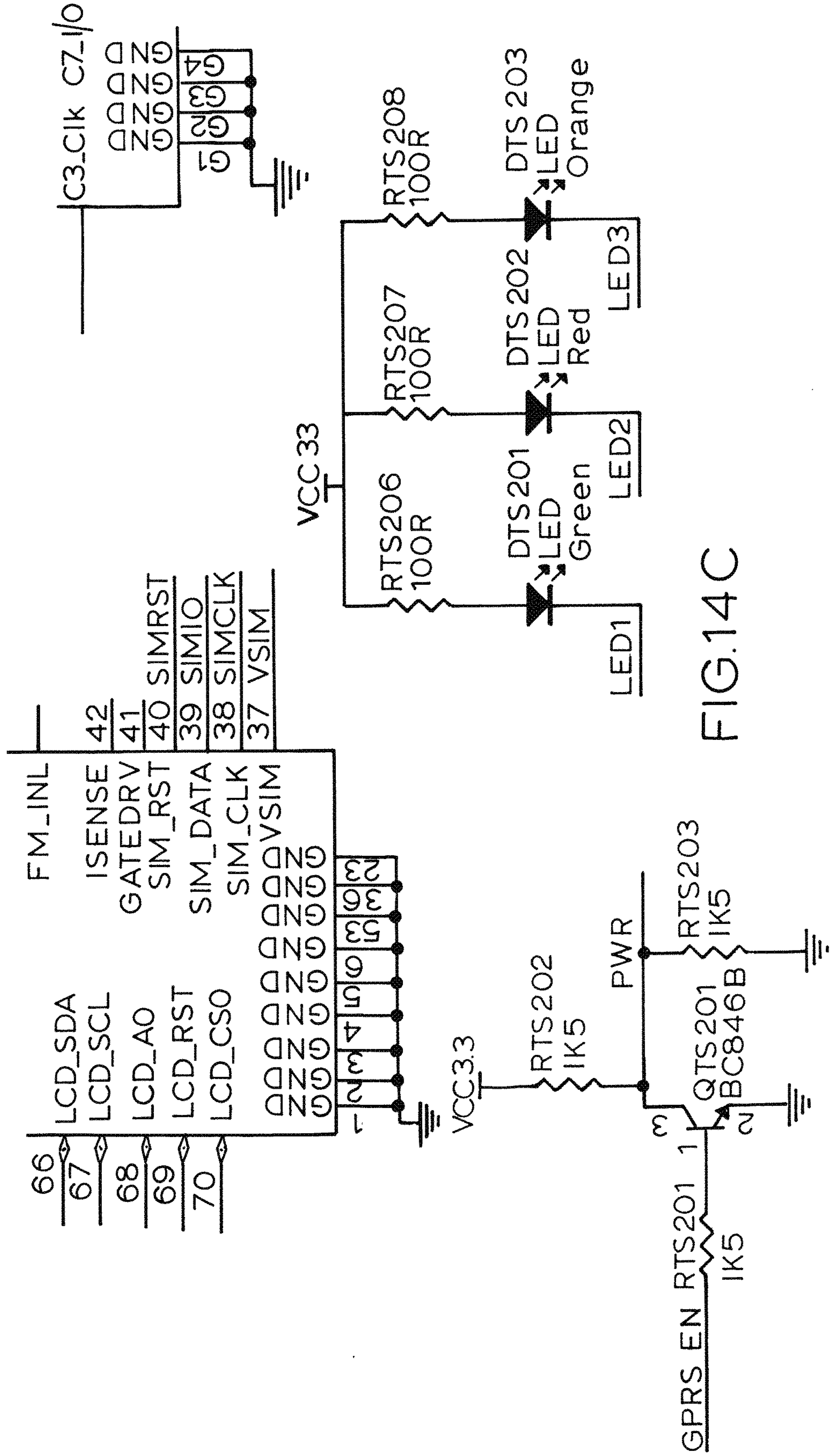

FIGS. 38A through 38F are essentially the same components as illustrated in FIGS. 14A through 14C although the W801G is not shown, it will be understood that it is used here, for practical purposes in the same way and configuration.

Figure 54:
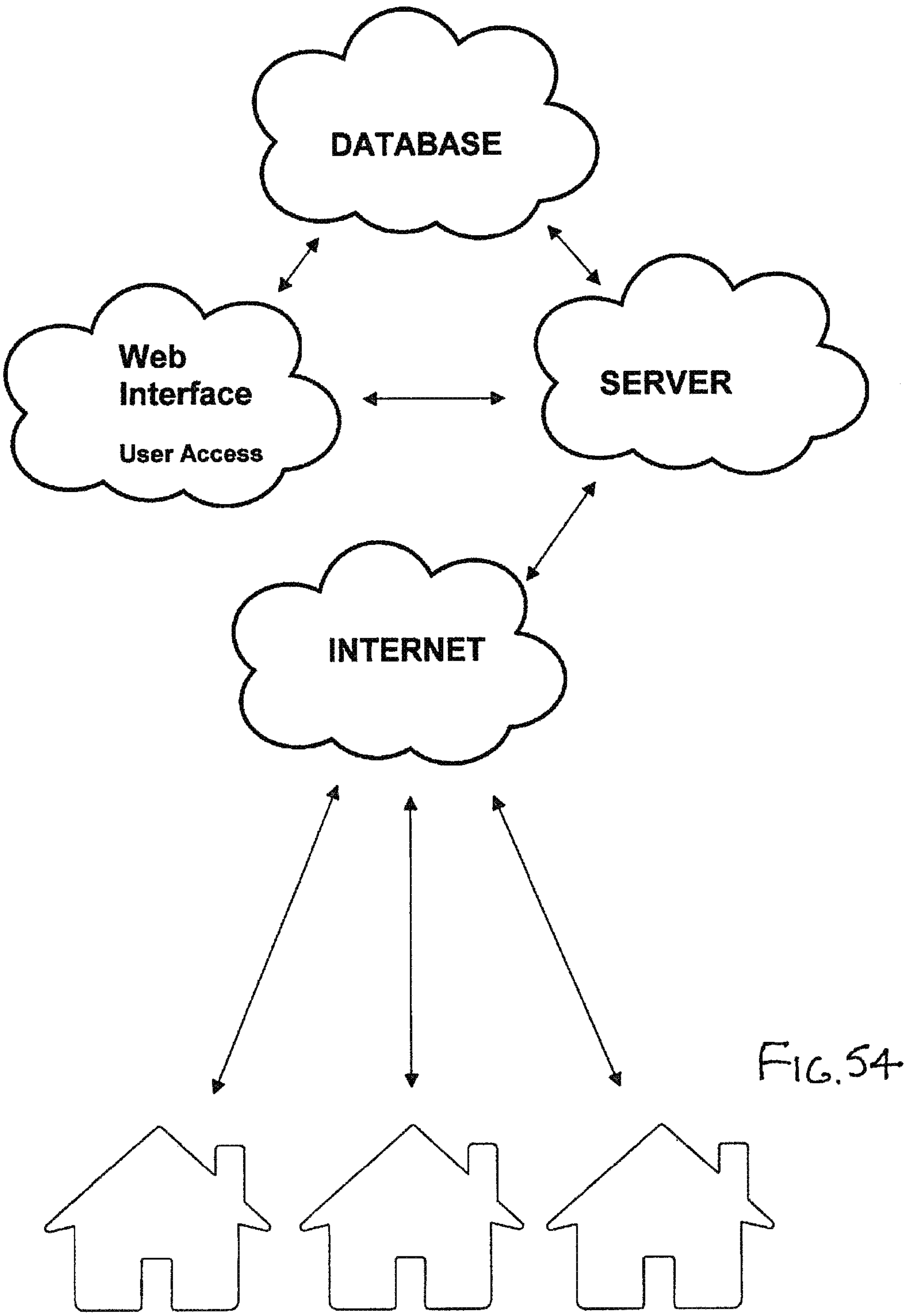
FIG. 54 shows the system outline for data processing for web interlace and web browsing, the screenshots

As mentioned above the base station of this second embodiment does not have a display and in this regard users may access monitor and/or detector data in accordance with FIG. 54 via a web interface, server, database and either through the main administrator directly accessing the server and the database or by permitted users accessing the server and database via the internet.

As previously described the base station includes an ethernet connector for the purpose of connecting the base station to a router and it also includes in this embodiment a separate WiFi module for local access via a smartphone and app. The smartphone and app access would normally be initiated by the local installer employed by the property owner to set up the system about their property.

Figure 39:
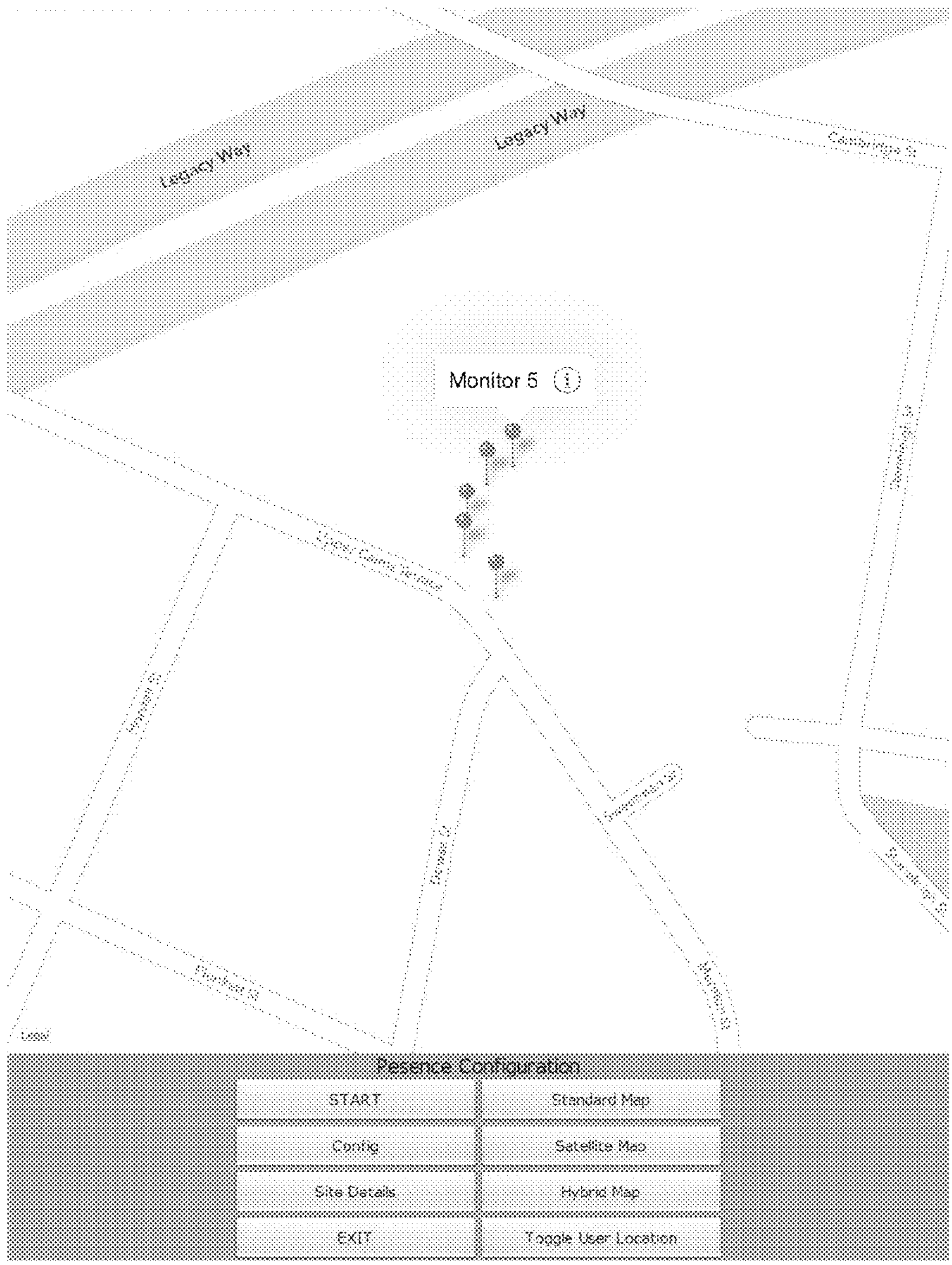
FIG. 39 is screenshot of a typical smartphone App used locally via based station local WiFi by an installer to locate and edit monitor details in a database.
Figure 40:
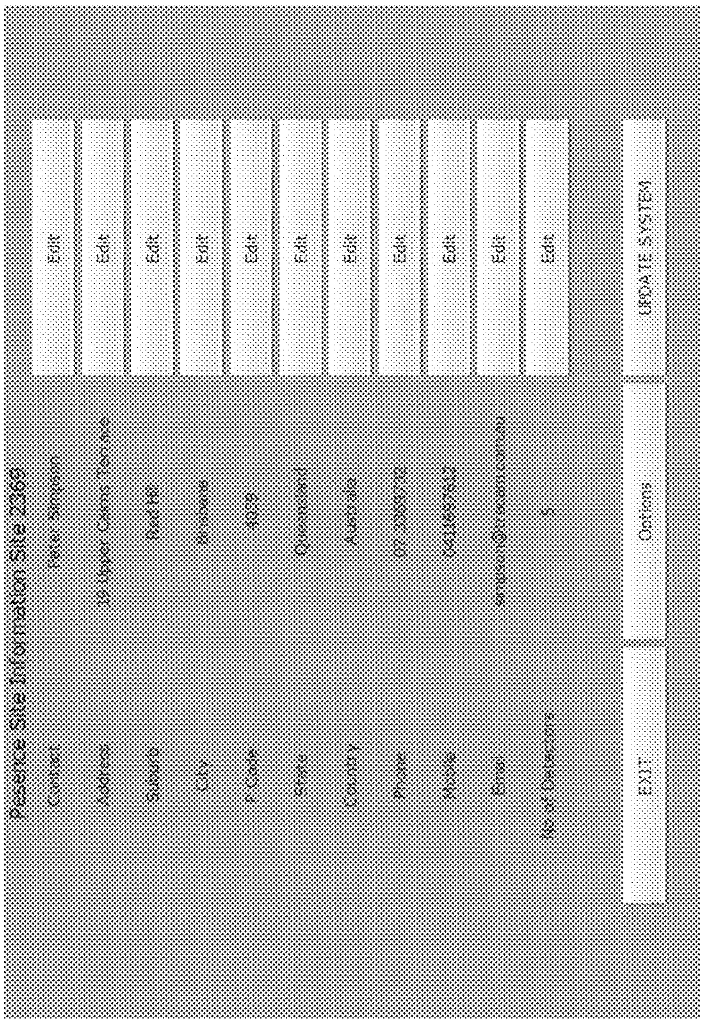
FIG. 40 is the base configuration page for editing the database onsite via a smartphone App used locally and via the base station local WiFi.

FIG. 39 is typical of the smartphone app as it might appear for a particular property showing and illustrating the distribution of monitors for example "monitor no. 5" and by using the configuration button on the app the user may typically go to the site information as illustrated in FIG. 40.

The pest controller may edit the details as shown in FIG. 40. While this particular app arrangement is quite a simple one it serves to provide for local access and local setup including monitor physical location relative to other onsite fixed geographic or built features including walls, fences and so on, which then communicates information entered back to the main database.

Figure 41:
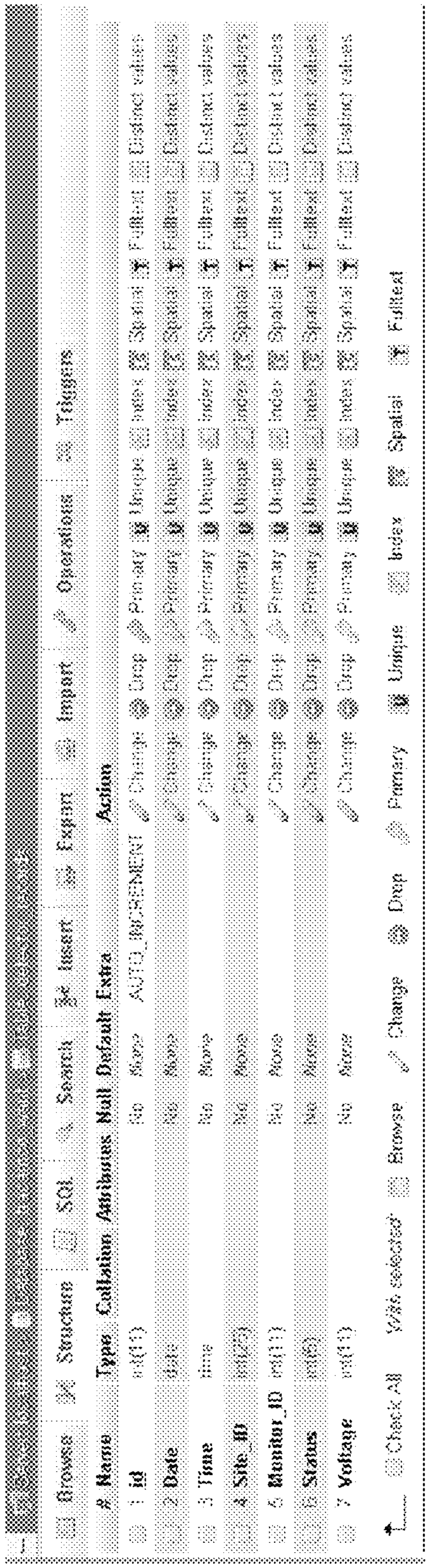
FIGS. 41-44 are screenshots showing the database contents at various levels at the server.
Figure 42:
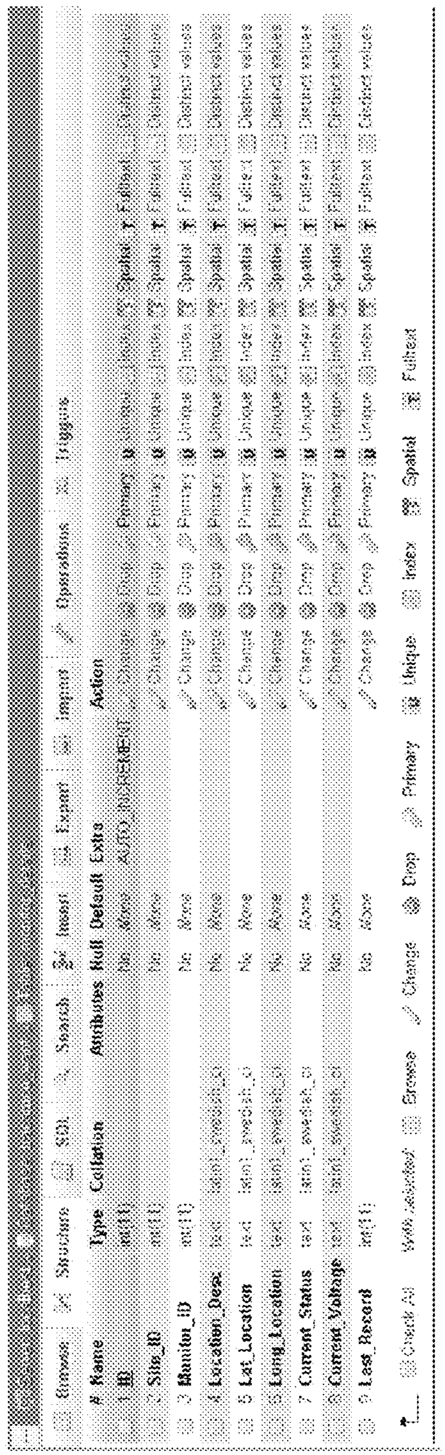
Figure 44:
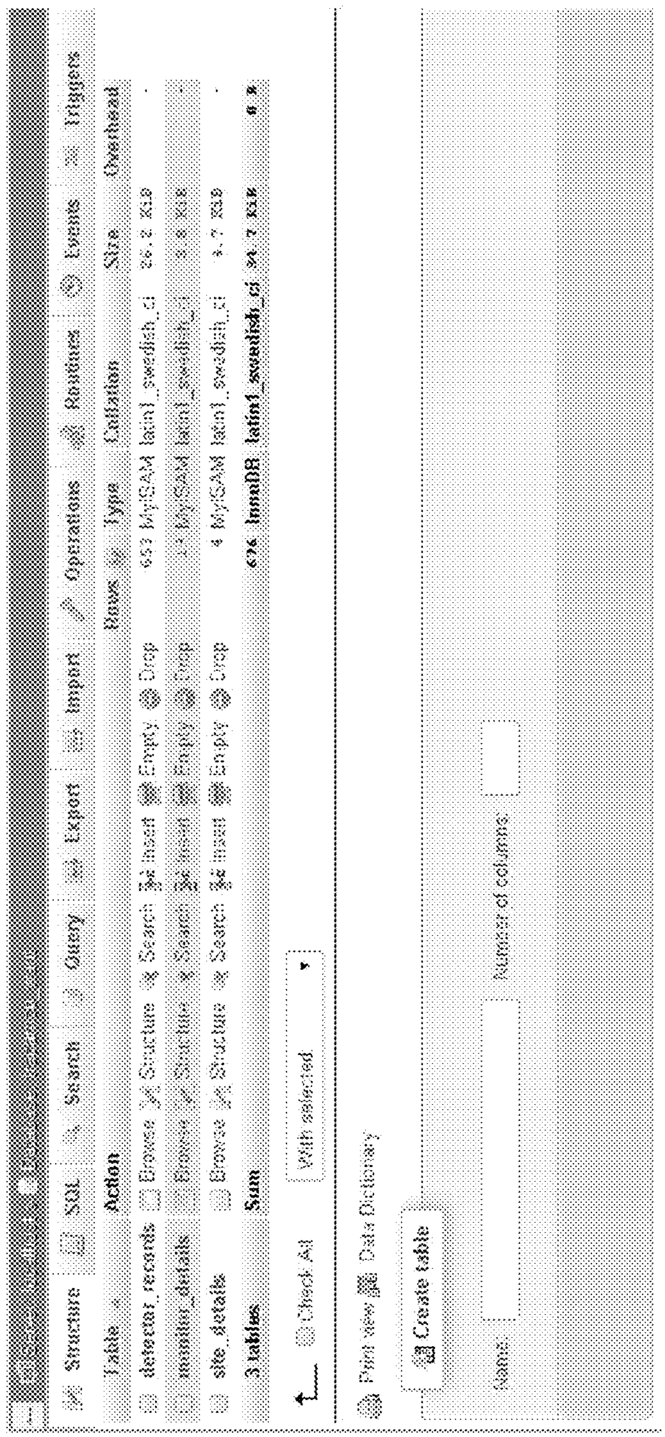

Typically, the database may be hierarchically set up as illustrated in FIG. 44 with site details, detector details and monitor details. The detector information is illustrated in FIG. 41 and the database holds, the customer ID, date, time, the site ID, the monitor ID, the status and voltage and of these there is a daily update of "status" and the "voltage" for each detector, status being whether or not pests are present. Consequently, FIG. 41 is the data held to indicate the power status of a particular detector and the particular detector's status in terms of the presence or absence of pests being detected. Other details related to the detector at the time of installation or at a particular point in time are held in the database and these contents are illustrated in FIG. 42 as in, ID, site ID, the particular detector or monitor ID, a location description, latitude location, longitude location, the current status and the current voltage and the last record. Note that the location description may ordinarily be some kind of specific description entered by the installer as in for example some cartesian coordinates relative to the property as in 2 metres from rear fence, 3 metres from east side fence and so on, so that the particular location of that particular detector may be appropriately stored.

Figure 43:
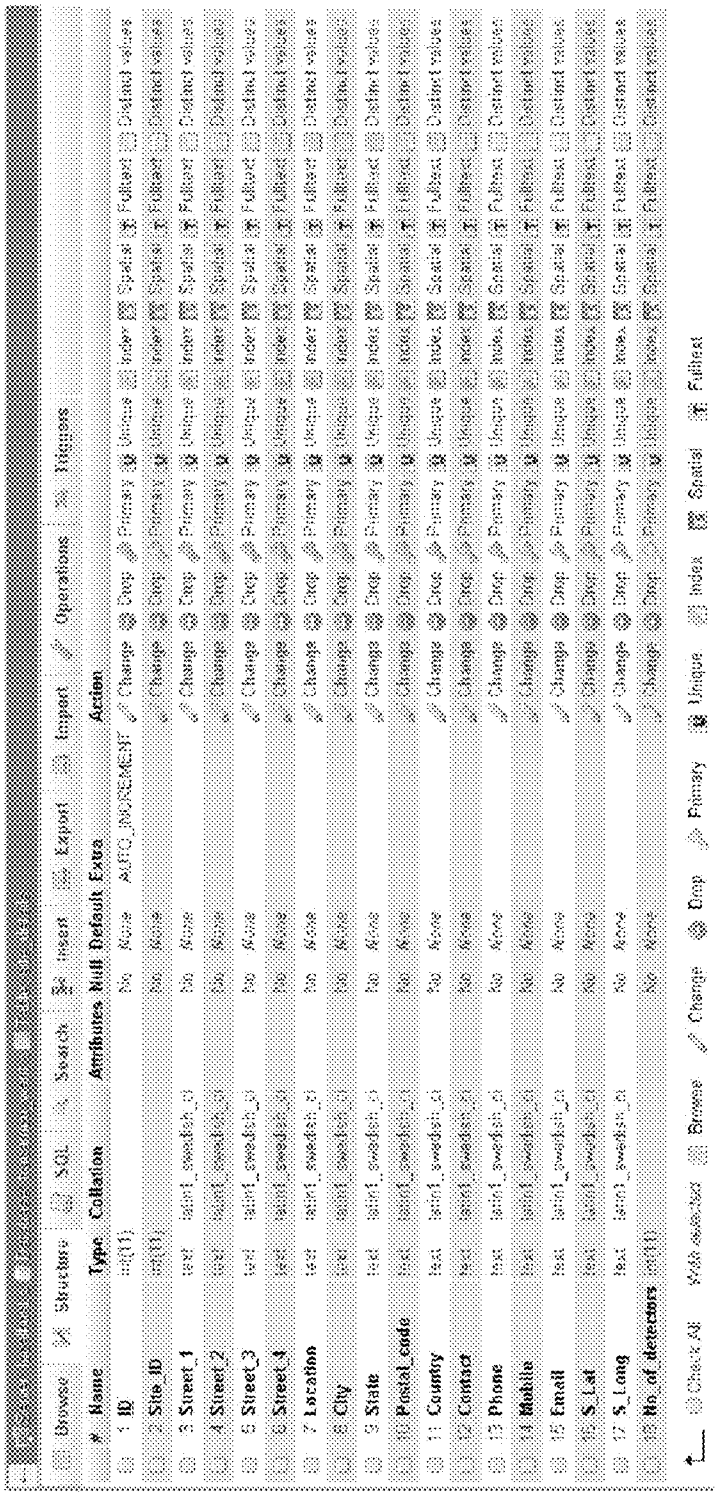

FIG. 43 illustrates database content for the particular site and this contains address details, contact details, the number of detectors, the latitude and longitude details as well. FIG. 44 shows the overall database structure as previously described.

Figure 45:
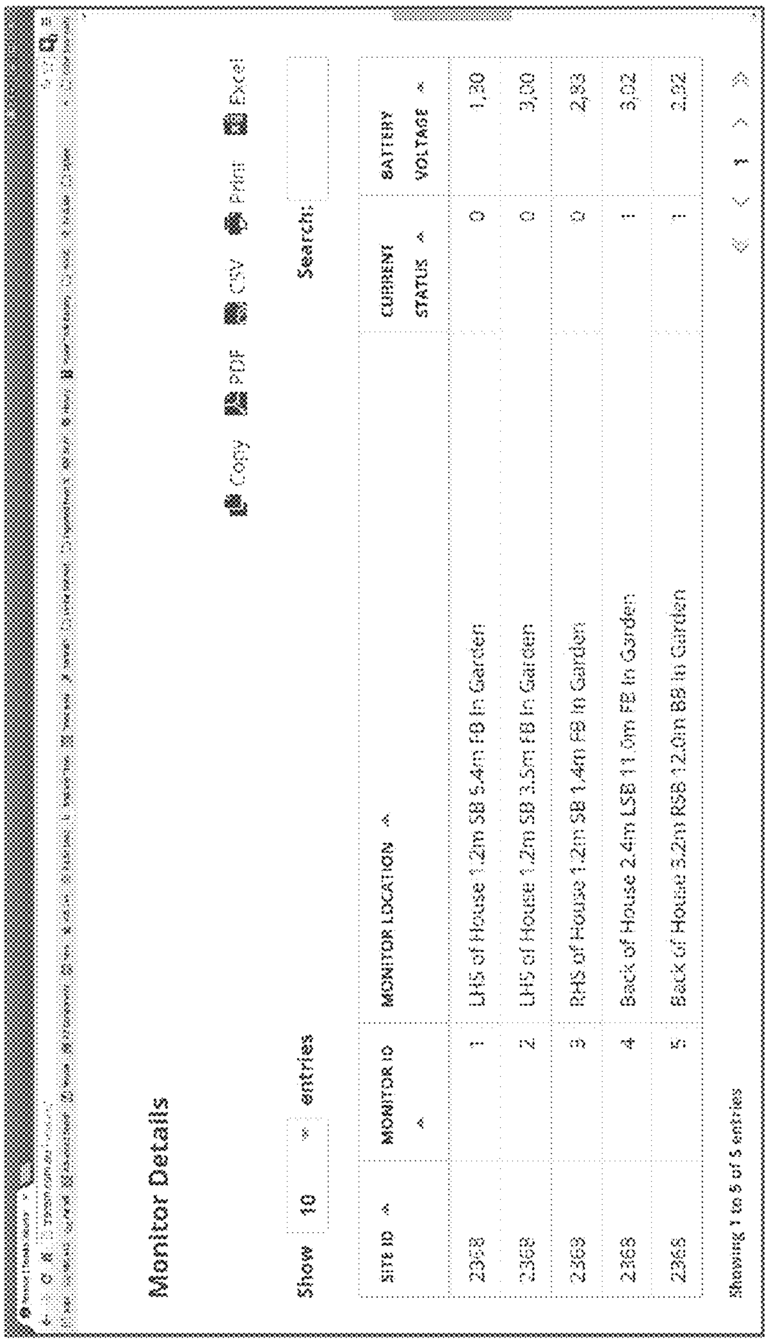
FIGS. 45-47 are screenshots showing the site, monitor and monitor history details in a web browser format viewable via the smartphone App.
Figure 46:
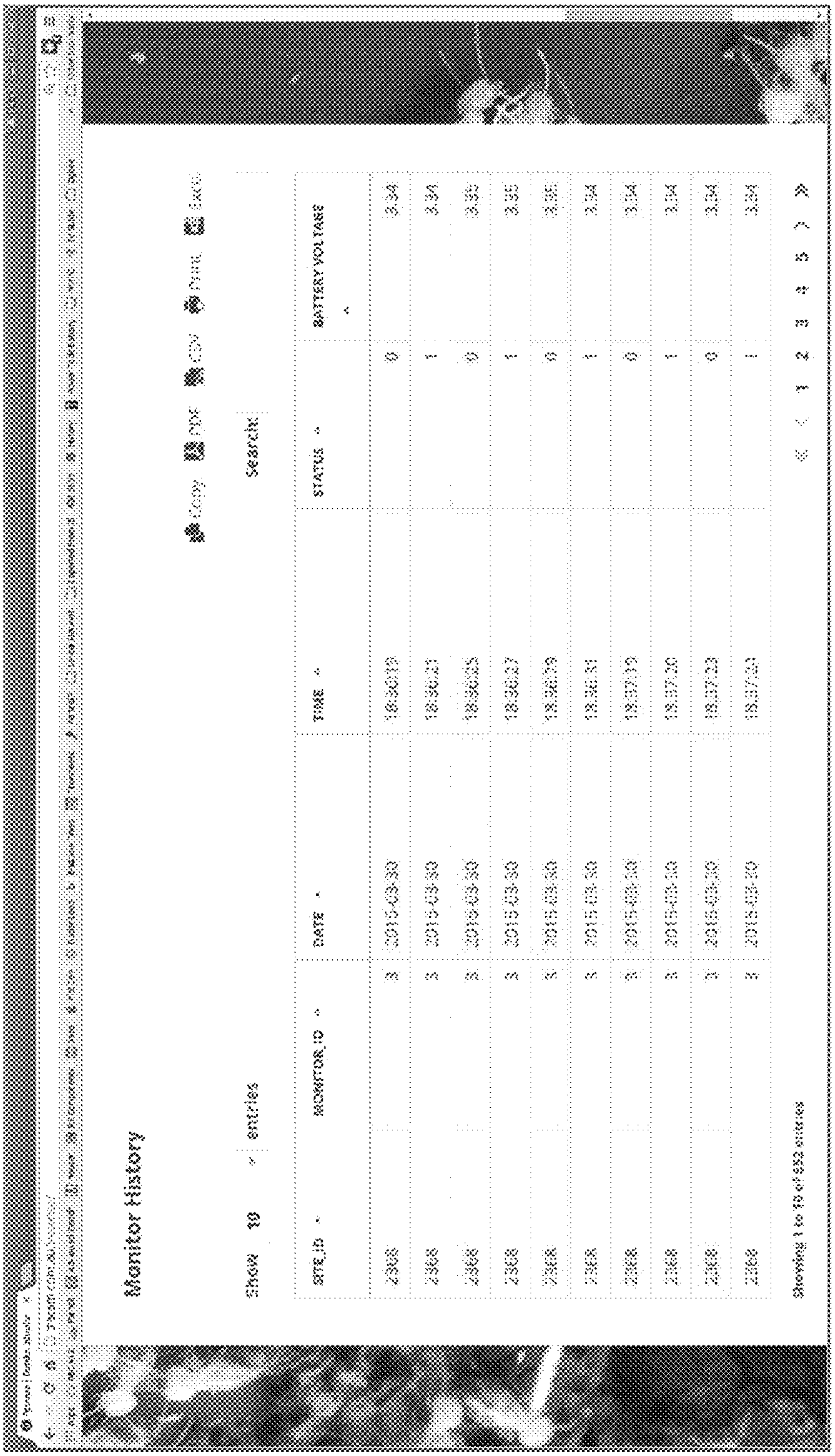
Figure 47:
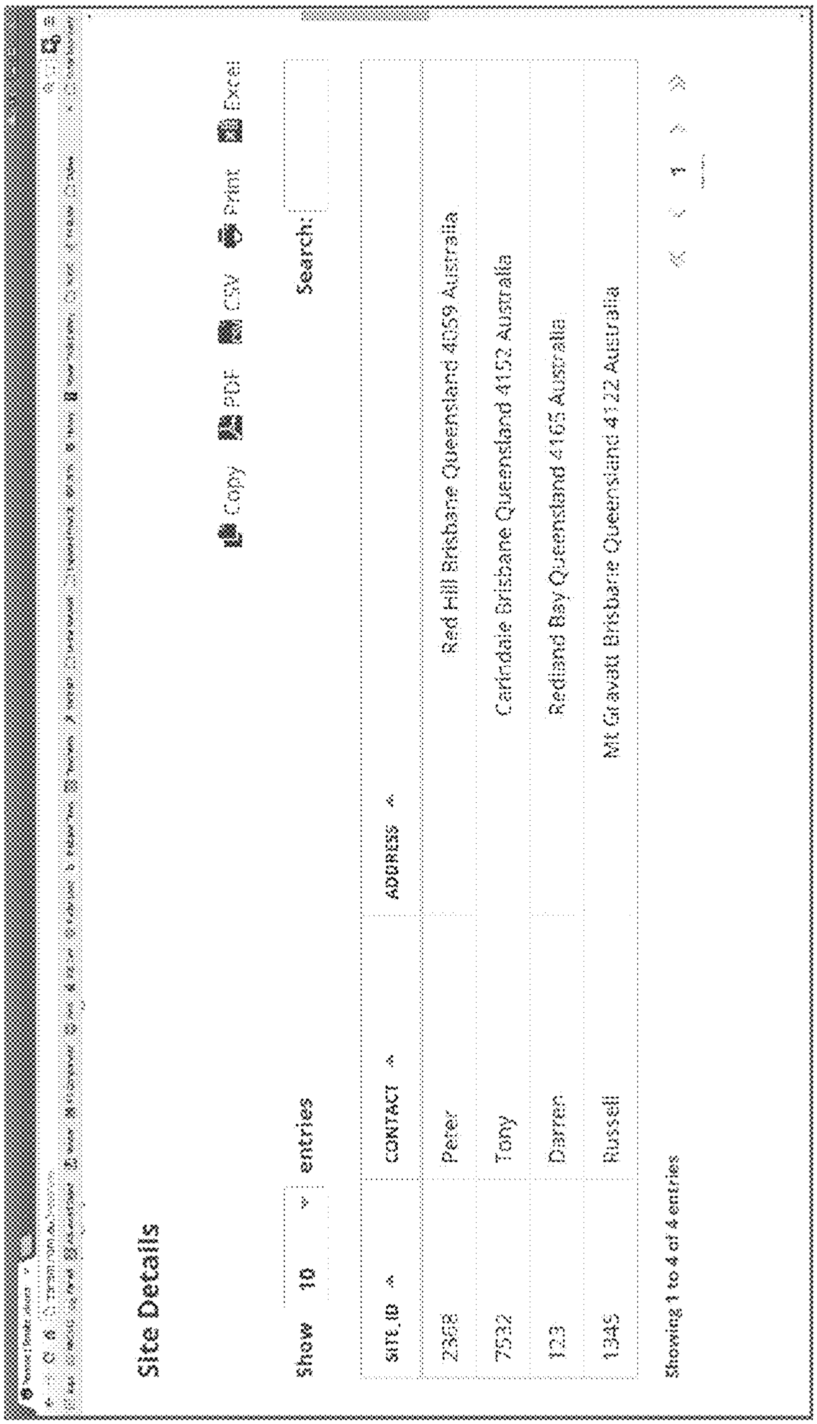
Figure 48:
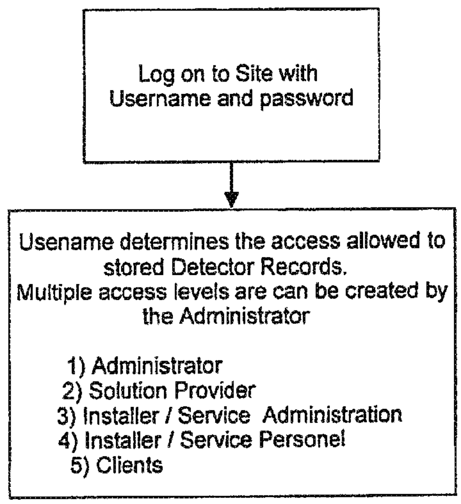
FIGS. 48-53 are charts showing the web browser function.
Figure 49:
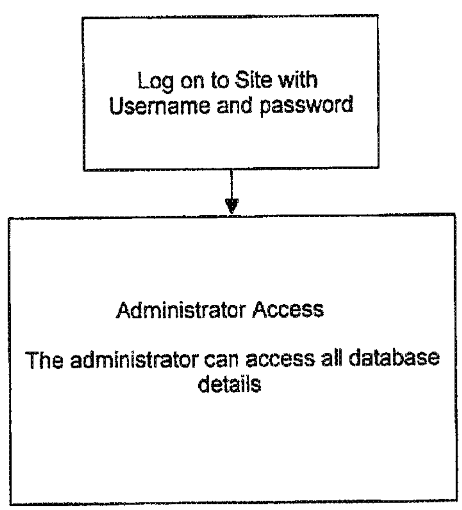
Figure 50:
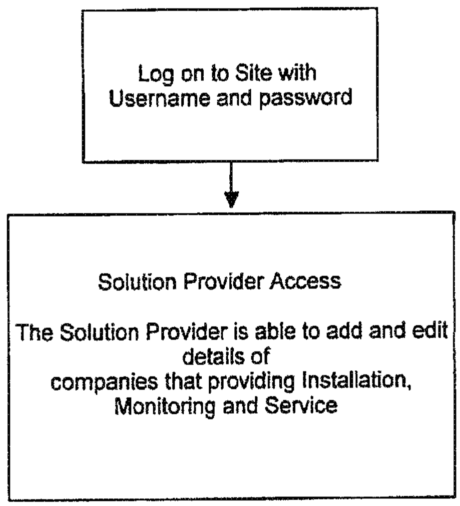

FIGS. 45-47 illustrate the web client interface and this shows the location of each monitor with its included detector.

Figure 51:
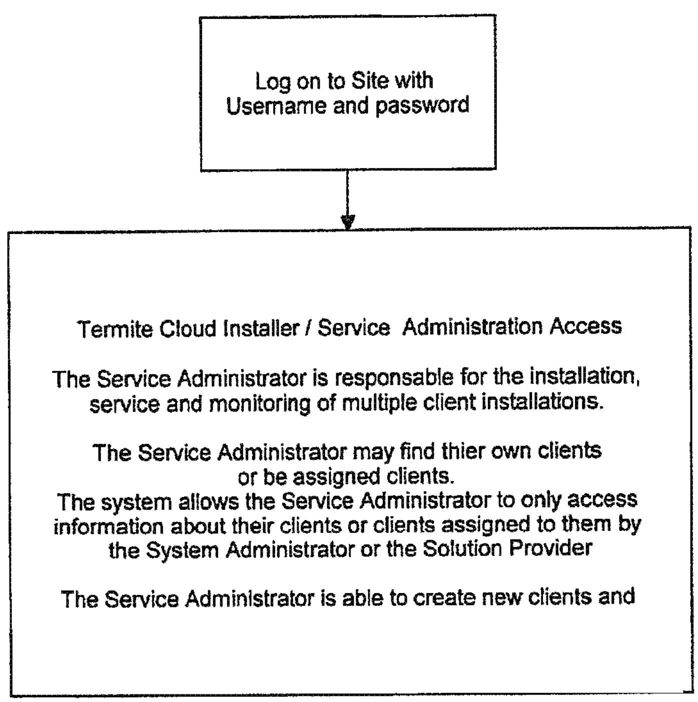
Figure 52:
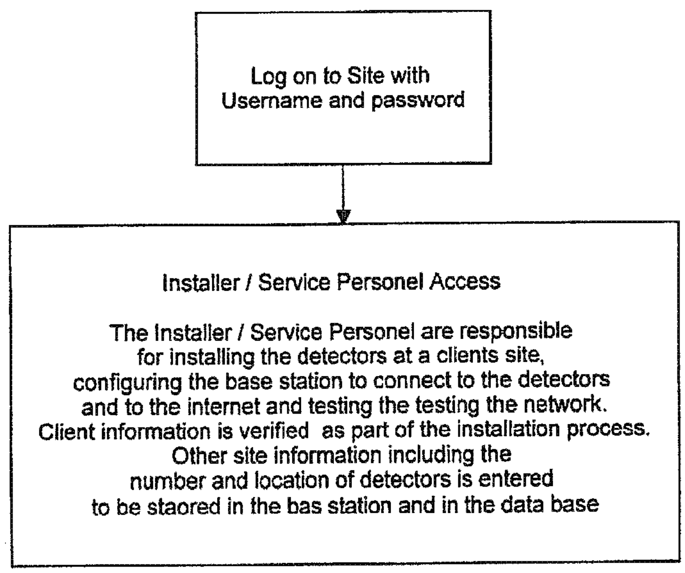
Figure 53:
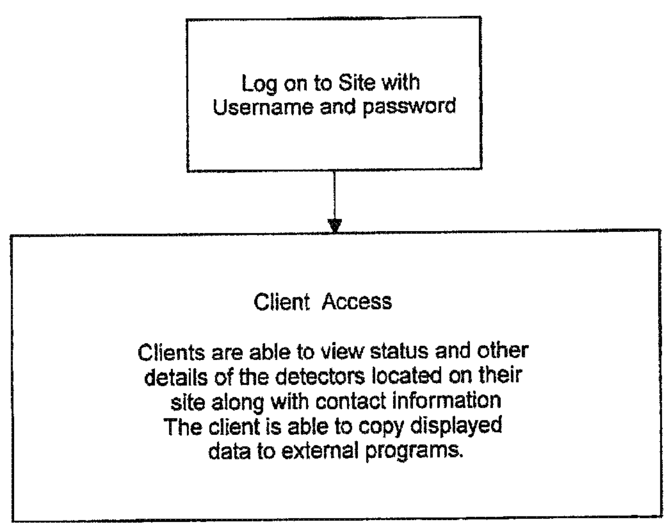

Consequently, a user would be logged on to the site after being allocated a username, password and access level in accordance with one of administrator, solution provider, installer/service administration, installer/service personnel, or clients. The access levels are shown in FIGS. 48 through 51. An administrator can access all databases and all details and can change them. The next access level is the "solution provider" access and this individual may edit those organisations that are providing installation, monitoring and service as affiliates that are ultimately providing the "on the ground" activity in installation and servicing the system. FIG. 51 illustrates the next level down in the scheme which involves usually employees of the companies allocated by the solution provider. This service administrator is responsible for the installation, service and monitoring of multiple installations. In a franchise structure for example, these individuals would be providing the installation of the monitors and their on site service. The next level of access would be as illustrated in FIG. 52 which would be the service technician who would be actually installing the detectors at a client's site configuring the base station to connect to detectors and to the Internet and testing the network and verifying all data input into the system as set out in the database. This would also usually be the person maintaining the system and baiting the pests when needed. The final level would be the client access and this access would enable the end customer of each site, or multiple sites as the case may be, to view the status and other details of the detectors and monitors as set out in the database but not edit the database.

FIG. 54 illustrates the overall configuration of this arrangement which is effectively the same as the previous embodiment which had this access as well, both of which also have the modem option and sim card option but without the base station display and for completeness the web interface pages which may be viewed by the client are the same pages as in FIGS. 45-47 but without the ability to edit.

Whilst the above has been given by way of illustrative example many variations and modifications will be apparent to those skilled in the art without departing from the broad ambit and scope of the invention as set out in the appended claims. In the present specification words implying the exclusive such as "comprising" being "comprised only of" are to be interpreted as non-exclusive as "including"; "having" etc.

The invention claimed is:

1. A pest monitor comprising a detector having one or more electronic sensors, an attractant, and one or more predefined target or targets associated with the one or more sensors, the one or more targets and one or more sensors being so made and arranged that pests interact with the one or more targets and thereby trigger the associated one or more sensors by a reflected signal from the one or more targets;

wherein the pests are termites and the one or more sensors comprise spaced IR transmitters and receivers and the one or more targets is termite generated to thereby provide an indirect indication of termite presence, the receivers relying on reflected light from the one or more targets, there being at least two separate transmitted signals and corresponding reflected signals used to indicate a positive detection, the monitor holding the attractant, the one or more targets being a termite closable opening, the one or more sensors being held in a housing operatively located in line with the closable opening, the transmitters and receivers being positioned within the housing in side by side configuration, the housing having spaced windows aligned with the transmitters and receivers for the purpose of transmission and reception of IR signals, the windows and sensors being positioned for collimation of the light passing through the windows.

2. The pest monitor according to claim 1 wherein the monitor includes a container holding the attractant and wherein the one or more sensors within the housing form a module removably attached to the container, the housing including a battery holding section and an electronics mounting section.

3. A pest monitor comprising a detector having one or more electronic sensors, an attractant, and one or more predefined target or targets associated with the one or more sensors, the one or more targets and one or more sensors being so made and arranged that pests interact with the one or more targets and thereby trigger the associated one or more sensors by a reflected signal from the one or more targets;

wherein the pests are termites and the one or more sensors comprise spaced IR transmitters and receivers and the one or more targets is termite generated to thereby provide an indirect indication of termite presence, the receivers relying on reflected light from the one or more targets, there being at least two separate transmitted signals and corresponding reflected signals used to indicate a positive detection, the monitor holding the attractant, the one or more targets being a termite closable opening, the one or more sensors being held in a housing operatively located in line with the closable opening, the transmitters and receivers being positioned within the housing in side by side configuration, the housing having spaced windows aligned with the transmitters and receivers for the purpose of transmission and reception of IR signals, the windows and sensors being positioned for collimation of the light passing through the windows by having the windows set back in a recess.

4. The pest monitor according to claim 2 wherein the module comprises an upper part of the monitor and wherein the container comprises a lower part of the monitor.

5. The pest monitor according to claim 4 further comprising communications electronics, wherein the communications electronics is self contained within the module.

6. A pest monitoring local network comprising networked distributed pest monitors, each monitor having a pest detector, and the pest monitoring local network being connected to the internet, a database holding detector data for display and/or editing by authorised users via the internet, the data uniquely identifying each monitor including location and pest status, the pest monitoring local network automatically updating pest status at predetermined intervals of time, wherein each detector has one or more electronic sensors, an a termite attractant, and one or more predefined target of targets associated with the one or more sensors, the one or more targets and one or more sensors being so made and arranged that pests interact with the one or more targets and thereby trigger the associated one or more sensors by a reflected signal;

wherein each monitor includes the termite attractant held in a container and the one or more electronic sensors comprising a sensor assembly including control electronics, a difference sensor and power supply, the sensor assembly being located in a sensor assembly housing, the container having a target opening positioned to be closed by termites in the container, the sensor assembly housing being a self contained sensor module attachable to the container adjacent the target opening in order to detect its closure by termites and where the difference sensor employs a beam exiting the module, the sensor assembly housing including a battery holding section, an electronics mounting section and beam exit section disposed in a base of the sensor assembly housing, the one or more sensors further comprise spaced IR transmitters and receivers and the target is termite generated to thereby provide an indirect indication of termite presence, the receivers relying on reflected light from the target, there being at least two separate transmitted signals and corresponding reflected signals used to indicate a positive detection, the transmitters and receivers being positioned within the sensor assembly housing in side by side configuration, the sensor assembly housing having spaced windows aligned with the transmitters and receivers for the purpose of transmission and reception of IR signals and being positioned for collimation of the light passing through the windows.

7. The pest monitoring local network according to claim 6, further comprising a base station, wherein the detectors and the base station employ a timer, the interaction between the detectors and the base station being thereby timed in accordance with a semi-autonomous timed sequence, where the detectors are woken at one of: timed intervals by the timer or by the base station.

8. The pest monitoring local network according to claim 7, wherein the base station includes WiFi and includes local programming and set up by a smartphone App communicating with the base station via the base station WiFi.

9. The pest monitoring local network according to claim 6, further comprising a base station, wherein the detectors and the base station are set up as the pest monitoring local network, the pest monitoring local network employing a timer, the interaction between the detectors and the base station timed in accordance with a semi-autonomous timed sequence, where the detectors are woken at one of: timed intervals by the timer or by the base station, the detectors configured to run through a check sequence to join the network, verify a status and check for a positive detection of pests, and then go to sleep/hibernate.

10. The pest monitoring local network according to claim 9, wherein the base station includes WiFi and includes local programming and set up by a smartphone App communicating with the base station via the base station WiFi.

* * * * *